(12) United States Patent
Schalla et al.

(10) Patent No.: US 9,303,912 B1
(45) Date of Patent: Apr. 5, 2016

(54) PASSIVELY COOLED CONTAINER SYSTEM AND METHOD

(75) Inventors: James P. Schalla, Edmonds, WA (US); Karen L. Hills, Everett, WA (US); Douglas A. Brown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 13/225,048

(22) Filed: Sep. 2, 2011

Related U.S. Application Data

(63) Continuation-in-part of application No. 12/778,096, filed on May 11, 2010, now Pat. No. 8,474,274.

(51) Int. Cl.
| | |
|---|---|
| F25D 3/12 | (2006.01) |
| F25D 17/04 | (2006.01) |
| F25D 25/02 | (2006.01) |
| A47B 96/02 | (2006.01) |
| A47B 31/02 | (2006.01) |
| A47B 31/00 | (2006.01) |

(52) U.S. Cl.
CPC ............... *F25D 3/125* (2013.01); *A47B 31/02* (2013.01); *A47B 96/021* (2013.01); *F25D 17/04* (2013.01); *F25D 25/021* (2013.01); *A47B 2031/005* (2013.01); *F25D 2303/0844* (2013.01); *F25D 2331/812* (2013.01)

(58) Field of Classification Search
CPC ............... F25D 1/00; F25D 3/00; F25D 3/12; F25D 17/00; F25D 25/021; F25D 25/02; F25D 3/045; F25D 3/06; F25D 3/125; F25D 17/045; F25D 2303/0844; F25D 2325/023; F25D 2400/04; F25D 2331/812; F25D 2400/20; B62B 2204/04; B62B 2204/67; A47B 2031/002; A47B 2031/02; A47B 2031/003; A47B 2031/005; A47B 31/02; A47B 96/021; B65D 77/046; B65D 1/36
USPC .................. 62/89, 237, 406, 407, 438, 457.2, 62/457.9, 530, DIG. 13; 108/27, 59; 312/408; 206/557
See application file for complete search history.

(56) References Cited

U.S. PATENT DOCUMENTS

| | | | | |
|---|---|---|---|---|
| 3,906,744 | A * | 9/1975 | Knapp et al. | 62/384 |
| 3,971,231 | A * | 7/1976 | Derry | 62/388 |
| 4,096,707 | A | 6/1978 | Taylor | |
| 4,229,945 | A | 10/1980 | Griffin et al. | |
| 4,397,159 | A * | 8/1983 | Dodd | 62/382 |
| 4,399,667 | A * | 8/1983 | Lamb | 62/382 |
| 4,468,932 | A | 9/1984 | Bullard | |

(Continued)

OTHER PUBLICATIONS

U.S. Department of Transportation Federal Aviation Administration, "Advisory Circular 91-76—Hazard Associated with Sublimation of Solid Carbon Dioxide (Dry Ice) Aboard Aircraft," Sep. 30, 2004.

(Continued)

*Primary Examiner* — Judy Swann
*Assistant Examiner* — Christopher R Zerphey

(57) ABSTRACT

A container system may comprise a container, a refrigerant tray, and refrigerant. The container may have a container interior. The refrigerant tray may be mountable within the container interior and may include a sublimation port. The refrigerant may be mounted within the refrigerant tray. The refrigerant may produce a cold gas upon sublimation of the refrigerant. The cold gas may pass through the sublimation port and enter into the container interior.

16 Claims, 52 Drawing Sheets

(56) References Cited

U.S. PATENT DOCUMENTS

| | | | |
|---|---|---|---|
| 4,773,230 A * | 9/1988 | Garrett | 62/237 |
| 4,958,500 A | 9/1990 | Kuroda et al. | |
| 5,704,485 A * | 1/1998 | Cautereels et al. | 206/546 |
| 6,141,982 A * | 11/2000 | Schwarz et al. | 62/237 |
| 6,422,673 B1 * | 7/2002 | Bienick | 312/408 |
| 7,444,830 B2 | 11/2008 | Moran et al. | |
| 7,458,441 B2 | 12/2008 | Hu | |
| 2004/0231355 A1 | 11/2004 | Mayer | |
| 2005/0188715 A1 * | 9/2005 | Aragon | 62/371 |
| 2005/0193760 A1 * | 9/2005 | Moran et al. | 62/371 |
| 2006/0005567 A1 * | 1/2006 | Lee et al. | 62/408 |
| 2006/0108757 A1 * | 5/2006 | Brookmire et al. | 280/47.34 |
| 2006/0218962 A1 * | 10/2006 | Marques et al. | 62/407 |
| 2007/0204645 A1 | 9/2007 | Balva et al. | |
| 2008/0042405 A1 * | 2/2008 | Hu | 280/659 |
| 2008/0172855 A1 | 7/2008 | Schalla | |
| 2008/0276840 A1 * | 11/2008 | Van Loon et al. | 108/33 |
| 2009/0044547 A1 * | 2/2009 | Oswald | 62/89 |

OTHER PUBLICATIONS

Techni Ice, "Techni Ice Reusable Dry Ice Packs/Gel Packs," available at <http://www.techniice.com/english/index.htm>, last visited Mar. 28, 2010.

PolyFoam Corporation, "Refrigerants" available at <http://www.polyfoamcorp.com/products/refrigerants>, last visited Mar. 28, 2010.

Entropy Solutions, Inc., "Technology", available at <http://www.entropysolutionsinc.com/technology.htm>, last visited Mar. 28, 2010.

Cold Chain Technologies, "Refrigerant Products", Feb. 1, 2009.

* cited by examiner

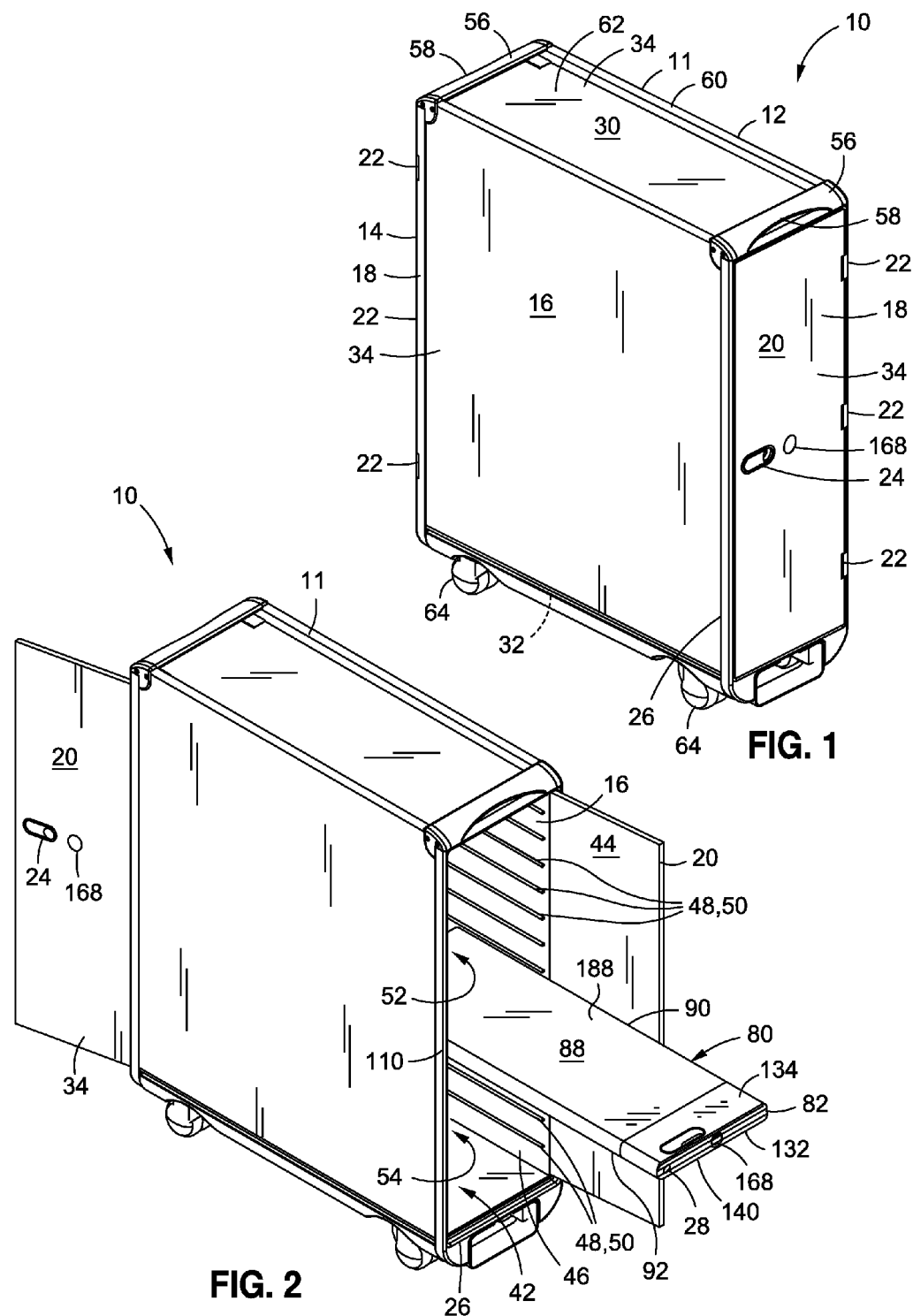

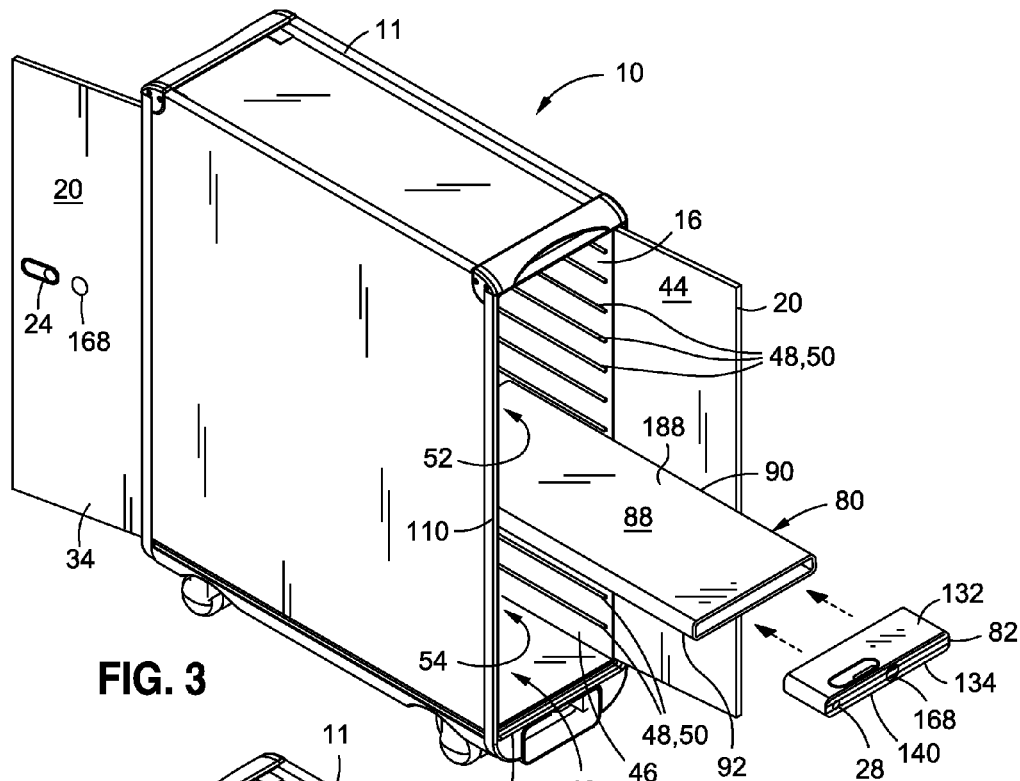
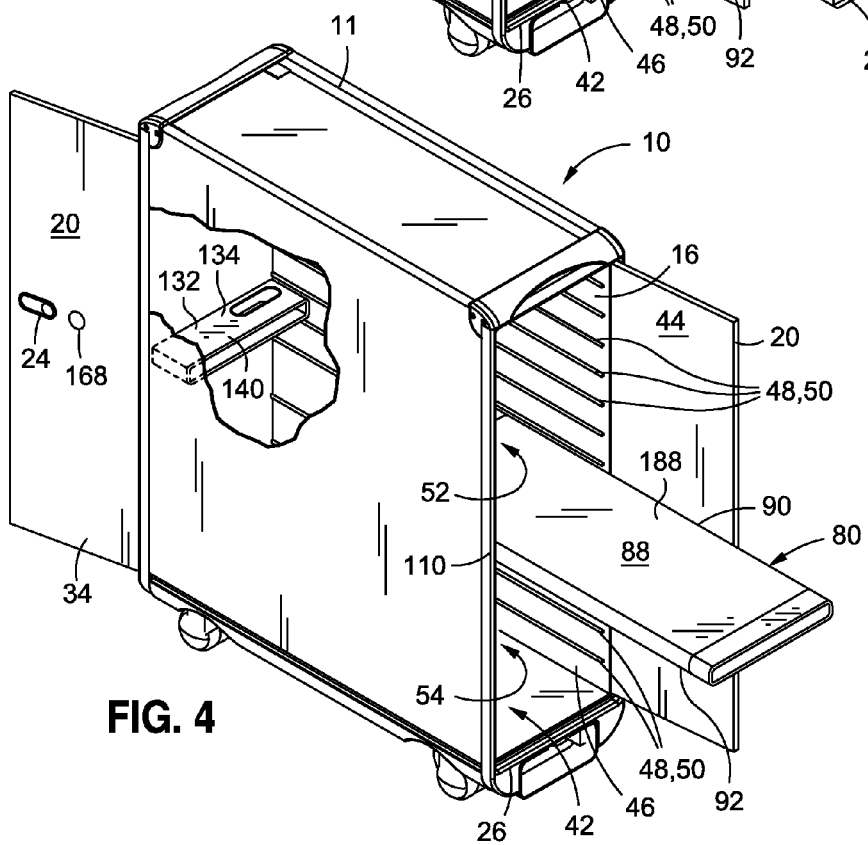

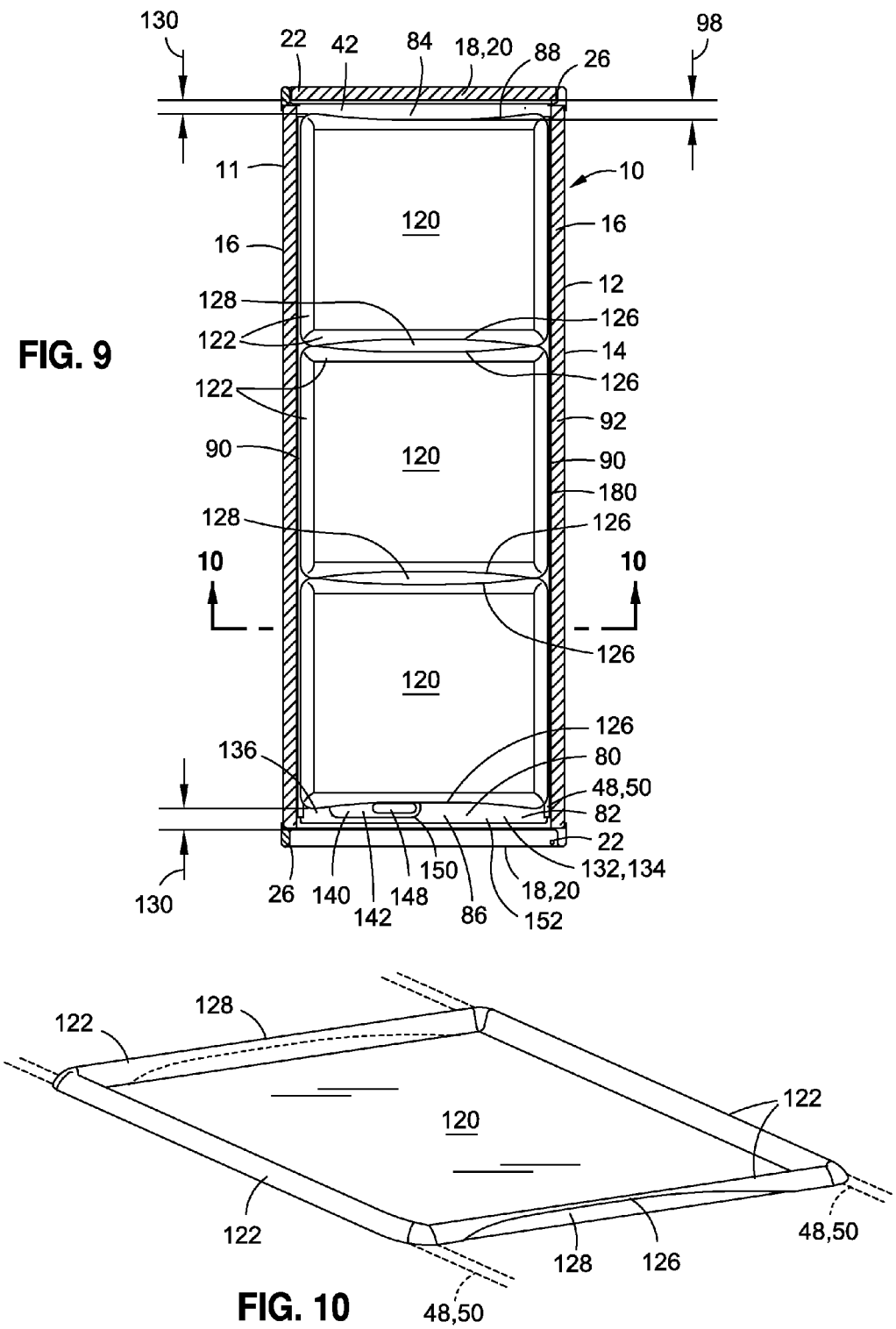

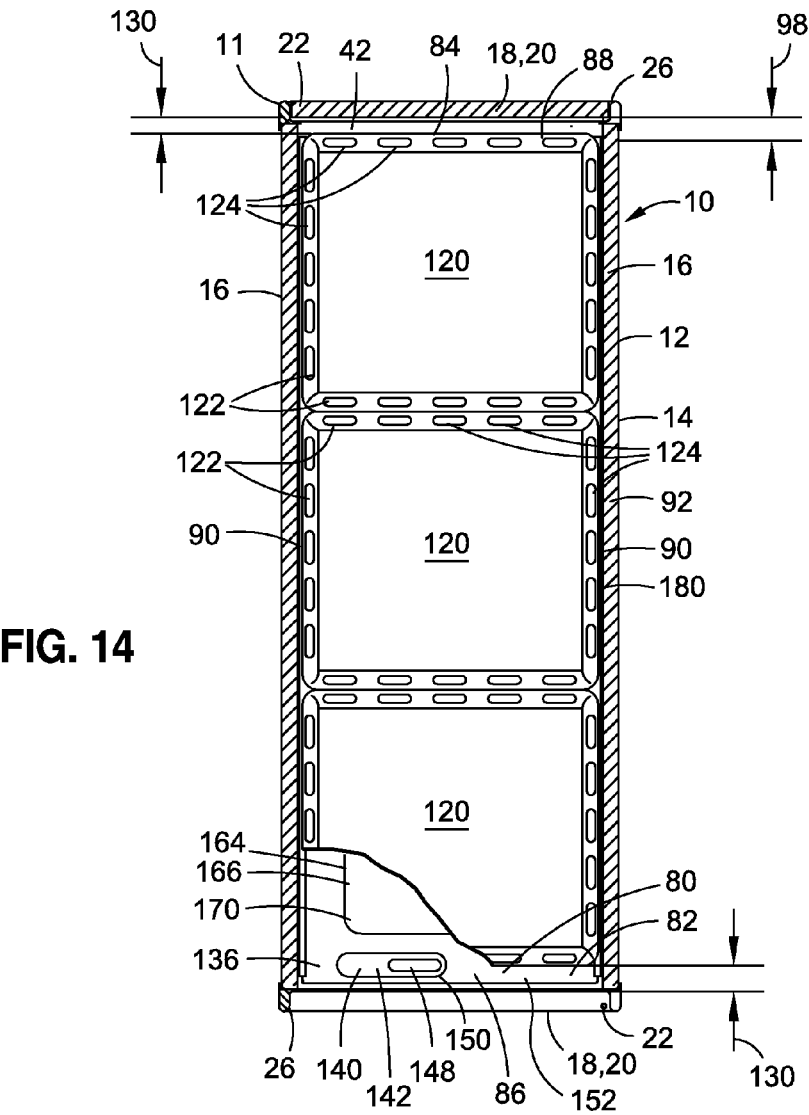
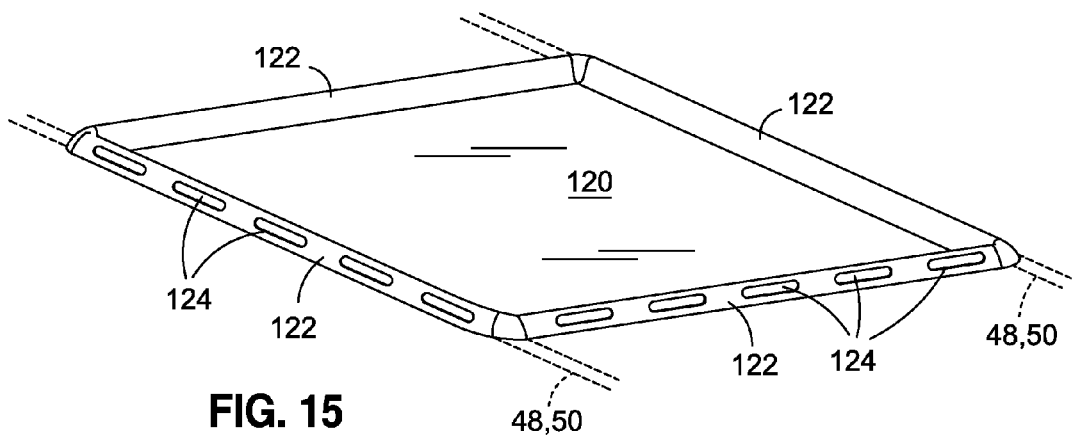

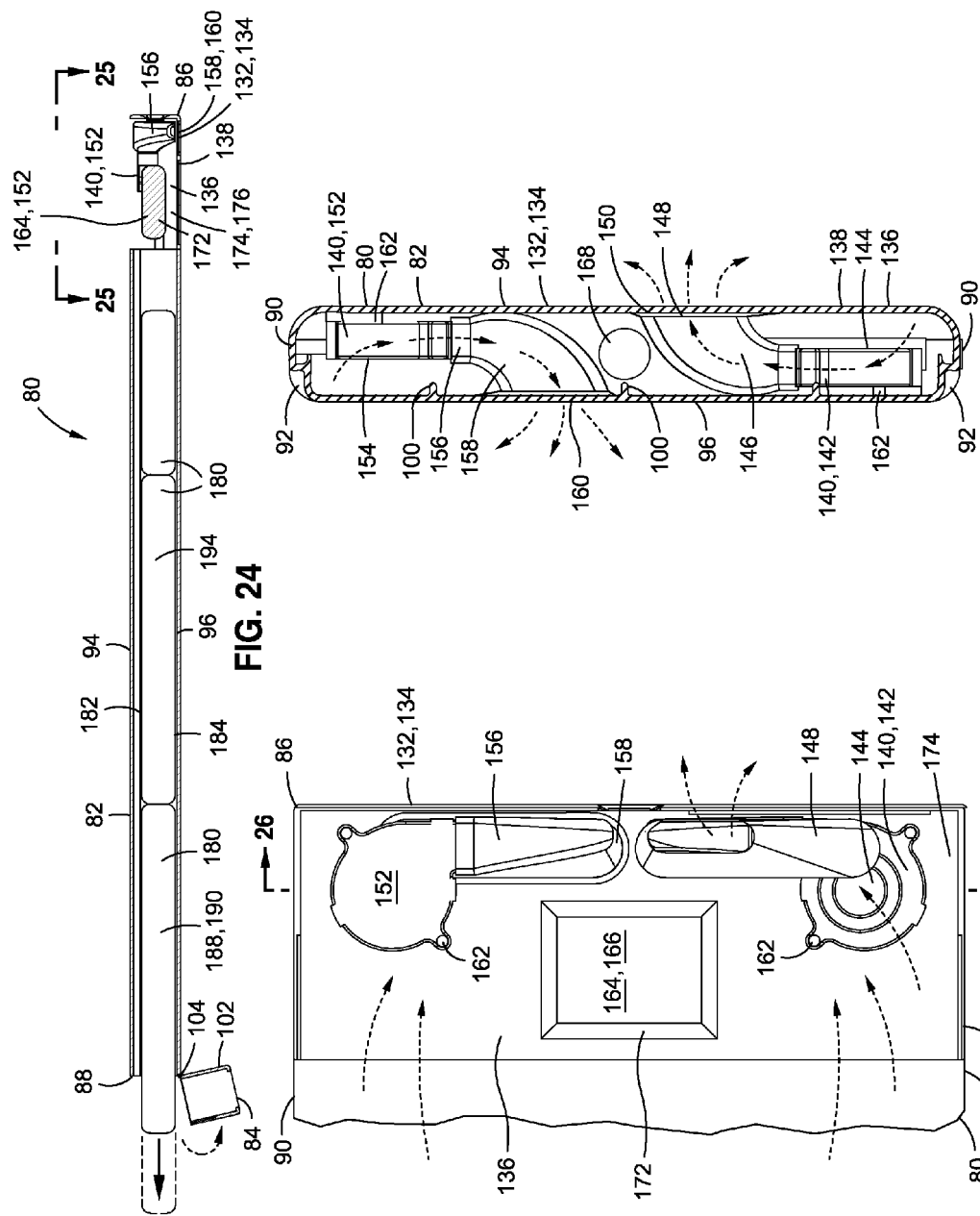

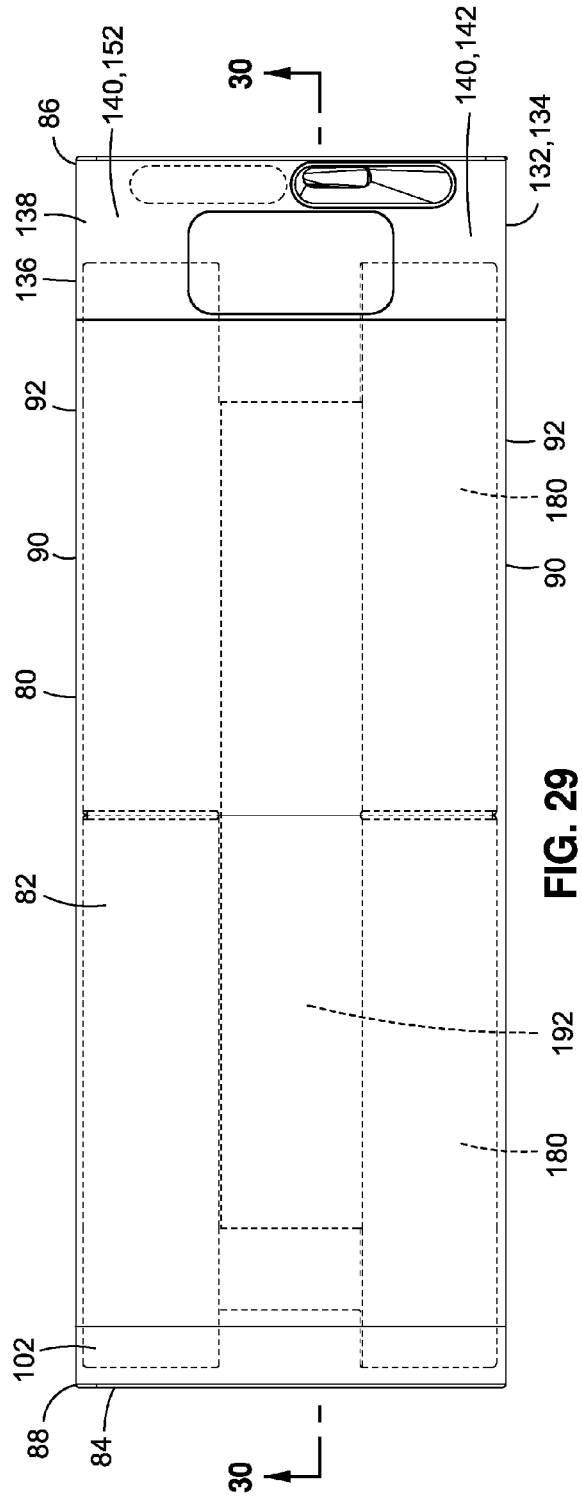
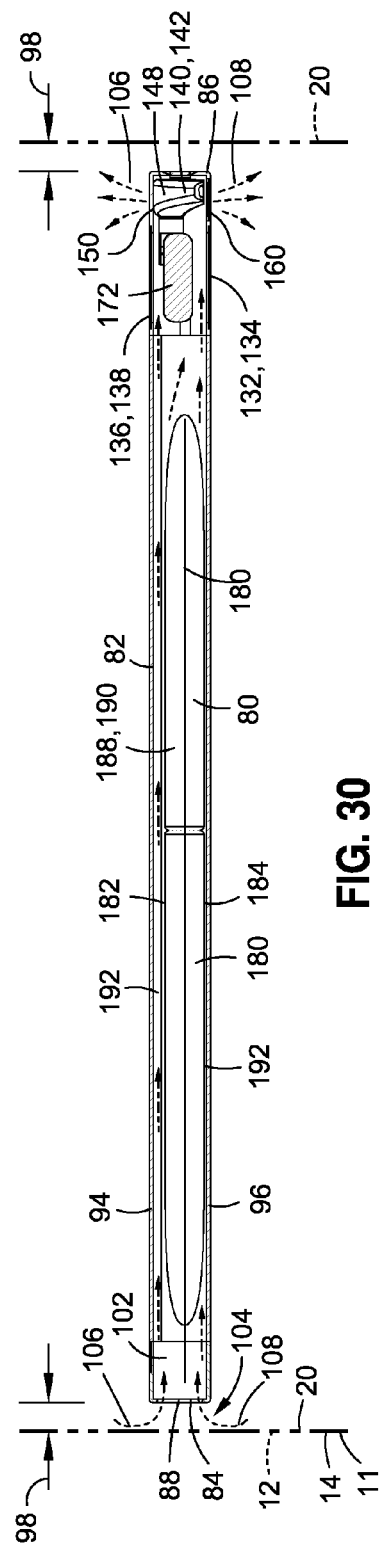

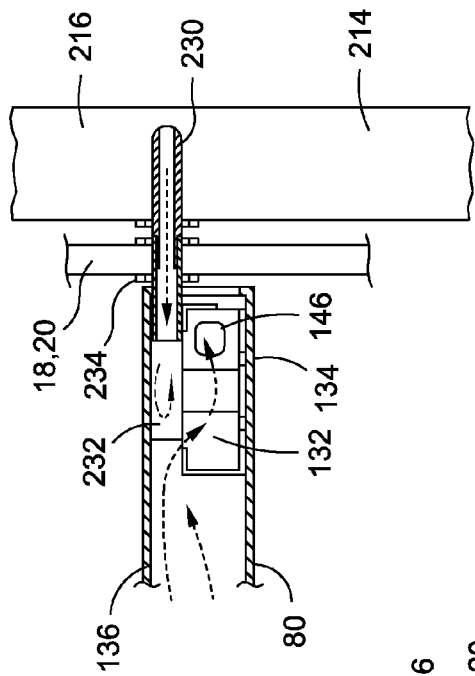
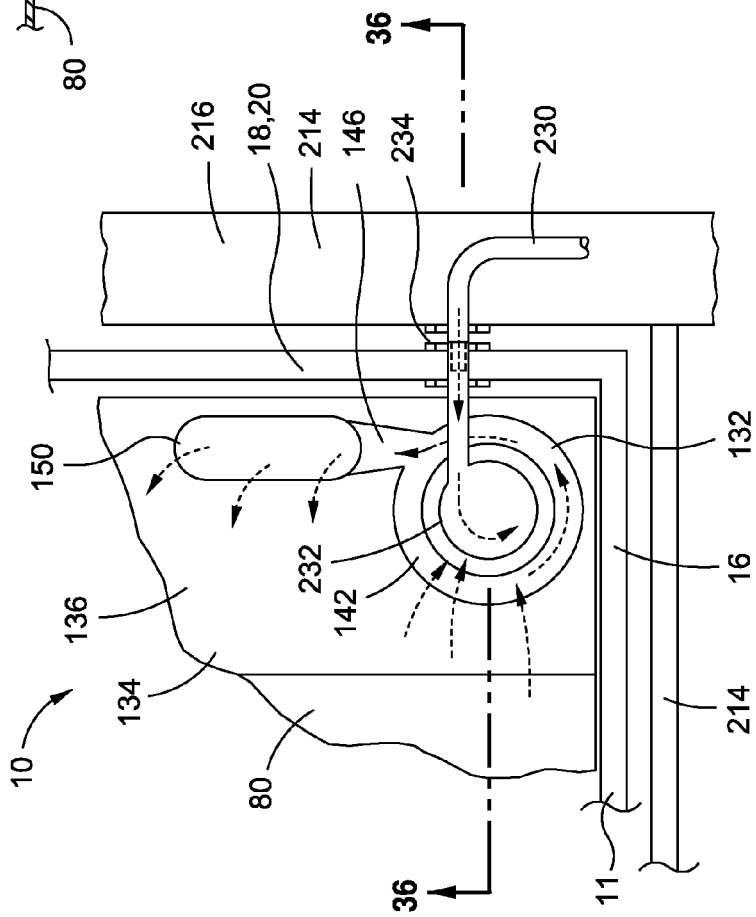

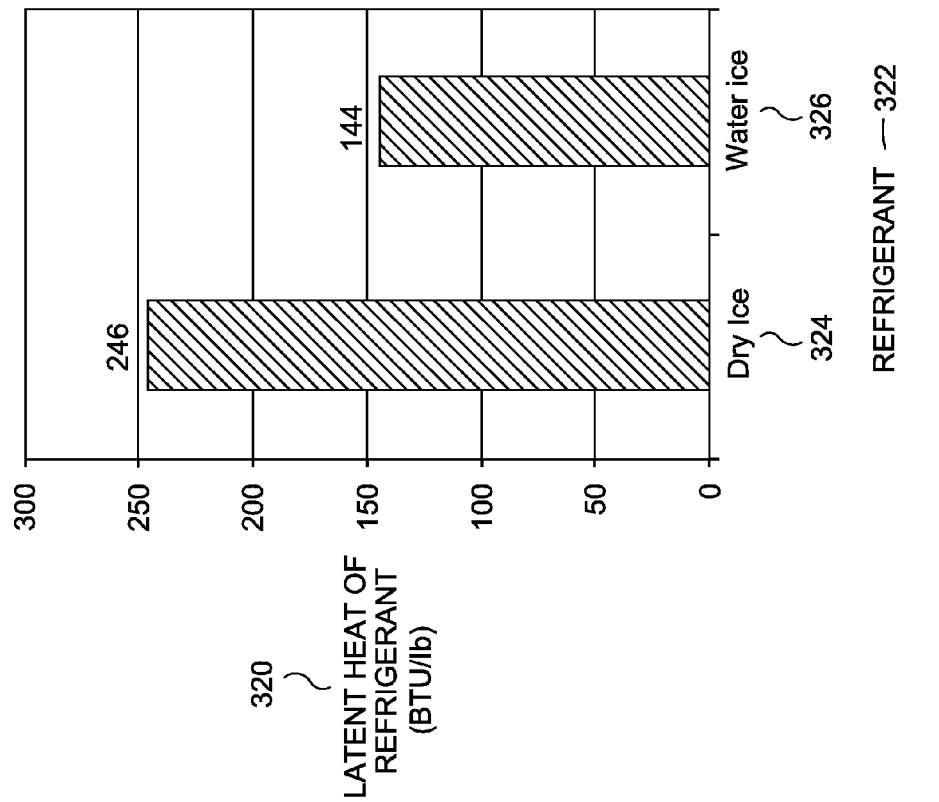

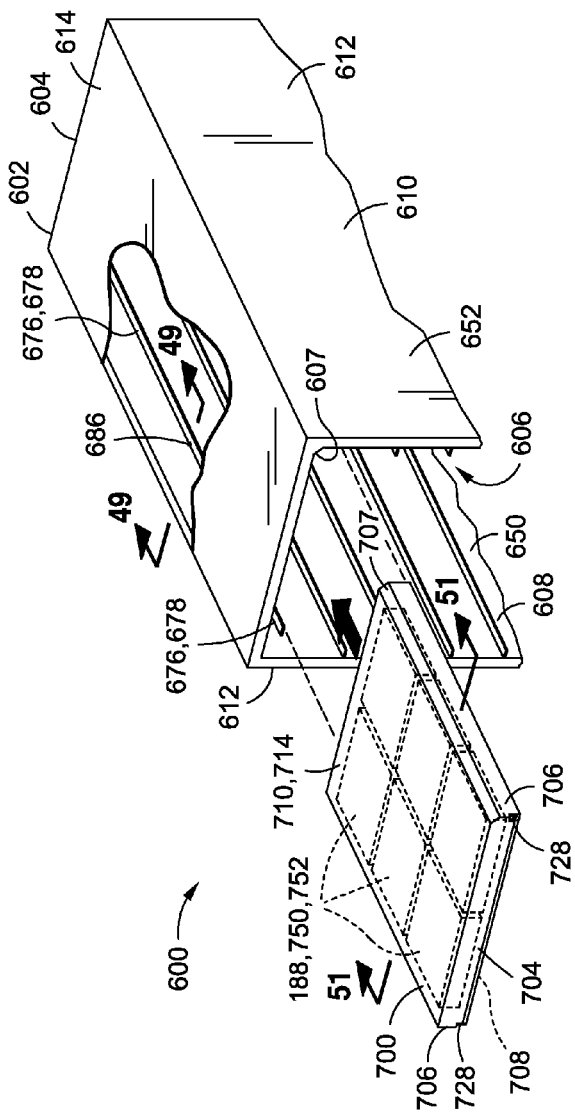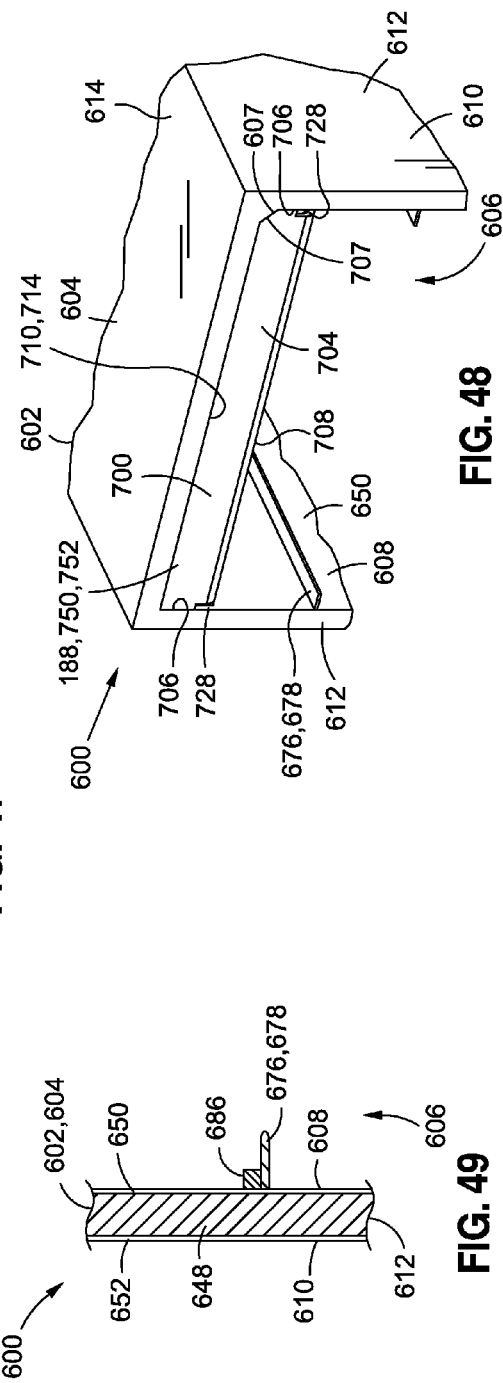

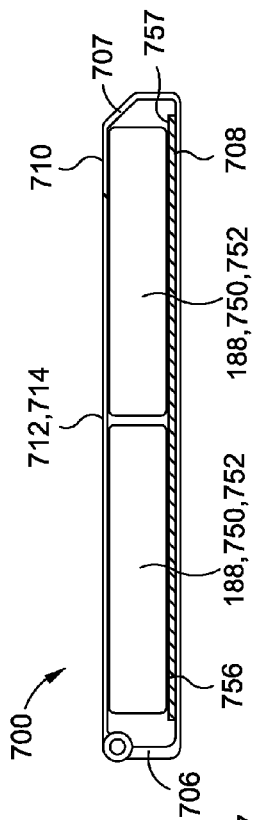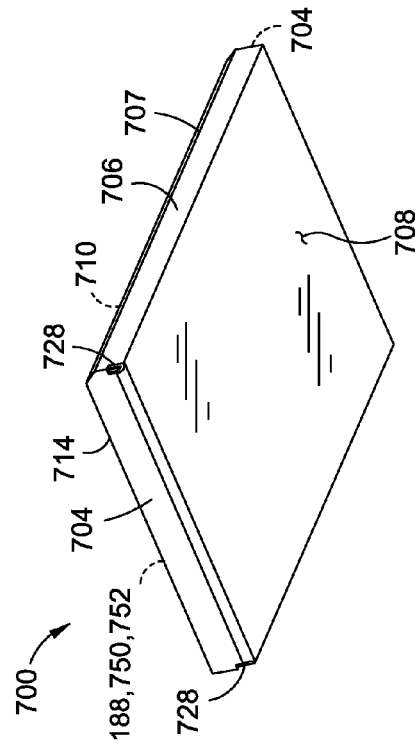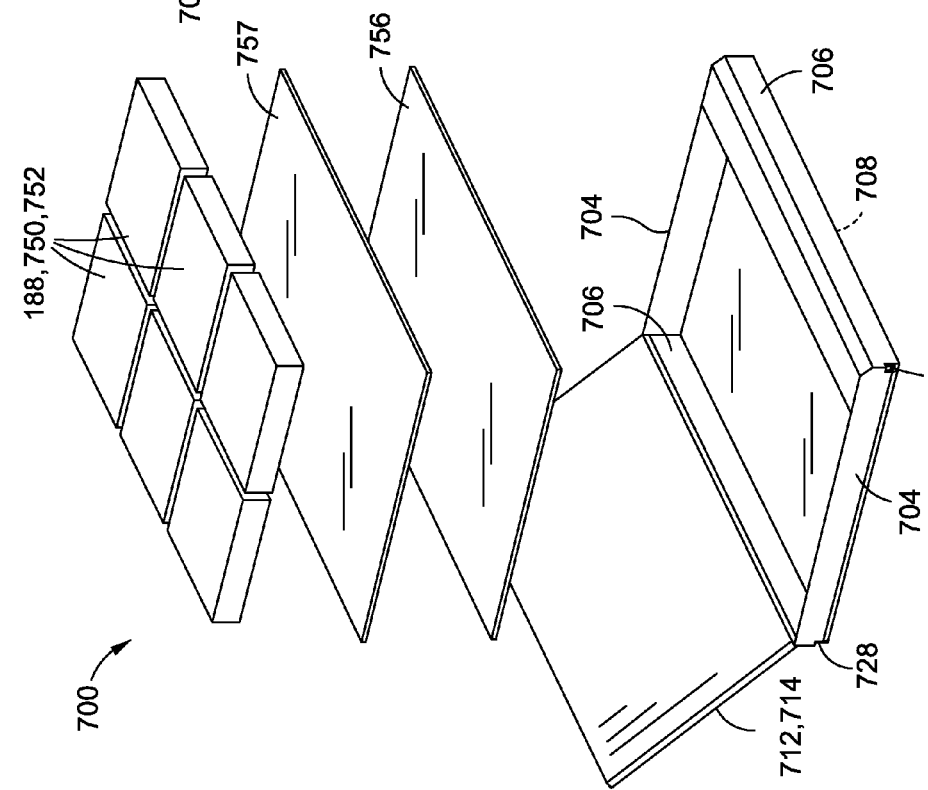

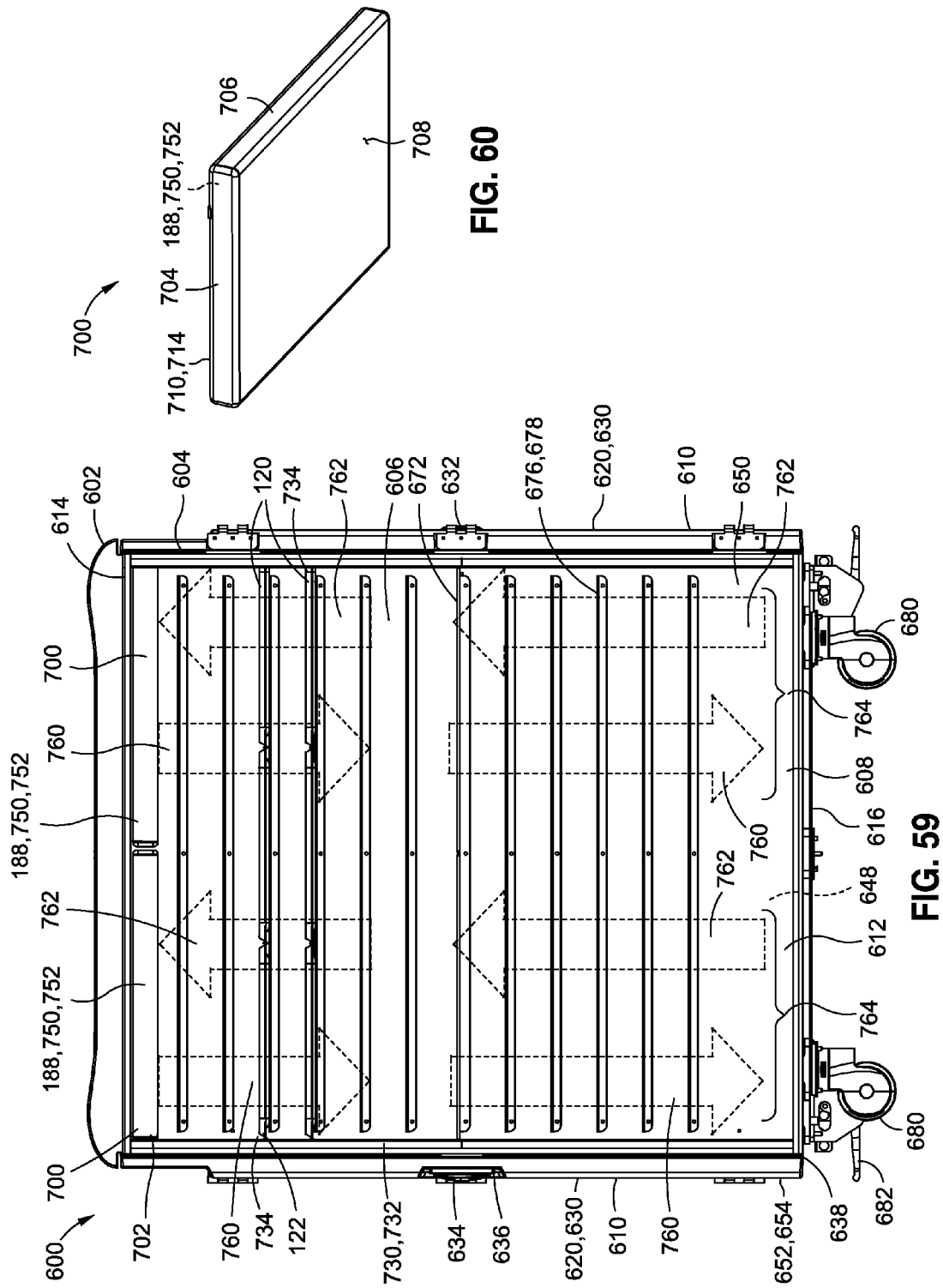

PASSIVELY COOLED CONTAINER SYSTEM AND METHOD

CROSS-REFERENCE TO RELATED APPLICATIONS

The present application is a continuation-in-part of and claims priority to pending U.S. patent application Ser. No. 12/778,096 entitled REFRIGERATED CONTAINER filed on May 11, 2010, the entire contents of which is incorporated by reference herein.

STATEMENT RE: FEDERALLY SPONSORED RESEARCH/DEVELOPMENT (Not Applicable)

FIELD

The present disclosure relates generally to galley systems and, more particularly, to a container for refrigerating items such as airline meals prior to distribution to passengers.

BACKGROUND

Aircraft galley carts are used to store food items such as airline meals for distribution to passengers by flight attendants. Airline meals are typically prepared offsite by a caterer who then delivers the meals to the aircraft just prior to departure. Airline operators are required to maintain food items at a safe temperature prior to distribution to passengers. For certain long-haul flights, the food items must be continuously maintained at relatively low temperatures (e.g., below 4 degrees Celsius) for extended periods of time such as up to 15 hours or longer as required by certain agencies.

Airline operators typically use one of several methods for maintaining the food items within the galley carts below a required minimum temperature. For example, the galley carts may be cooled by one or more galley chillers located in the galley area of the aircraft cabin. Each galley chiller produces cooled air which may be passed over and around the exterior of the galley cart to maintain the interior below a predetermined temperature. Alternatively, each one of the galley carts may be directly connected to an external duct or plenum in the galley area such that cooled air from the chiller unit is passed from the duct or plenum directly through the interior of the galley cart.

Although generally effective for their intended purposes, galley chillers possess certain drawbacks which detract from their overall utility. For example, each one of the galley chillers includes an active mechanical refrigeration unit for producing cooled air to be passed over or passed through each galley cart. The mechanical refrigeration units add to the overall weight of the aircraft reducing payload capacity and increasing fuel consumption. In addition, mechanical refrigeration units typically produce noise that adds to aircraft cabin noise and reduces passenger comfort. A further drawback associated with conventional galley chillers is that the refrigeration units and associated ducting occupy valuable space in the galleys which reduces the total amount of cabin area available for passenger seating.

Additional drawbacks associated with conventional galley chillers include relatively high manufacturing and installation costs due to the complexity of the mechanical refrigeration units. Furthermore, the mechanical refrigeration units typically require routine maintenance at regular service intervals which adds to the operating costs of the aircraft. In addition, the mechanical refrigeration units may consume significant amounts of electrical power which must be provided by the aircraft power system. For example, a single conventional galley chiller installed in an aircraft may draw approximately 4 kilowatts of power from the aircraft power system. To accommodate the power requirements, the galley chiller may require heavy gauge electrical feeder lines and associated circuit breakers, all of which adds to the weight and space requirements of the aircraft.

As can be seen, there exists a need in the art for a system and method for maintaining food items on an aircraft below a desired temperature for extended periods of time and which eliminates the need for galley chillers and their associated mechanical refrigeration units, electrical feeder lines and other hardware. In this regard, there exists a need in the art for a galley cart capable of maintaining the cart interior at a relatively low temperature for extended durations and which is low in cost, simple in construction and which occupies a minimal amount of cabin space.

BRIEF SUMMARY

The above-noted needs associated with galley carts are specifically addressed and alleviated by the present disclosure which, in an embodiment, provides a cold tray that may be installed within an interior of a container. In an embodiment, the container may be configured as a galley cart although the container may be provided in any one of a variety of different configurations which may be implemented in any vehicular or non-vehicular application for use in any industry. The cold tray may comprise a substantially hollow cold tray housing which may be removably mounted within the interior of the container. The cold tray housing may contain a refrigerant and may be fluidly connectable to an air flow source which may draw air from the container interior into the cold tray housing such that the air passes over the refrigerant causing the air to be cooled. The cooled air may then be discharged back into the container interior.

In a further embodiment, the present disclosure includes a container system which may comprise a container having a container interior such as for storing food or other items. The container may include a cold tray that may be mounted within the container interior. The cold tray may include a refrigerant. The container system may further include an air flow source for drawing air from the container interior into the cold tray such that the air passes over the refrigerant and is directed back into the container interior.

In a further embodiment, the present disclosure includes a method of refrigerating an interior of a container. The method may comprise the step of mounting a cold tray within the interior of the container. The cold tray may include a refrigerant. The method may further include the step of drawing air from the container interior into the cold tray such that the air passes over the refrigerant. The method may further comprise discharging the air from the cold tray back into the container interior.

Also disclosed is a passively cooled container system which may comprise a container, a refrigerant tray, and refrigerant. The container may have a container interior. The refrigerant tray may be mountable within the container interior and may include a sublimation port. The refrigerant may be mounted within the refrigerant tray. The refrigerant may produce a cold gas upon sublimation of the refrigerant. The cold gas may pass through the sublimation port and enter into the container interior.

In a further embodiment, disclosed is an aircraft which may include a passively-cooled movable container and at least one refrigerant tray. The container may include a container interior and may be configured to contain a plurality of food trays. The container may be formed of a plurality of vacuum insulated panels enclosing the container interior. The refrigerant tray may contain refrigerant and may be mounted within the container interior above at least one of the food trays. The refrigerant tray and the container may be configured to cooperatively maintain the air temperature within the container interior at less than approximately 4° C. for a period of at least approximately 15 hours in an environment having an ambient air temperature of greater than approximately 29° C.

Also disclosed is a method of refrigerating an interior of a container. The method may include the step of mounting a refrigerant tray within the container interior. The refrigerant tray may have a sublimation port and may contain a refrigerant. The method may additionally include the step of sublimating the refrigerant to produce a cold gas. The method may also include the step of passing the cold gas through the sublimation port and into the container interior for cooling thereof.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective illustration of a container system in an embodiment;

FIG. 2 is a perspective illustration of the container system in an embodiment comprising a container configured as an insulated galley cart and including a cold tray which is mountable within a container interior of the galley cart;

FIG. 3 is a perspective illustration of the container system in an embodiment having a fan module that may be separately mounted to the container and fluidly connected to the cold tray;

FIG. 4 is a perspective illustration of the container system in an embodiment wherein the fan module is integrated into the container body;

FIG. 9 is a top sectional illustration of the container system taken along line 9-9 of FIG. 6 and illustrating an embodiment of the food trays having scallops formed along perimeter lips of the food trays to provide food tray air gaps;

FIG. 10 is a perspective illustration of an embodiment of the food tray having scallops formed along the perimeter lips of the food tray;

FIG. 14 is a top sectional view of the galley cart illustrating an embodiment of the food trays having a plurality of vent holes formed in the perimeter lips to facilitate the flow of air between layers of the food trays;

FIG. 15 is a perspective illustration of the embodiment of the food tray having the vent holes;

FIG. 24 is a side sectional illustration of the cold tray taken along line 24-24 of FIG. 22 and illustrating the plurality of cold packs housed within the cold tray housing and further illustrating the end frame pivoted downwardly to allow for removal of the cold packs from the cold tray housing;

FIG. 25 is a top view of a fan compartment of the cold tray including the upper and lower fans;

FIG. 26 is a sectional illustration of the cold tray taken along line 26-26 of FIG. 25 and illustrating the flow of air from the cold tray housing toward the upper and lower fans prior to discharge of the air from upper and lower fan outlets;

FIG. 29 is a top view of the cold tray taken along line 29-29 of FIG. 27 and illustrating the cold pack housed within the cold tray housing;

FIG. 30 is a side sectional illustration of the cold tray taken along line 30-30 of FIG. 25 and illustrating the flow of air from the container interior into the cold tray air inlet and along the cold tray housing prior to discharge by the upper and lower fans;

FIG. 35 is a top sectional illustration of an embodiment having an air supply fluidly connected to a turbine that is coupled to the circulation fan mounted within the fan module of the galley cart;

FIG. 36 is a side sectional illustration of the galley cart and galley structure taken alone line 36-36 of FIG. 35 and illustrating the interconnection of the air supply to the circulation fan;

FIG. 37 is an illustration of a graph comparing the latent heats of dry ice and water ice;

FIG. 47 is a perspective illustration of the container system in an embodiment including a refrigerant tray having a tray chamfer for mounting within a cart having a container chamfer for controlling the orientation of the refrigerant tray within the container interior;

FIG. 48 is a perspective illustration of the container system showing the refrigerant tray of FIG. 47 installed in the container and the tray chamfer nesting within a container chamfer;

FIG. 49 is a sectional view of the container taken along line 49 of FIG. 47 and illustrating a stopper mechanism mounted to the container interior for controlling the depth of installation of the refrigerant tray within the container interior;

FIG. 50 is an exploded perspective illustration of the refrigerant tray having a thermal regulator mounted between the refrigerant and the thermal isolator;

FIG. 51 is a cross sectional view of the refrigerant tray illustrated in FIG. 47;

FIG. 52 is a bottom perspective view of the refrigerant tray illustrated in FIG. 47 and showing the sublimation ports located at corners of the refrigerant tray;

FIG. 59 is a side view of the container system having refrigerant trays formed without openings as shown in FIG. 60 and illustrating cold air cooled by contact with the refrigerant trays and sinking within the container to displace warm air and cause the rising of the warm air toward the dry icy trays;

FIG. 60 is a is a bottom perspective illustration of an embodiment of the refrigerant tray lacking openings or sublimation ports;

DETAILED DESCRIPTION

Figure 5:
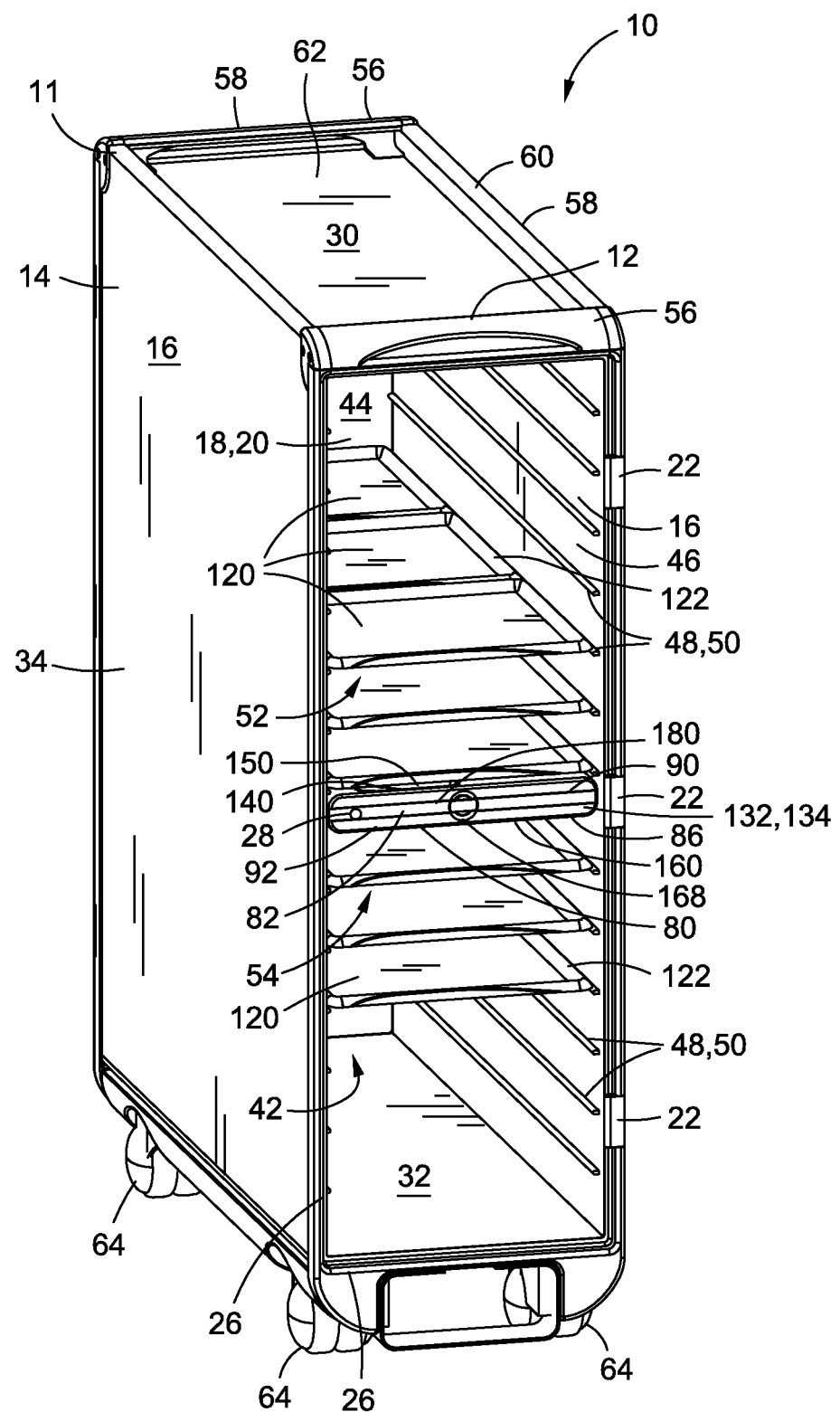
FIG. 5 is a perspective illustration of the container system illustrating the cold tray positioned at an approximate mid-height of the container interior and further illustrating a plurality of food trays mounted on tray supports within the container interior.

Referring now to the drawings wherein the showings are for purposes of illustrating preferred and various embodiments of the disclosure, shown in FIGS. 1-8 is a container system 10 as may be used in an aircraft cabin. The container system 10 may comprise an insulated galley cart 12 housing a cold tray 80 (FIG. 2) containing refrigerant (FIG. 2). The cold tray 80 is insertable within a container interior 42 of the galley cart 12 for maintaining food or other items stored within the galley cart 12 at a safe temperature. The cold tray 80 comprises a self-contained cooling unit that, when installed within the galley cart 12, may maintain the air temperature of the container interior 42 below a desired temperature. For example the cold tray 80 may maintain the container interior 42 at between approximately 0° C. and approximately 7° C. for extended durations of up to 15 hours or longer. However, the galley cart 12 and the cold tray 80 may be configured to maintain the air temperature of the container interior 42 at temperatures below 0° C. In this regard, the refrigeration capabilities of the container system 10 may be dependent in part upon the cooling capacity of the cold tray 80 and the insulative properties of the container body 14 as described in greater detail below.

Figure 23:
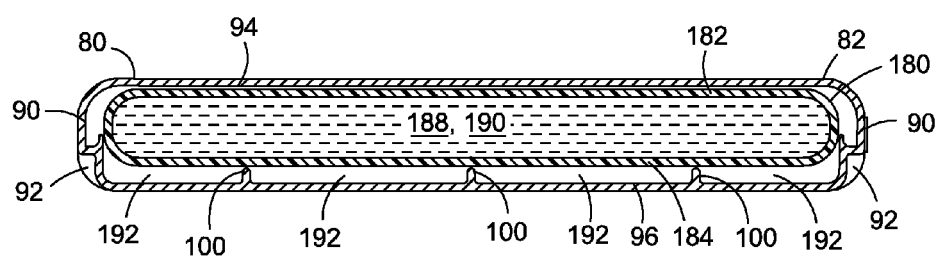
FIG. 23 is a cross-sectional illustration of the cold tray taken along line 23-23 of FIG. 22 and illustrating the refrigerant contained within one of the cold packs.

Referring briefly to FIG. 23, the cold tray 80, in an embodiment, may comprise a generally hollow member for containing refrigerant 188. The refrigerant 188 may comprise a phase change material 190 which may undergo a phase change to absorb heat from the air in proximity to the refrigerant 188. In an embodiment, the cold tray 80 may be fluidly coupled or connected to an air flow source 132 such as a fan module 134 having one or more circulation fans 140 such an upper fan 142 and a lower fan 152. For example, as illustrated in FIG. 2, the cold tray 80 and fan module 134 may be integrated into an assembly that may be removably mounted in the container interior 42.

Referring to FIG. 3, in an alternative embodiment, the fan module 134 may comprise a separate assembly that may be mounted within the container interior 42 as a standalone unit. The fan module 134 may be fluidly coupled to the cold tray 80. The cold tray 80 may be provided with an opening that fluidly communicates with the fan module 134. When the fan module 134 is activated, air may be drawn through the cold tray housing 82 such that the air passes over the refrigerant 188 under the influence of a circulation fan 140 in the fan module 134. The air may then be discharged back into the container interior 42 for cooling the contents of the container 11.

Referring to FIG. 4, in a further non-limiting embodiment, the fan module 134 may be integrated into the container 11. For example, the fan module 134 may be fixedly mounted or integrated into side walls 16 and/or end walls 18 of the container interior 42 as shown in FIG. 4. The cold tray 80 may be installed within the container interior 42 and may be fluidly coupled to the fan module 134. Upon activation of the circulation fan 140, air may be drawn into the cold tray housing 82 such that the air flows past the refrigerant 188 causing the air to be cooled prior to discharge back into the container interior 42. Although FIG. 4 illustrates the fan module 134 as being mounted adjacent to one end of the container interior 42, the fan module 134 may be installed at any horizontal or vertical location within the container interior 42. Furthermore, the fan module 134 may be provided in any size, shape and configuration and is not limited to that which is shown in FIGS. 2-4. For example, the fan module 134 may be integrated into one or more of the side walls 16, end walls 18 and/or top and bottom walls 30, 32 that make up the container body 14. Even further, the fan module 134 may be integrated into an interior and/or an exterior of the side walls 16, end walls 18 or top and bottom walls 30, 32 of the container body 14.

Figure 6:
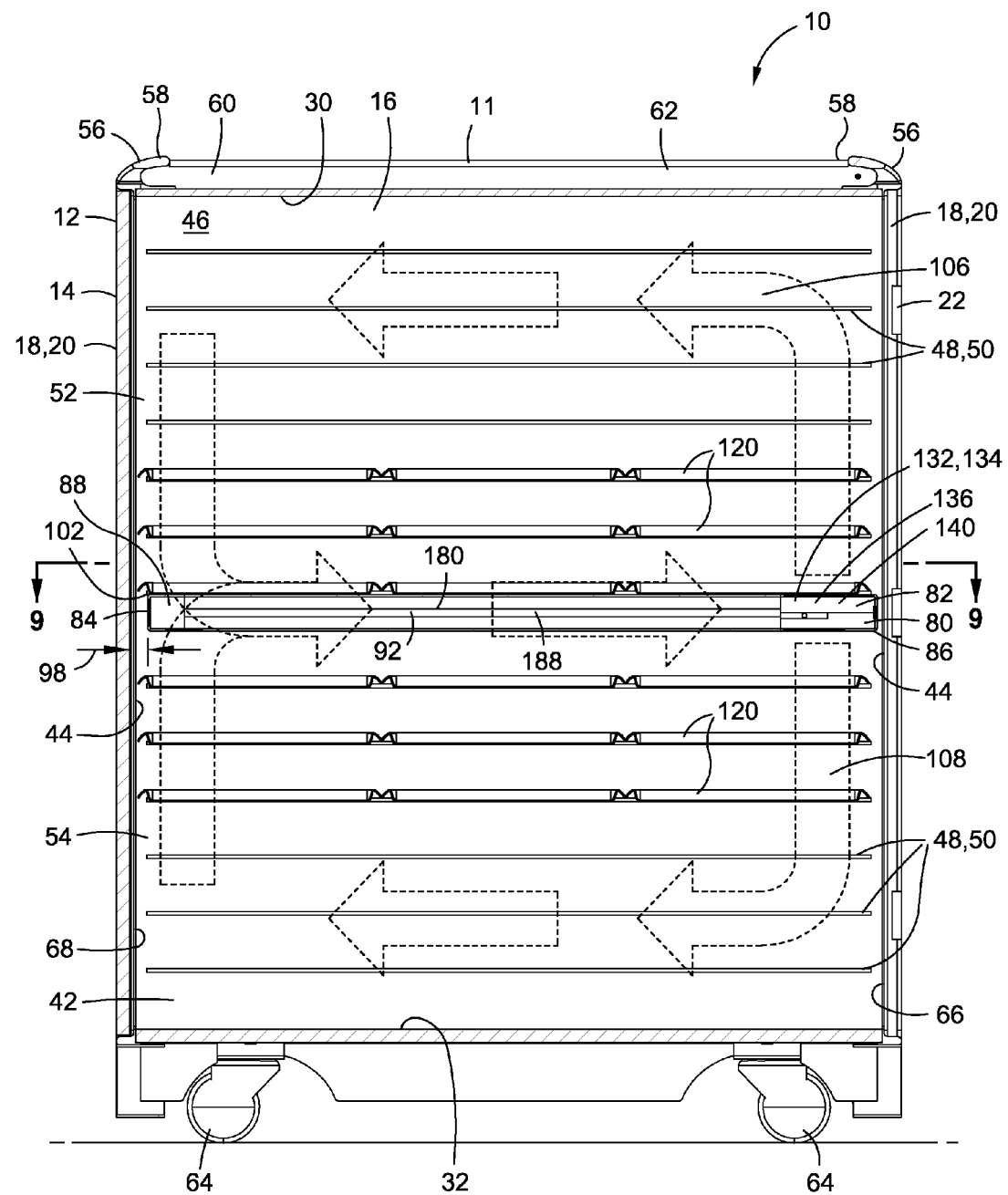
FIG. 6 is a side view of the galley cart illustrating counter rotating upper and lower airflow circuits generated by an air flow source comprising at least one circulation fan.
Figure 7:
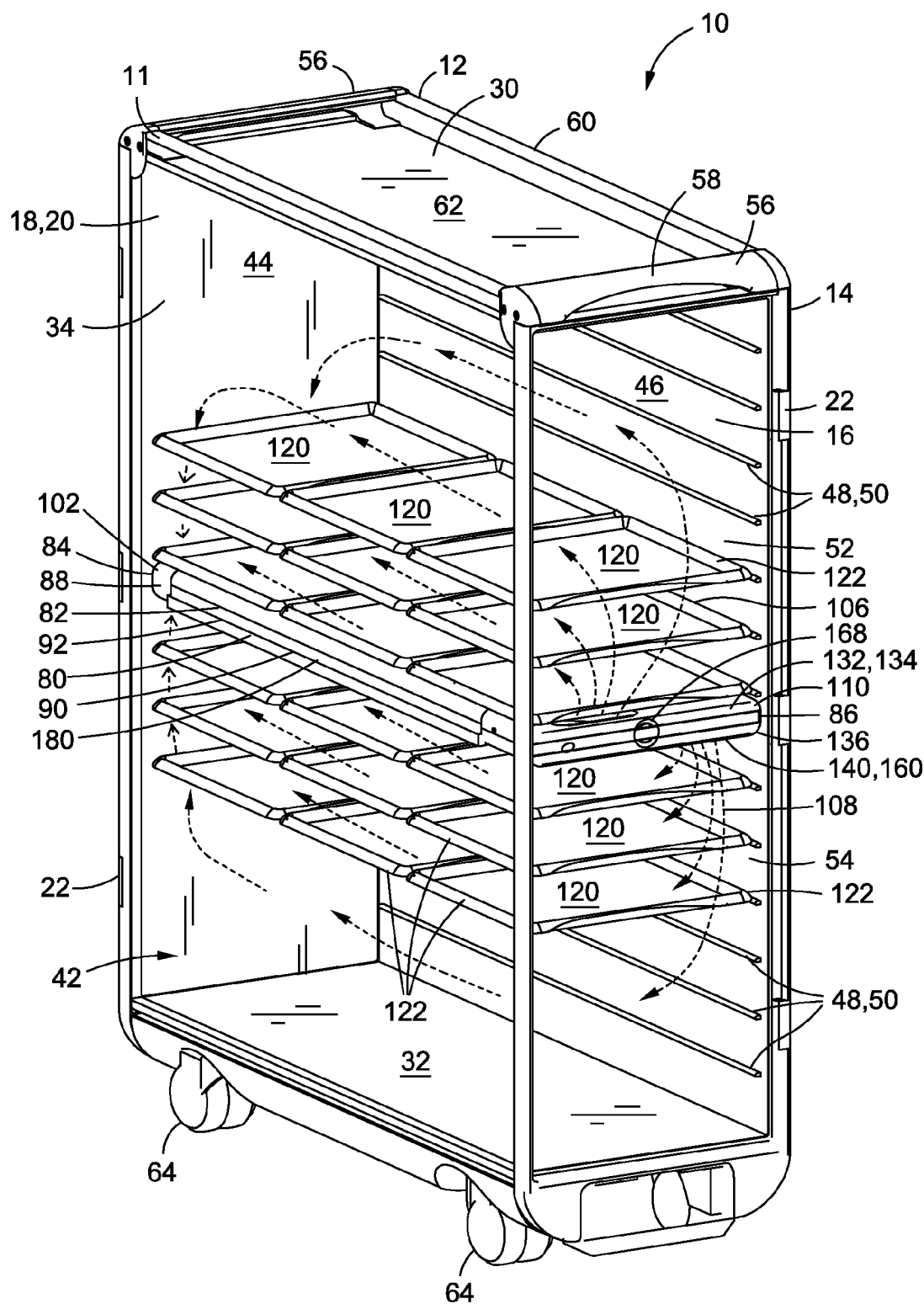
FIG. 7 is a top perspective illustration of the container system having a side wall removed to illustrate the flow of air between the food trays.

Referring to FIGS. 2-4, the cold tray 80 may be fluidly connectable to any suitable air flow source 132 such as the above-described fan module 134 for drawing air from the container interior 42 into the cold tray housing 82. For example, as indicated above, the fan module 134 may comprise at least one air circulation fan 140 that may be mounted to or within the fan module 134 although the circulation fan 140 may be mounted to the cold tray 80, the container 11 or any combination thereof. The fan module 134 may draw air into the cold tray housing 82 and discharge cooled air back into the container interior 42 as best illustrated in FIGS. 6-7. In this regard, the circulation fan 140 may draw air from the container interior 42 into a cold tray air inlet 84 formed on an end of the cold tray 80. As indicated above, the cold tray 80 may be configured such that the air that is drawn into the cold tray air inlet 84 passes over the refrigerant 188 causing the air to cool as the air flows through the cold tray housing 82 from the back end 88 toward the front end 86 of the cold tray 80.

Referring to FIG. 2, the container system 10 may be configured to allow for the selective mounting of the cold tray 80 and the fan module 134 at any vertical location within the container interior 42. In this manner, the container system 10 may facilitate a substantially uniform temperature distribution within the container interior 42. In an embodiment, the cold tray 80 may be installed at an approximate mid-height 110 of the container interior 42 as illustrated in FIG. 2. The cold tray 80 essentially divides the interior volume of the container interior 42 into upper and lower portions 52, 54 as shown in FIG. 6.

Referring to FIG. 6, in an embodiment, the air flow source 132 may include the circulation fan 140 which may comprise upper and lower fans 142, 152 for discharging cooled air into respective ones of the upper and lower airflow circuits 106, 108. Air discharged by the upper fan 142 establishes the upper airflow circuit 106 as best seen in FIG. 6. Likewise, air discharged by the lower fan 152 establishes the lower airflow circuit 108. Although the embodiment of the cold tray 80 disclosed herein includes upper and lower fans 142, 152, any number of circulation fans 140 may be provided for discharging air in any direction within the container interior 42.

Figure 22:
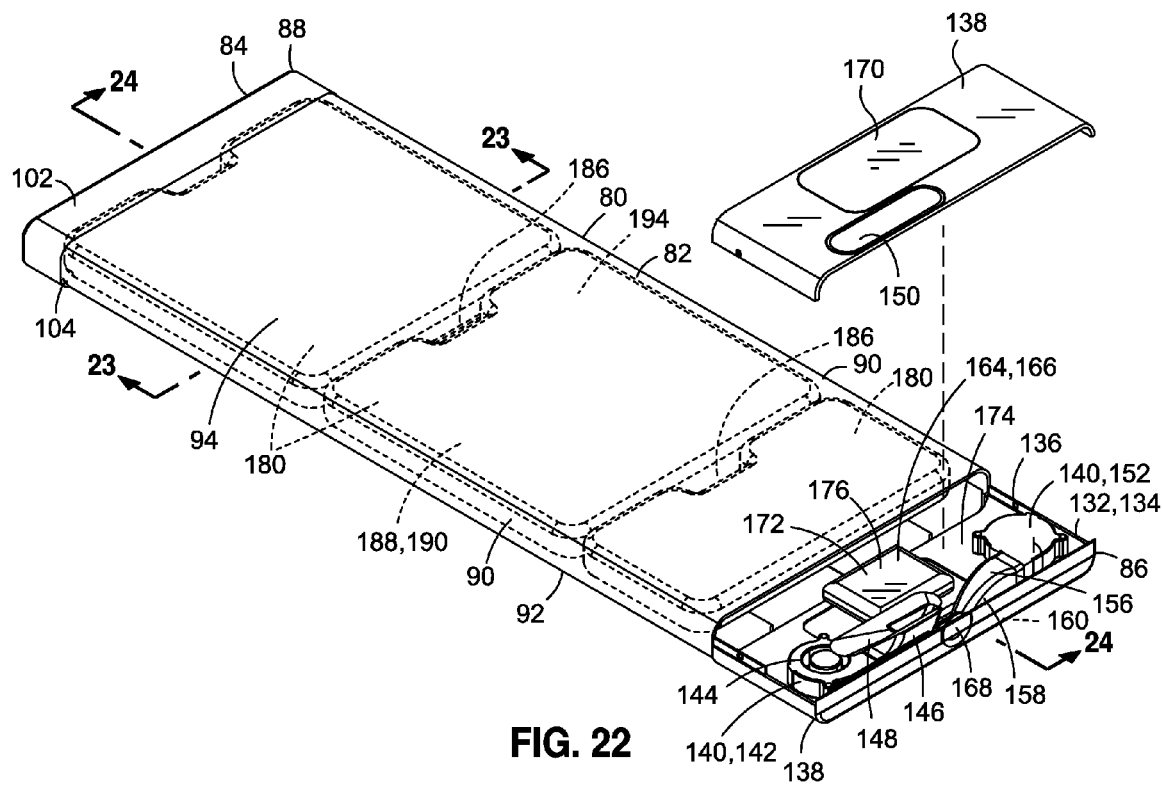
FIG. 22 is a perspective illustration of the cold tray in an embodiment having a plurality of cold packs containing refrigerant.

Referring briefly to FIG. 22, an embodiment of the cold tray 80 may include a logic circuit 172 which may be communicatively coupled to one or more thermostats 176 and/or temperature sensors 174 to sense the air temperature of the container interior 42 or the temperature of the food or other items within the container interior 42 and activate the upper and lower fans 142, 152 in order to maintain the air temperature within the container interior 42 at or below a desired value. Toward this end, an embodiment of the cold tray 80 may further include a power source 164 such as a battery pack 166 which may be disposed within or mounted to the cold tray 80 for powering the upper and/or lower fans 142, 152 on an as-needed basis in response to signals provided by the logic circuit 172. Alternatively, the upper and lower fans 142, 152 may be activated according to a preprogrammed operating schedule. The upper and lower fans 142, 152 may also be manually activated. The upper and lower fans 142, 152 are preferably activated such that the air temperature of the container interior 42 may be maintained at a substantially uniform temperature.

Figure 21:
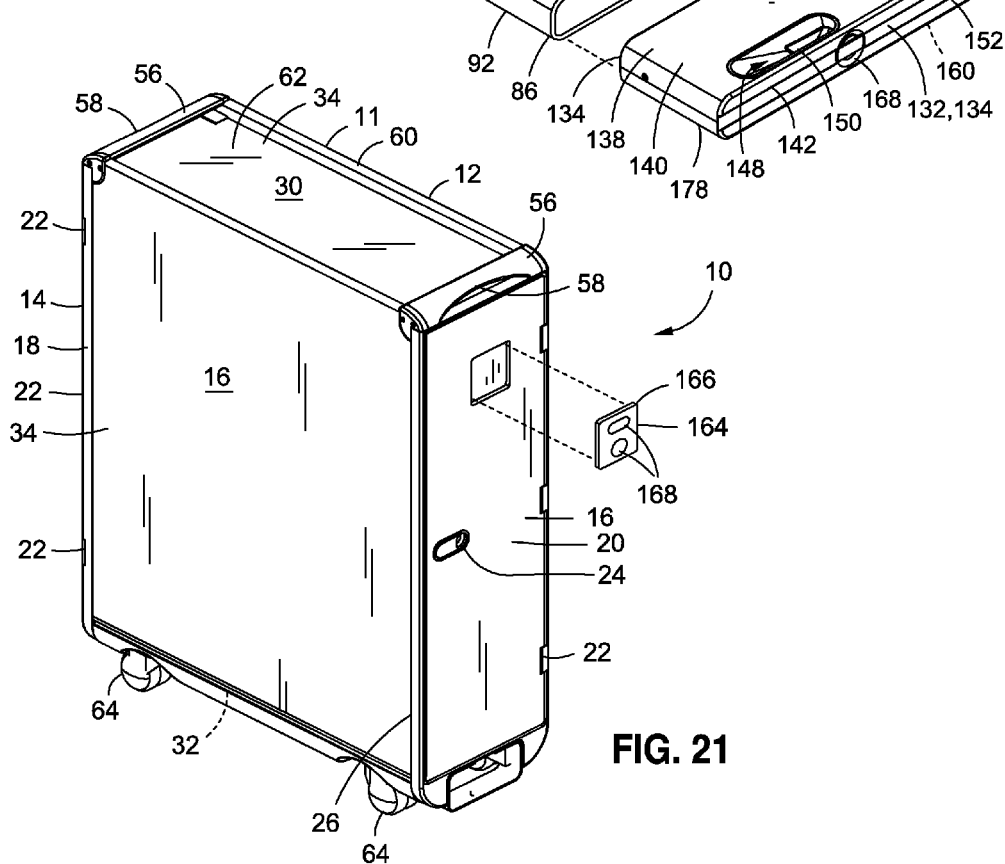
FIG. 21 is a perspective illustration of the container system in an embodiment having a battery pack that is detachably mounted to the container body.

In an embodiment, the battery pack 166 may be configured to be replaceable and/or rechargeable. For example, the fan module 134 may include an access panel 170 as best seen in FIG. 22 to allow access to the battery pack 166. Alternatively, the battery pack 166 may be mounted to an exterior of the container 11 such as to one of the cart doors 20 as illustrated in FIG. 21. However, the battery pack 166 may be mounted at any suitable location on the interior or exterior of the container 11 or at any location on the fan module 134 or cold tray 80. By including the battery pack 166, the cold tray 80 may eliminate the need for external power such as from an aircraft power system. However, it is contemplated that the container system 10 may be coupled to an external power source such as by direct or indirect (e.g., wireless) connection for powering of the upper and lower fans 142, 152.

Referring briefly to FIGS. 5-6, in an embodiment, the upper and lower portions 52, 54 of the interior may be maintained at different temperatures. For example, the upper portion 52 may contain items such as perishables that require refrigeration at 7° C. or below such as at less than 4° C. The lower portion 54 may contain items such as non-perishables that tolerate a relatively higher refrigeration temperature such as 12° C. The upper and lower portions 52, 54 may be maintained at different temperatures by operating the fans 142, 152 to provide differential amounts and/or temperatures of cooled air into the respective upper and lower portions 52, 54. For example, the lower fan 154 may be operated on a more frequent basis and/or for extended durations such that a relatively greater amount of cooled air is circulated into the lower airflow circuit 108 (FIG. 6) as compared to the amount of cooled air that is circulated into the upper airflow circuit 106 (FIG. 6). In addition, the cold tray 80 may be positioned within the container interior 42 to create a relatively small volume of the lower portion 54 relative to the volume of the upper portion 52 as a means to reduce the amount of heat exchange required to maintain the lower portion 54 at a colder temperature relative to the upper portion 52.

Referring more particularly now to FIG. 1, shown is a perspective illustration of the galley cart 12 in a configuration as may be used in the context of an aircraft cabin for meal services. It should be noted that the container system 10 as disclosed herein may be applied to a variety of different industries and is not limited to airline operations. In this regard, the galley cart 12 and cold tray 80 may be implemented in any vehicular or non-vehicular application requiring refrigeration of food items. Furthermore, the container system 10 as disclosed herein is not limited to refrigeration of food items but may be extended for use in refrigerating any type of non-food items.

Referring still to FIG. 1, the galley cart 12 is illustrated as having a physical box-like envelope commonly associated with commercial airliner operations. However, the galley cart 12 may have any one of a variety of different sizes, shapes and configurations and is not limited to the generally rectangular box-like shape illustrated in FIG. 1. In the embodiment illustrated in FIG. 1, the container body 14 may comprise a pair of opposing side walls 16 joined on the ends by a pair of opposing cart doors 20 (FIG. 2). The cart doors 20 may each be independently pivotable to expose the container interior 42. However, the galley cart 12 may include non-movable end walls 18 (FIG. 1) mounted on one of the opposing ends of the galley cart 12 as an alternative to the double cart door 20 configuration of the container system 10 shown in FIG. 2.

As can be seen in FIG. 1, the cart may include a top wall 30 and a bottom wall 32 for enclosing the container interior 42. In an embodiment, the galley cart 12 may include one or more hand rails 56 such as the pair of hand rails 56 mounted on opposing ends of the galley cart 12 and including an ergonomically-shaped grip portion 58 formed with the hand rails 56. The top wall 30 may include a rim 60 such that the top wall 30 defines a recess portion 62. The galley cart 12 may include a plurality of wheels or casters 64 for transporting the galley cart 12. As can be seen in FIGS. 1-2, each one of the cart doors 20 may be pivotally mounted to the cart side walls 16 by one or more hinges 22. In addition, the cart door 20 may include a door latch 24 for latching the cart door 20 to the container body 14. The cart door 20 may preferably include a door seal 26 which may extend around a perimeter of the cart door 20 for sealing the cart door 20 to the side walls 16 and top and bottom walls 30, 32 of the container body 14.

The container body 14 is preferably constructed to thermally insulate the container interior 42 and minimize heat exchange between the container interior 42 and the external environment. In this regard, the side walls 16, cart doors 20 and top and bottom walls 30, 32 may preferably, but optionally, be formed of any suitable insulating construction including, but not limited to, the use of insulated panels such as vacuum insulated panels 34 as described in greater detail below. In this manner, the container body 14 may provide a relatively high thermally insulative capability to limit heat gain within the container interior 42. For example, an embodiment of the container system 10 may be configured such that the galley cart 12 may limit heat gain in the container interior 42 to less than approximately 2000 Btu/hour in an environment having an ambient temperature of higher than approximately 29° C. and, more preferably, less than approximately 100 Btu/hour in an environment having an ambient temperature of higher than approximately 29° C. The insulative capability of the container body 14 may be defined as the collective thermal resistance of the side walls 16, cart doors 20, and top and bottom walls 16, 30, 32 that make up the container body 14. In an embodiment, the container body 14 may have an overall effective R-value of approximately 15 depending upon the door seal 26 configuration and the construction of the side, top and bottom walls 30, 32 and cart doors 20 that make up the container body 14. However, the galley cart 12 may be configured to limit heat gain in the container interior 42 to any desired value in relation to the ambient temperature of the external environment.

Referring more particularly now to FIG. 2, shown is the container system 10 illustrating each one of the cart doors 20 pivoted into an open position and exposing the cold tray 80. The cold tray 80 is illustrated as being partially installed within the container interior 42. Although a single cold tray 80 is illustrated in FIG. 2, any number may be provided and at any location. For example, although FIG. 2 illustrates the cold tray 80 installed at an approximate mid-height 110 of the container interior 42, it is contemplated that a pair of cold trays 80 may be selectively positioned at any vertical location within the container interior 42 to provide the desired level of cooling of the contents of the container interior 42. Furthermore, the cold tray 80 may be selectively positioned at a location within the container interior 42 to provide a desired temperature distribution along the vertical height of the container interior 42.

Figure 12:
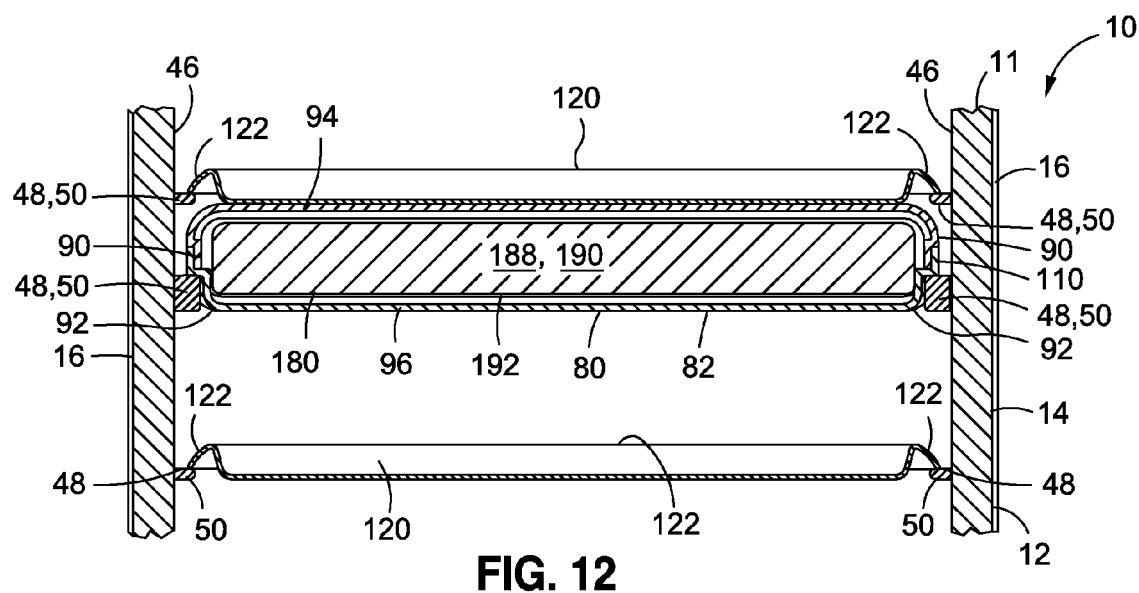
FIG. 12 is a sectional illustration of the galley cart taken along line 12-12 of FIG. 9 and illustrating the cold tray mounted to a pair of tray supports engaging longitudinal recesses formed on lateral sides of the cold tray.

For items such as food products (e.g., ice cream) that must remain frozen (i.e., below 0° C.), it may be desirable to mount the food tray 120 containing such items immediately adjacent to the cold tray 80. For example, referring briefly to FIG. 12, shown is a cross-sectional illustration of the cold tray 80 mounted to the container body 14 and illustrating a food tray 120 mounted in substantially direct contacting relation to the cold tray 80 such that heat may be conductively transmitted between the cold tray housing 82 and the food tray 120 to maintain the temperature of items on the food tray 120 at a relatively colder temperature relative to the food trays 120 that are mounted in non-contacting relation to the cold tray 80.

Referring to FIG. 2, shown are a plurality of vertically-spaced tray supports 48 or support rails 50 which may be used for supporting the food trays 120 and cold tray 80 at any vertical location within the container interior 42. The cold tray 80 may include one or more mechanisms for engaging or receiving the tray supports 48. For example, as shown in FIG. 12, the cold tray 80 may include a longitudinal recess 92 that may extend generally longitudinally along each one of the lateral sides 90 of the cold tray 80 for engaging tray supports 48. The tray supports 48 may be mounted to or integrated with the side walls 16. The tray supports 48 may be sized and configured complementary to the longitudinal recesses 92 of the cold tray 80. Although FIG. 12 illustrates the tray supports 48 for the cold tray 80 as having a larger cross section that the tray supports 48 for the food trays 120, all of the tray supports 48 may be substantially identically configured. In this manner, the longitudinal recesses 92 may be sized and configured to be mountable on the same tray supports 48 that are used for supporting the food trays 120.

As shown in FIG. 5, the tray supports 48 may be configured as generally longitudinally extending support rails 50 which may be vertically-spaced relative to one another at substantially equivalent spacings in a vertical direction. In this regard, the configuration of the tray supports 48 illustrated in FIG. 2 is a non-limiting example of any one of a variety of different tray support 48 configurations that may be used for supporting the cold tray 80 and/or the food trays 120 at any location within the container interior 42. However, the tray supports 48 may be configured to be mounted to the side walls 16 in a non-uniform spacing. For example, the tray supports 48 may be mounted such that at least one layer of food trays 120 is mounted in close proximity to and/or in substantially direct contact with the cold tray 80 to facilitate heat conduction to the food tray 120 for improved cooling of the contents of the food tray 120. It should further be noted that the tray supports 48 are not limited to the embodiment of the support rails 50 illustrated in FIG. 2 but may be provided in any configuration including, but not limited to, discrete bosses, extensions, hooks, slots, recesses or any other suitable feature which may be mounted in any manner at any location within the container interior 42.

Referring to FIGS. 1, 5 and 21, the cold tray 80, container body 14 and/or battery pack 166 may include a battery status indicator 168 for indicating the status of the power source 164 such as the battery pack 166 illustrated in FIG. 22\. The battery pack 166 may provide power to the upper and lower fans 142, 152 as indicated above. The battery status indicator 168 may provide an indication of a relatively low level of power remaining in the battery pack 166. Alternatively, the battery status indicator 168 may continuously indicate the level of available power such that the battery pack 166 may be replaced or recharged as necessary. The battery status indicator 168 may be mounted at any suitable location on the cold tray 80 including on an end thereof as illustrated in FIG. 2. The battery status indicator 168 may be mounted on an exterior of the cart door 20 as illustrated in FIG. 1 in order to provide a visual and/or auditory signal representative of the amount of available power in the battery pack 166. The battery pack 166 may also be externally mounted to the container body 14 such as to the cart door 20 as shown in FIG. 21 or to any other location on the container body 14.

In the embodiment illustrated in FIG. 22, the fan module 134 may advantageously be configured to provide convenient access to the battery pack 166 such as by removing an access panel 170. Alternatively, the battery pack 166 may be exteriorly accessible without removal of an access panel 170. For example, the battery pack 166 may be mounted to an exterior of the fan module 134 or at any location on the container 11 exterior such as to the cart door.

Referring back to FIG. 2, the cold tray 80 may optionally include a door sensor 28 mounted on the cold tray 80 such as at an end thereof to sense an open position and/or a closed position of the cart door 20. In an embodiment, upon sensing that the cart door 20 is open, the door sensor 28 may send a signal to the logic circuit 172 or power source 164 to deactivate or shut off the flow of power to the upper and/or lower fans 142, 152. The battery status indicator 168 may also be configured to provide a warning signal to indicate to a flight attendant of an open cart door 20.

Referring to FIG. 5, shown is a perspective illustration of the container system 10 and further illustrating the installation of a plurality of individual food trays 120 on the vertically-spaced tray supports 48 mounted to the side walls 16 of the container body 14. Although FIG. 5 illustrates the food trays 120 being mounted on tray supports 48 disposed immediately adjacent to the cold tray 80, it is recognized that the food trays 120 may be mounted on any one or all of the tray supports 48 and at any spacing and is not limited to that which is illustrated in FIG. 5. Likewise, although the cold tray 80 is illustrated as being mounted on the tray support 48 at an approximate mid-height 110 of the interior, as was earlier mentioned, the cold tray 80 may be mounted at any vertical location within the container interior 42 in order to achieve a desired temperature profile within the container interior 42.

As can be seen in FIG. 5, each one of the food trays 120 may be supported on the tray supports 48 by means of perimeter lips 122 extending around each one of the food trays 120. The support rails 50 may be provided with detents (not shown) to engage the perimeter lips 122 of each one of the food trays 120 in order to fix each one of the food trays 120 in a desired longitudinal position (i.e., forward and aft direction) along the tray supports 48 and to maintain the food trays 120 at a desired spacing relative to one another and a desired spacing between an end-most one of the food trays 120 and the cart doors 20. As will be described in greater detail below, air gaps 128 (FIG. 9) between each one of the food trays 120 and air gaps 130 (FIG. 9) between the end-most food trays 120 and the cart doors 20 may facilitate airflow circulation within the container interior 42.

Referring to FIG. 6, shown is a side illustration of the container system 10 having one of the side walls 16 removed to expose the container interior 42 and illustrate the relative positioning of the cold trays 80 and the food trays 120. As can be seen, the cold tray 80 may be configured to discharge cooled air from the cold tray housing 82 into respective ones of the upper and lower portions 52, 54 of the container interior 42 such that upper and lower airflow circuits 106, 108. As was noted above, the cold tray 80 may be mounted at any vertical location within the container interior 42. For example, it is contemplated that the cold tray 80 may be mounted toward an upper end of the interior of the container. Although not shown, the cold tray 80 may be mounted at a location that is adjacent to the top wall 30 of the container such that the cold tray 80 divides the container interior 42 into a relatively small volume of the upper portion 52 and a relatively large volume of the lower portion 54. Alternatively, the cold tray 80 may be mounted immediately adjacent to the top wall 30 such that only a lower portion 54 of the container interior 42 is formed.

Likewise, although not shown, the cold tray 80 may be mounted or positioned toward a lower end of the container interior 42 adjacent to the bottom wall 32 such that a relatively small volume of the lower portion 54 and a relatively large volume of the upper portion 52 is formed. Alternatively, the cold tray 80 may be positioned at an extreme lower position within the container interior 42 such that only an upper portion 52 of the container interior 42 is formed. As can be seen, the cold tray 80 may be selectively mounted at any vertical location within the container interior 42 of the container 42. In addition, the cold tray 80 may be configured to discharge air into the upper and lower portions 52, 54 at the same rate or at different rates in order to maintain a desired temperature range within the respective upper and lower portions 52, 54. In this regard, the cold tray 80 may be configured to discharge air into the upper and lower portions 52, 54 which may optionally be maintained at different temperatures.

Figure 8:
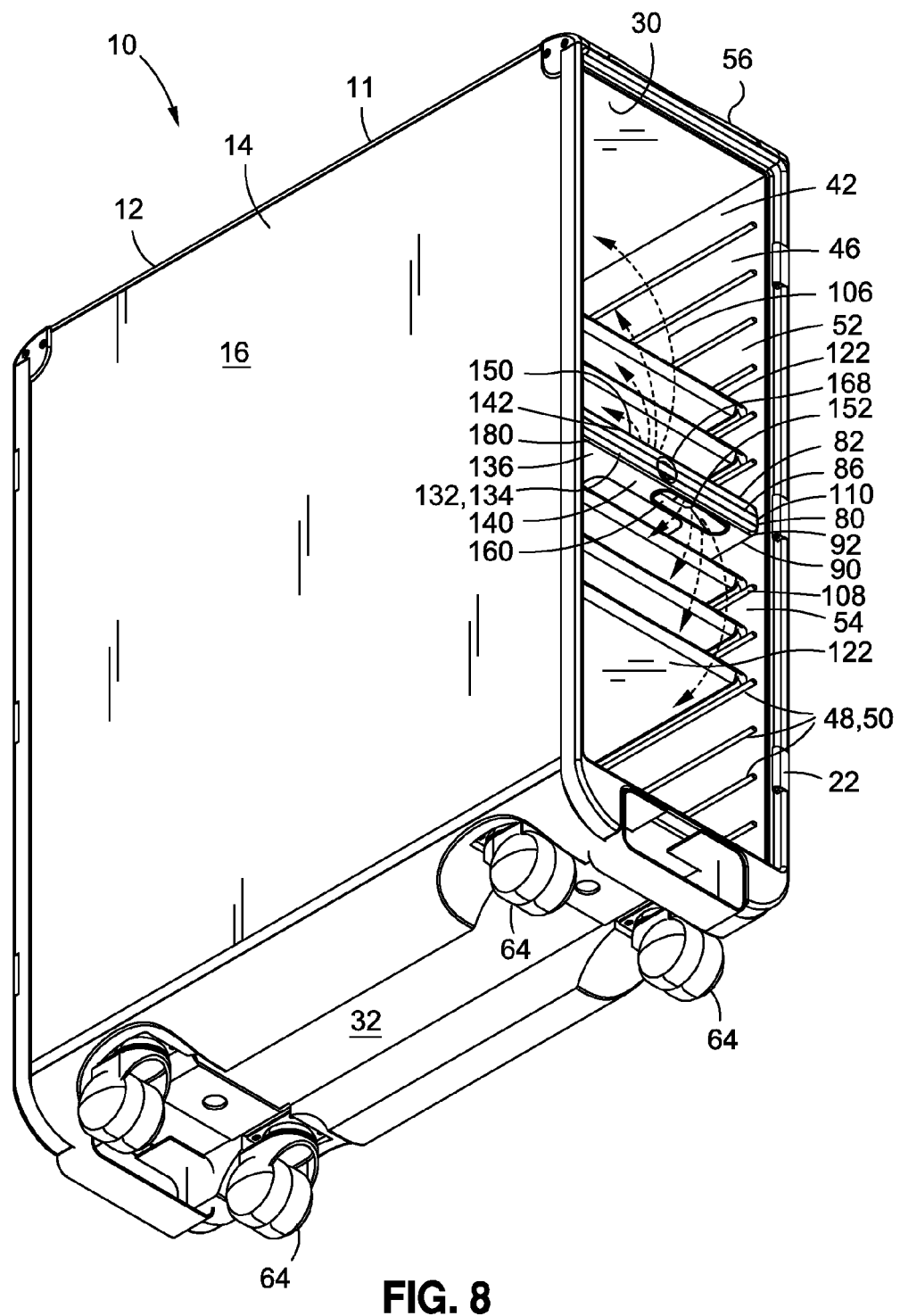
FIG. 8 is a bottom perspective illustration of the galley cart illustrating air discharged by upper and lower fans and forming respective upper and lower airflow circuits.

Referring to FIGS. 6 and 9, the cold tray 80 may be configured to have a length that facilitates the formation of a cold tray end gap 98 (FIG. 9) between at least one end of the cold tray 80 and a door inner surface 44 of the cart door 20. The cold tray end gap 98 as illustrated in FIG. 9 may facilitate the entry of air from the container interior 42 into the cold tray air inlet 84 formed on the end of the cold tray 80 as also shown in FIG. 30. Although the cold tray 80 is illustrated as having a length that is generally complementary to a length of the container interior 42, the cold tray 80 may be provided in a length that is shorter than that which is illustrated in the Figures. Furthermore, the cold tray 80 may be configured as two or more distinct cold trays (not shown) that may be disposed in spaced arrangement relative to one another or in end-to-end arrangement relative to one another with each cold tray having a cold tray air inlet and at least one circulation fan 140 for drawing air from the interior into the cold tray air inlet and discharging cooled air back into the container interior 42. The cold tray 80 may also be configured as a separate assembly from the fan module 134 as indicated above Referring to FIGS. 7-8, shown are perspective illustrations of the container system 10 having the cold tray 80 and food trays 120 mounted within the container interior 42 and illustrating the discharge of the cooled air into the upper and lower portions 52, 54 of the container interior 42 by means of the upper and lower fans 142, 152. The upper and lower fans 142, 152 may be mounted to the fan module 134 which may be provided as a standalone unit or integrated into the cold tray housing 82. The upper and lower fans 142, 152 may be mounted on an end of the cold tray housing 82 opposite the end having the cold tray air inlet 84. However, it is contemplated that the circulation fans 140 may be mounted at any location along the length of the cold tray 80 and are not limited to mounting at end of the cold tray 80 opposite the cold tray air inlet 84. For example, the cold tray 80 may be include a circulation fan 140 on the back end 88 for drawing air into the cold tray air inlet and a circulation fan 140 on the front end 86 for discharging the cooled air back into the container interior 42.

As can be seen in the embodiment illustrated in FIGS. 7 and 8, the upper and lower fans 142, 152 may direct air into respective ones of the upper and lower portions 52, 54 of the container interior 42. The upper fan 142 may direct air in a generally upward direction toward the upper portion 52 of the container interior 42 in order to form the upper airflow circuit 106. Likewise, the lower fan 152 may direct air in a generally downward direction into the lower portion 54 of the container interior 42 in order to form the lower airflow circuit 108.

In an embodiment shown in FIGS. 6-8, the container system 10 may be configured such that the upper and lower airflow circuits 106, 108 form counter-rotating flow paths within the container interior 42 wherein the air is passed over the layers of food trays 120 mounted within the container interior 42 from the front end 86 of the cold tray 80 toward the back end 88 of the cold tray 80 whereupon the air may be drawn into the cold tray air inlet 84. In this regard, the circulation fans 140 may be configured to draw the air into the cold tray air inlet 84 such that the air passes through the cold tray housing 82 as best seen in FIG. 6. As was earlier indicated, the cold tray housing 82 may contain refrigerant 188 (FIG. 12) such as phase change material 190 (FIG. 12) in order to cool the air as the air is drawn past the refrigerant 188.

In an embodiment, the refrigerant 188 may be contained within one or more cold packs 180 (FIG. 20) which may be housed within the cold tray housing 82. The cold tray housing 82 and the cold pack 180 may be configured to provide one or more cold pack air channels 192 as shown in the non-limiting example of FIG. 28 to illustrate the flow of air past the cold pack 180 toward the upper and lower fans 142, 152. As shown in FIG. 6-8, the upper and lower fans 142, 152 discharge the cooled air back into at least one of the upper and lower portions 52, 54 to form the counter-rotating upper and lower airflow circuits 106, 108.

Referring to FIG. 9, shown is a top sectional illustration of the container interior 42 illustrating a plurality of the food trays 120 mounted to the tray supports 48. Although three food trays 120 are shown mounted in end-to-end arrangement on one of the tray supports 48, any number of food trays 120 may be provided. In this regard, the food trays 120 may be configured in an industry standard configuration. However, the food trays 120 may be configured in any desired size, shape and configuration and are not limited to the specific arrangement illustrated in FIG. 9.

Referring to FIG. 7, the food tray 120 is preferably mounted within the container interior 42 to provide a food tray end gap 130 between an end-most one of the food trays 120 and the cart door 20 at the front end 86 of the cold tray 80 to facilitate airflow therebetween. In addition, the cold tray 80 may be mounted to provide a cold tray end gap 98 at the back end 88 of the cold tray 80 for the entry of air into the cold tray air inlet 84. At the front end 86, the cold tray 80 may be mounted in closer proximity to the cart door 20 due to a reduced need for air flow between the cold tray 80 and the cart door 20 at the front end 86.

Referring briefly to FIG. 10, shown is a perspective illustration of an embodiment of the food tray 120 mounted on the support rails 50 located on opposing sides of the container interior 42 along the side walls 16. As can be seen in FIG. 10, the food tray 120 may include a perimeter lip 122 extending around the food tray 120. Portions of the perimeter lip 122 may include a scallop 126 or cutout formed on opposing ends of the food tray 120 although the scallop may be formed on all sides of the food tray 120 or the scallops 126 may be omitted altogether. As shown in FIG. 9, the adjacently disposed food trays 120 collectively form a food tray air gap 128 due to the scallops 126 along the perimeter lips 122. The scallops 126 on the end-most ones of the food trays 120 adjacent the cart door 20 may facilitate entry of air into the cold tray air inlet 84 or the discharge of air by the upper and lower fans 142, 152 into the upper and lower portions 52, 54 of the container interior 42.

Figure 11:
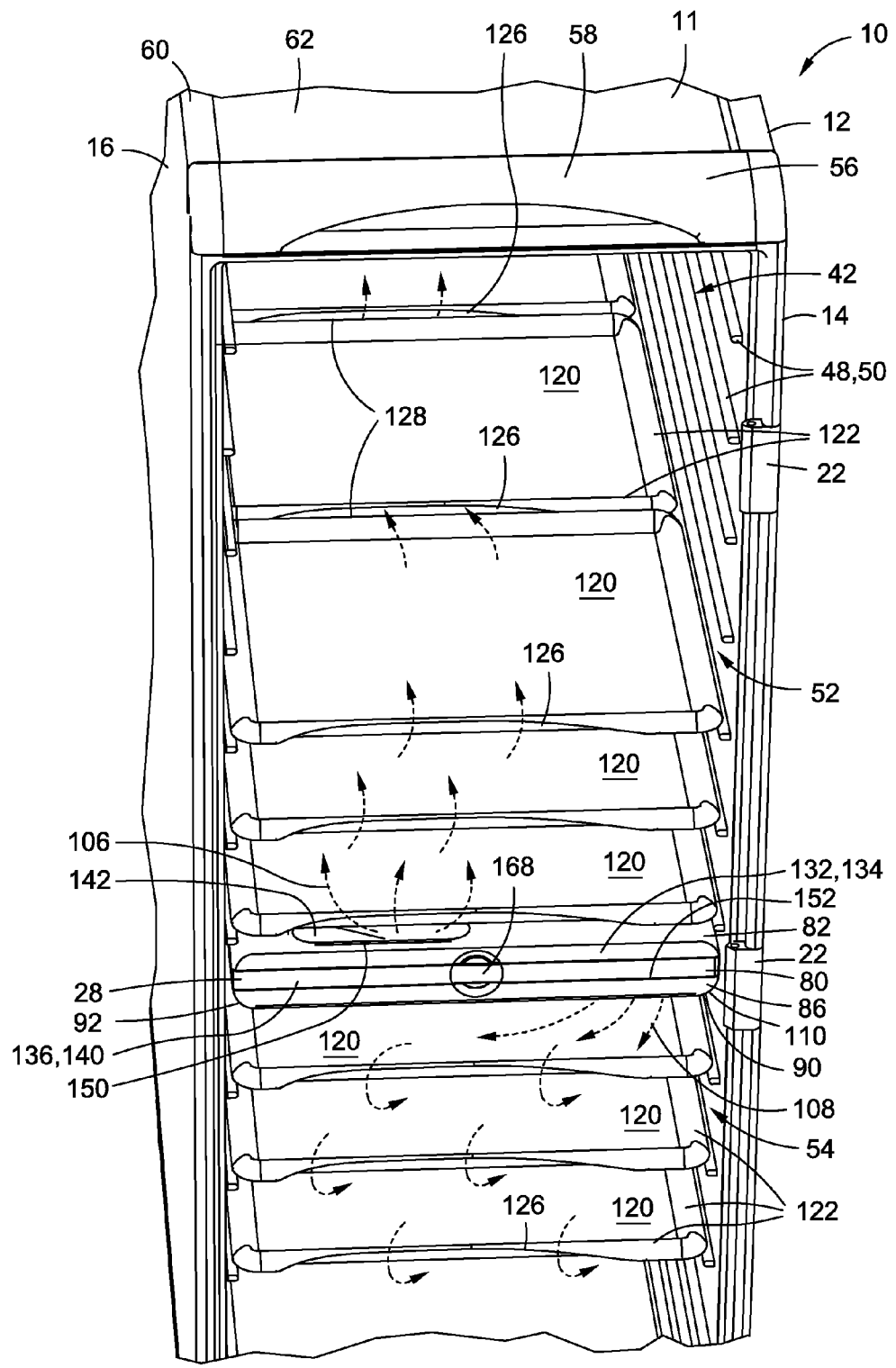
FIG. 11 is a top perspective illustration of the container interior illustrating a plurality of the food trays having scallops on the perimeter lips and further illustrating the flow of air through the food tray air gaps collectively formed by the scallops of adjacent food trays.

Referring to FIG. 11, shown is a perspective illustration of the container interior 42 having the food tray 120 with scalloped perimeter lips 122 and illustrating the air flow through the food tray air gaps 128. As can be seen in FIG. 11, air flow between vertical layers of the food trays 120 is facilitated by the food tray air gap 128. FIG. 11 additionally illustrates the discharge of air from the upper fan 142 into the upper airflow circuit 106 which is further facilitated by the scallops 126 formed in the perimeter lip 122 of the food trays 120.

Referring to FIG. 12, shown is a sectional illustration of the container system 10 illustrating the mounting of the cold tray 80 on one of the tray supports 48. FIG. 12 further illustrates an optional embodiment wherein one or more of the food trays 120 are mounted immediately above the cold tray 80 such that the food tray 120 is in direct contact with the top side 94 of the cold tray 80. As was earlier indicated, substantially direct contact between the food tray 120 and the cold tray 80 facilitates conduction of heat therebetween in order to maintain the temperature of the contents of the food tray 120 at a desired level. As can be seen in FIG. 12, the cold tray 80 may include longitudinal recesses 92 formed along lateral sides of the cold tray 80 for receiving the tray supports 48. In this regard, the cold tray 80 is preferably sized to have an overall width that is substantially complementary to the distance between the side walls 16 of the galley cart 12. However, the cold tray 80 may be formed in any suitable width.

FIG. 12 further illustrates one of the food trays 120 mounted below the cold tray 80 and wherein the food tray 120 is supported by the tray supports 48 extending along the side walls 16 of the galley cart 12. The spacing between the food tray 120 and the cold tray 80 may be sized to accommodate food items (not shown) on the food tray 120 and to provide space between the food items and the cold tray 80 facilitate the flow of cooled air over the top of the food tray 120. Although the tray supports 48 for the cold tray 80 are illustrated as having a larger size (i.e., larger cross sectional area) than the tray supports 48 which support the food trays 120, it is contemplated that substantially all of the tray supports 48 within the galley cart 12 (FIG. 11) may be of substantially equivalent size, shape and configuration such that the food trays 120 and cold tray 80 may be interchangeably mounted at any vertical location with the galley cart 12.

Figure 13:
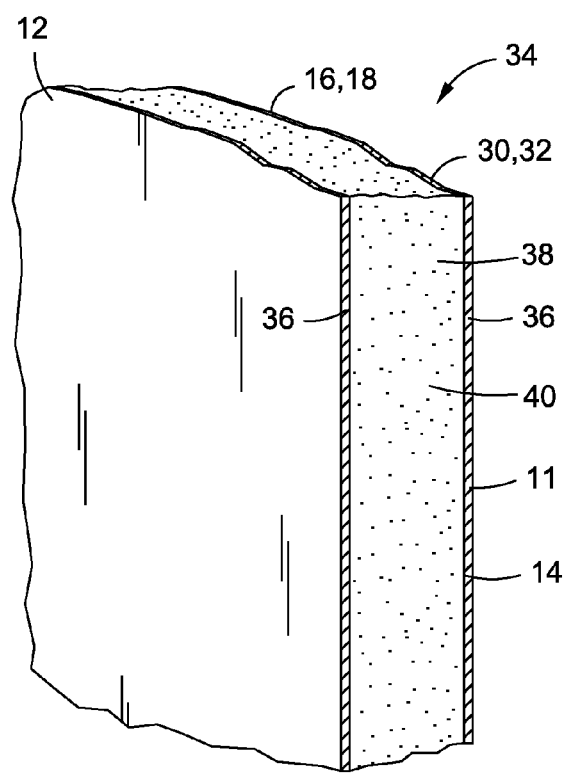
FIG. 13 is a perspective illustration of a vacuum insulated panel from which the container body may be constructed.

FIG. 13 is a perspective illustration of a portion of a wall of the container body 14. The wall portion illustrated in FIG. 13 is preferably formed in a configuration providing relatively high insulative capability and having a relatively high R-value or resistance to heat flow across the wall. In an embodiment, the construction illustrated in FIG. 13 may be implemented in any one of the side walls 16, top wall 30, bottom wall 32, end walls 18 and/or cart door 20. In a non-limiting embodiment, the construction illustrated in FIG. 13 may comprise a vacuum insulated panel 34 having a relatively high R-value such as between approximately 30 and 50.

As illustrated in FIG. 13, the vacuum insulated panel 34 may comprise a pair of face sheets 36 forming a gap therebetween. The gap may be sealed along the edges of the vacuum insulated panel 34 and may be at least partially filled with a core 38 for maintaining a vacuum 40 within the vacuum insulated panel 34. The core 38 material is preferably selected with appropriate strength to resist collapsing under the effects of external pressure due to the vacuum 40 within the gap. Advantageously, the absence of air within the vacuum insulated panel 34 minimizes conduction and convection of heat across the thickness of the vacuum insulated panel 34.

A galley cart 12 as illustrated in FIG. 1 may be constructed of vacuum insulated panels 34 and may exhibit a relatively high R-value to maintain the air temperature of the container interior 42 at relatively cool temperatures for extended periods of time. The core 38 material of the vacuum insulated panel 34 shown in FIG. 13 may be provided in any suitable configuration capable of maintaining the structural integrity of the panel with the vacuum 40. In an embodiment, the core 38 material may comprise aerogel or any other suitable material including, without limitation, foam and fiberglass insulation. The face sheets 36 may be formed of any suitable metallic or nonmetallic material and may preferably be generally impermeable to prevent loss of vacuum 40 within the vacuum insulated panel 34.

Referring to FIG. 14, shown is a top sectional illustration of the container system 10 illustrating a plurality of food trays 120 in an alternative embodiment wherein the food trays 120 include a plurality of vent holes 124 formed in the perimeter lips 122. The food trays 120 may be disposed in generally abutting or contacting relation in an end-to-end arrangement relative to one another when mounted on the tray supports 48. As was described above with regard to FIG. 9, the end-most one of the food trays 120 is preferably mounted to provide a food tray air gap 128 between the end-most one of the food tray 120 and the cart door 20 to facilitate the flow of air between the food tray 120 and cart door 20. In this manner, air discharged by the air flow source 132 (e.g., circulation fan 140) may be circulated through the layers of food trays 120 prior to the air being drawn into the cold tray air inlet 84 at the back end 88 of the cold tray 80.

FIG. 15 illustrates a perspective view of the embodiment of the food tray 120 having the vent holes 124 disposed in spaced arrangement around the perimeter lip 122 of the food tray 120. Although shown as being formed as elongated slots, the vent holes 124 may be formed in any size, shape and configuration and at any location within the food tray 120. The food trays 120 are illustrated as being supported on the tray supports 48 or support rails 50. The food tray 120 may be provided in a generally symmetrical configuration to allow for mounting of the food tray 120 on the support rail 50 in any orientation. Non-symmetrical configurations of the food trays 120 are also contemplated.

Figure 16:
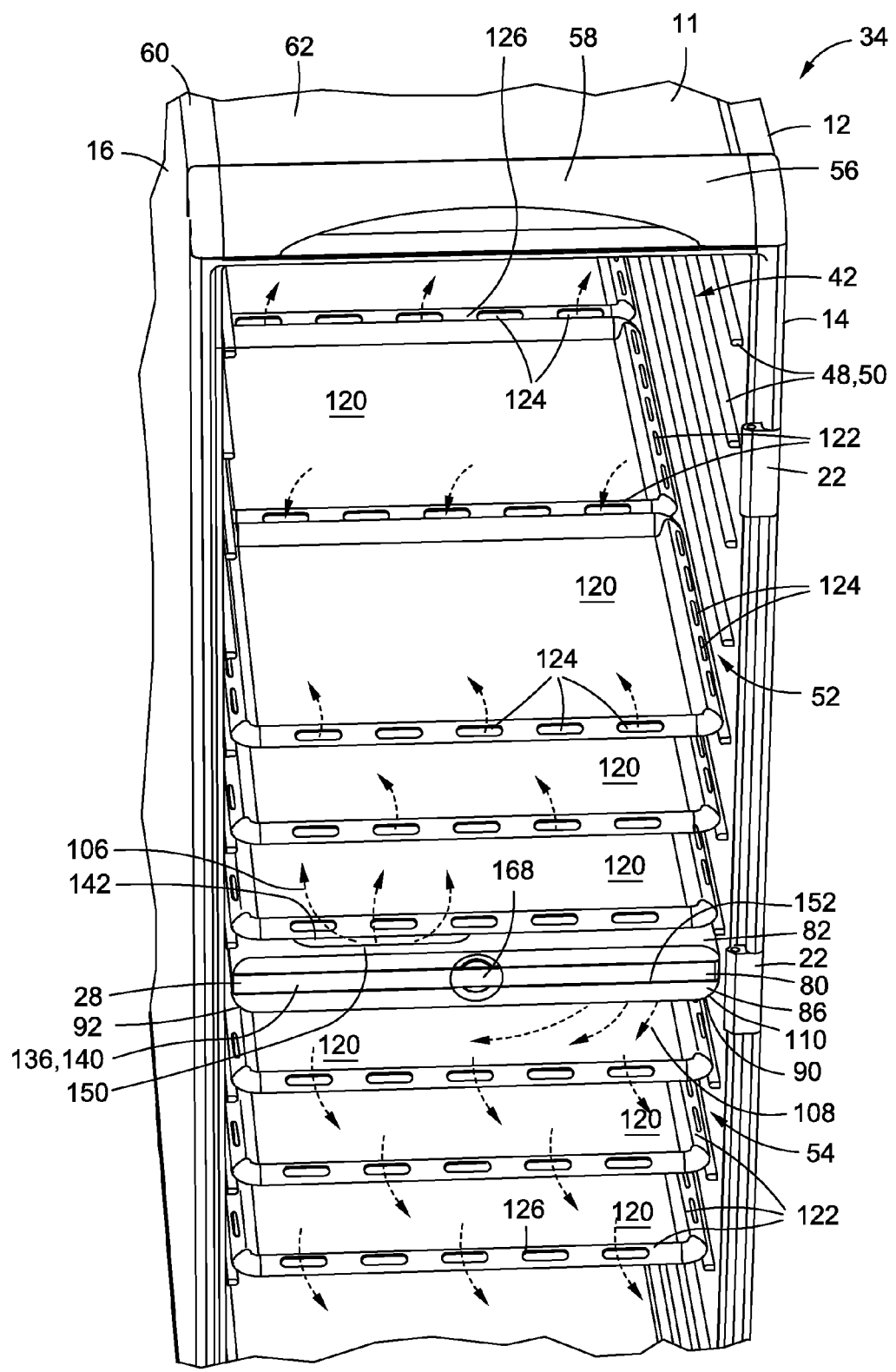
FIG. 16 is a perspective illustration of the container interior illustrating a plurality of the food trays having the vent holes.

Referring to FIG. 16, shown is a perspective illustration of the container interior 42 illustrating the plurality of the food trays 120 having the vent holes 124 installed in the perimeter lips 122. As can be seen in FIG. 16, the vent holes 124 facilitate the flow of air between the food trays 120. The vent holes 124 provide a means for mixing of the air between the layers of food trays 120 within the container interior 42. Likewise, the vent holes 124 may be formed along the perimeter lips 122 adjacent the side walls 16 of the galley cart 12. The vent holes 124 may facilitate further mixing of air between the layers of food trays 120 wherein air may flow along the side walls 16 and through the vent holes 124 in the perimeter lips 122.

Figure 17:
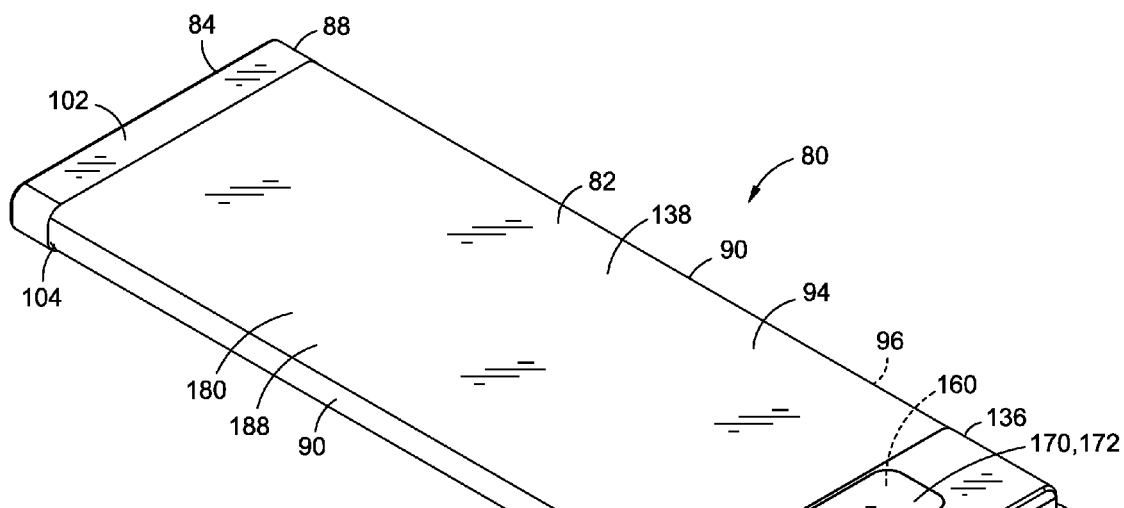
FIG. 17 is a top perspective illustration of an embodiment of the cold tray having a front end having at least one circulation fan and a back end having a cold tray air inlet.
Figure 18:
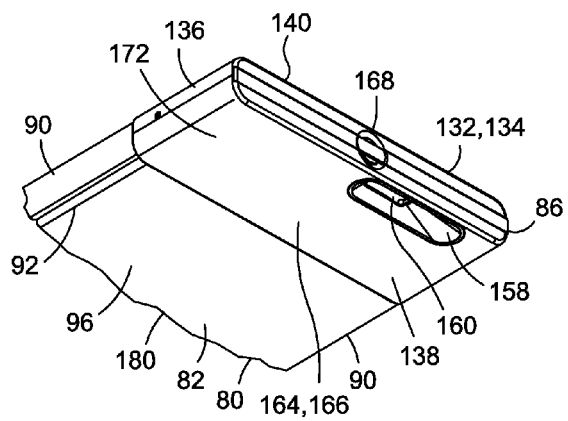
FIG. 18 is a bottom perspective illustration of the front end of the cold tray.
Figure 19:
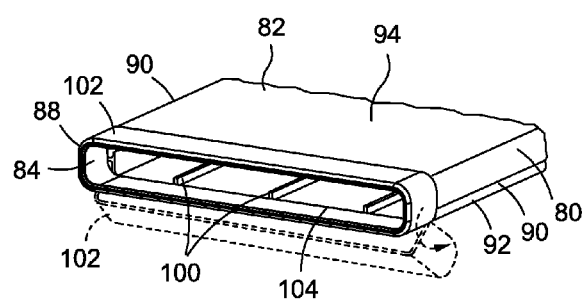
FIG. 19 is an aft perspective illustration of an aft end of the cold tray and illustrating an end frame forming the cold tray air inlet.

Referring now to FIGS. 17-19, shown is an embodiment of the cold tray 80 having the fan module 134 integrated with the cold tray 80. The fan module 134 may include the upper and lower fans 142, 152 mounted in the front end 86 of the cold tray 80 and having the cold tray air inlet 84 disposed on a back end 88 of the cold tray 80. The cold tray housing 82 may have a generally hollow interior for housing a refrigerant 188. As was earlier indicated, the refrigerant 188 may be contained within one or more cold packs 180 which may be inserted within the cold tray housing 82. The cold trays 80 are preferably configured such that air drawn into the cold tray air inlet 84 from the container interior 42 passes between the cold pack 180 and the cold tray housing 82 before being discharged back into the container interior 42 by means of the circulation fans 140 (i.e., upper and lower fans 142, 152).

In FIG. 17, shown is an embodiment of the cold tray 80 wherein the upper fan 142 may be located within the front end 86 of the cold tray 80. The upper fan 142 draws air from the cold tray air inlet 84 through the cold tray housing 82 and discharges the air through the upper nozzle 148 into the container interior 42. The upper nozzle 148 forms the upper fan outlet 150 which may terminate substantially flush with the fan compartment shell 138. In this regard, the fan compartment 136 may comprise upper and lower shell halves which may be joined by any suitable means such as by mechanical attachment and/or adhesive bonding or any other suitable means. The fan compartment 136 may include the battery status indicator 168 which may optionally be included on the front end 86 of the cold tray 80 or at any other suitable location. The fan compartment 136 may house the power source 164 such as the battery pack 166 which may be mounted within or on the fan compartment 136 or on an interior or exterior of the container 11.

Referring to FIG. 18, shown is a bottom side of the cold tray 80 and illustrating a lower fan outlet 160 for discharging air into the container interior 42. As can be seen in FIG. 18, the lower fan outlet 160 may be mounted toward a lateral side 90 of the fan compartment 136 opposite the upper fan 142. The upper and lower fan outlets 150, 160 may distribute cooled air into the respective ones of the upper and lower airflow circuits 106, 108. FIG. 18 further illustrates a portion of the longitudinal recess 92 which may extend from a front end 86 of the cold tray 80 to a back end 88 of the cold tray 80 and which may be engageable to the tray supports 48 as illustrated in FIG. 12 described above. In this regard, the longitudinal recess 92 may be sized complementary to a length of the tray support 48 illustrated in FIG. 12 in order to fix the position of the cold tray 80 relative to the door inner surface 44 such that the cold tray end gap 98 is provided as best seen in FIGS. 9 and 14.

Referring to FIG. 19, shown is an end frame 102 of the cold tray housing 82. The end frame 102 may be pivotably mounted to the back end 88 of the cold tray 80 and may be movable in a manner that facilitates the installation and removal of one or more cold packs 180 into the cold tray housing 82. In this regard, the end frame 102 may include an end frame hinge 104 which may comprise a living hinge arrangement wherein the material of the hinge comprises a reduced thickness of the material joining the end frame 102 to the cold tray housing 82. Alternatively, the end frame hinge 104 may comprise one or more individual mechanical hinge elements to allow pivoting of the end frame 102 from an operating position (illustrated in solid line font in FIG. 19) to a loading position (illustrated in dashed line font in FIG. 19).

As can be seen in FIG. 19, the end frame 102 may be formed as a substantially hollow or ring-shaped member and may be configured as an extension of the ring-shaped cross-section of the cold tray housing 82 as illustrated in FIG. 23. In this regard, the end frame 102 as shown in FIG. 19 may have a generally aerodynamic profile or shape to facilitate the flow of air around the upper and lower edges of the end frame 102 and into the cold tray air inlet 84. However, although shown as a generally ring-shaped element, the end frame 102 may be formed of any configuration that is suitable for facilitating the flow of air into the cold tray housing 82.

For example, the end frame 102 may include a vent or grating arrangement (not shown) to contain the contents of the cold tray housing 82. The end frame 102 may be secured to the cold tray housing 82 in the operating position by means of any suitable method including, but not limited to, mechanical features such as mechanical snaps (not shown) which may be integrally formed with or separately mounted to the end frame 102 and cold tray housing 82. Advantageously, the pivotable nature of the end frame 102 facilitates the convenient installation and/or removal of one or more of the cold packs 180 (FIG. 24) from the cold tray housing 82.

Referring briefly to FIG. 24, shown is an embodiment of the cold tray housing 82 having a plurality of cold packs 180 which may be removed from the cold tray housing 82 by downward pivoting of the end frame 102 and sliding the cold packs 180 outwardly. However, the cold tray housing 82 may be configured in a variety of alternative arrangements to facilitate removal and installation of the cold packs 180. For example, the cold tray housing 82 may be formed as a pair of upper and lower shells (not shown) wherein the upper shell may be removable from the lower shell to facilitate access to the interior of the cold tray housing 82 such that the cold packs 180 may be removed and/or installed. Alternatively, the cold tray housing 82 may include one or more removable panels (not shown) to facilitate access to the cold packs 180.

Figure 20:
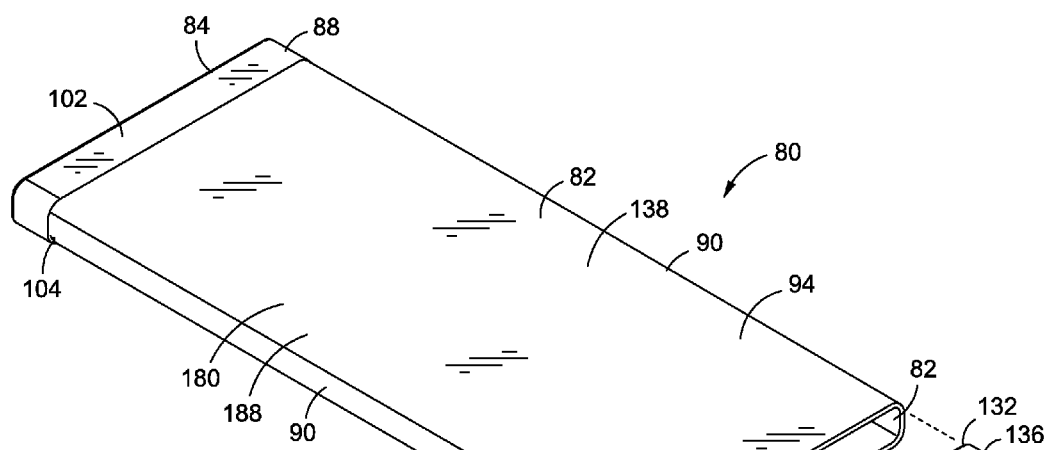
FIG. 20 is a top perspective illustration of a fan module that may be configured as a separate unit from the cold tray.

Referring to FIG. 20, shown is a top perspective illustration of an embodiment wherein the cold tray 80 and fan module 134 are configured as separate units. In the non-limiting embodiment illustrated in FIG. 20, the fan module 134 may be formed in a configuration that is complementary to the configuration of the cold tray 80. However, the fan module 134 may be formed in any suitable size, shape and configuration for mounting inside the container interior 42 in any suitable manner. As shown in FIG. 3, the fan module 134 may be mounted inside the container interior 42 in end-to-end arrangement with the cold tray 80 such that the fan module 134 is in fluid communication with the cold tray 80. The fan module 134 may include at least one circulation fan 140 such as upper and lower fans 142, 152. A battery pack 166 may optionally be included with the fan module 134 for powering the upper and lower fans 142, 152.

Referring briefly to FIG. 21, shown is a perspective illustration of the container system 10 showing the pack being detachably mounted to the cart door 20 of the container 11. As was indicated above, the battery pack 166 may provide power to the upper and lower fans 142, 152 within the fan module 134 by means of electrical contacts (not shown) between the fan module 134 and the container 11. For example, the electrical contacts may be located at an interface between the battery pack 166 and a recess in the cart door 20 for receiving the battery pack 166. In addition, electrical contacts may be located at an interface between the fan module 134 and the cart door 20 such that power is provided to the fan module 134 when the cart door 20 is closed. Alternatively, electrical contacts may be provided between the fan module 134 and one or more of the tray supports upon which the fan module 134 is mounted or in any one of a variety of alternative arrangements.

Referring to FIG. 22, shown is a top perspective illustration of the cold tray 80 in a partially exploded view and illustrating a fan compartment shell 138 being removed to expose an interior of the fan compartment 136. Furthermore, FIG. 22 illustrates a plurality of cold packs 180 mounted within the cold tray housing 82 in end-to-end arrangement relative to one another. The fan compartment 136 may contain the logic circuit 172 and power source 164 or battery pack 166 which may be configured to be removable from the fan compartment 136 by removal of the access panel 170. Alternatively, the battery pack 166 may be rechargeable to obviate the need for removing the battery pack. In an embodiment, the battery pack 166 may be recharged by inductive charging in a manner as will be described in greater detail below.

The logic circuit 172 may include appropriate sensors including, but not limited to, temperature sensors 174 which may be mounted to the cold tray 80. Furthermore, the container interior 42 may include temperature sensors 174 which may be communicatively coupled to the logic circuit 172 by any suitable means including wireless and/or hardwire connection. Also shown in FIG. 22 are the upper and lower fans 142, 152 which may include respective ones of the upper and lower fan ducts 146, 156 which, in turn, may be connected to respective ones of the upper and lower nozzles 148, 158 forming the upper and lower fan outlets 150, 160 of the upper and lower fans 142, 152, respectively.

Referring to FIG. 24, shown is a side sectional illustration of the cold tray 80 taken along line 24-24 of FIG. 22 and illustrating the location of the fan compartment 136 housing at the front end 86 of the cold tray 80 and the installation of the cold packs 180 within the cold tray housing 82. FIG. 24 illustrates an embodiment wherein the cold packs 180 may be removed and/or installed from the cold tray housing 82 by pivoting the end frame 102 at the back end 88 of the cold tray 80 into the loading position to facilitate removal of the cold packs 180. The cold packs 180 may be provided in any suitable size, shape and configuration. The cold packs 80 are preferably formed complementary to the cold tray housing 82 such that air drawn into the cold tray air inlet 84 may pass between the cold packs 180 and the inner surfaces of the cold tray housing 82 resulting in cooling of the air prior to discharge into the container interior 42.

Referring to FIG. 23, shown is a cross-sectional illustration of the cold tray 80 of FIG. 22 and illustrating an embodiment of one of the cold packs 180 mounted within the cold tray housing 82. As can be seen, the cold tray housing 82 may include a bottom side 96 having one or more internal ribs 100 extending upwardly into the cold tray housing 82. The internal ribs 100 may be formed as discontinuous members or as continuous members extending along a length of the cold tray housing 82 from the front end 86 of the cold tray 80 to the back end 88 of the cold tray 80. However, the internal ribs 100 may be formed as discrete elements such as raised bosses 162 or other surface features for spacing the cold packs 180 away from the interior of the cold tray housing 82. In this manner, a cold pack air channel 192 may be formed between the cold pack upper and lower surfaces 182, 184 and the cold tray housing 82.

The cold pack air channels 192 facilitate the passage of air through the cold tray housing 82. As the air passes along the cold pack 180 containing the refrigerant 188, the air is cooled prior to being discharged into the container interior 42 by the upper and lower fans 142, 152 (FIG. 22). Although FIG. 23 illustrates a cross-section having internal ribs 100 disposed on a bottom side 96 of the cold tray housing 82, it is contemplated that the cold tray housing 82 may include internal ribs 100 formed on a top side 94 of the cold tray housing 82 in addition to or as an alternative to the internal ribs 100 on the bottom side 96.

Referring still to FIG. 23, the cold pack 180 may be configured to house any suitable type of refrigerant 188 for maintaining the temperature of the container interior 42 to a desired value. For example, the cold pack 180 may contain refrigerant 188 configured as a phase change material 190 of any suitable composition. The phase change material 190 may facilitate cooling of the air as the material changes phase to absorb heat from the air passing by or surrounding the cold pack. The cold pack 180 may be formed as a fillable container wherein the cold pack 180 may include an indentation 186 (FIG. 22) for locating a filler cap (not shown) that may be removed to allow for emptying of the contents of the cold pack 180 and refilling the cold pack 180 with the same refrigerant 188 or a different type of refrigerant. Alternatively, the cold pack 180 may be formed in a substantially non-fillable arrangement wherein the cold pack 180 is used for a predetermined number of cycles after which the cold pack 180 may be discarded or recycled.

Referring to FIG. 23, the phase change material 190 may be formed as any suitable composition including, but not limited to, a carboxymethyl cellulose-based composition. Alternatively, the phase change material 190 may be formed as a polymer gel formulation which may be contained or housed within a cold pack 180 having a flexible or rigid construction. For example, the cold pack 180 may comprise a generally flexible polymeric film formed as a pouch containing the phase change material. Alternatively, the cold pack 180 may comprise a relatively inflexible polymeric shell construction such as, without limitation, polyethylene or nylon or any other suitable material that may be injection molded or blow molded or otherwise fabricated.

Advantageously, the composition of the phase change material 190 is preferably selected to provide a relatively high rate of absorption of heat contained in the air flowing past the cold pack. The phase change material 190 may change in phase from a solid to a gas such as may occur during the sublimation of dry ice. The phase change material 190 may also change phase from solid to liquid or from liquid to gas. The phase change material 190 may comprise frozen water (i.e., ice) or more complex compositions. For example, the refrigerant 188 may include a phase change material 190 comprising a co-polymer based material (e.g., polyacrylate polyalcohol co-polymer). In this regard, the phase change material 190 may comprise any organic or inorganic composition or combination thereof without limitation such as a paraffin-based composition or a salt hydrate-based composition. The phase change material 190 preferably has a relatively high latent heat per unit volume to provide cooling capability for extended durations.

Referring to FIG. 37, shown is a chart illustrating the latent heat for phase change material comprising dry ice and water ice. The dry ice is indicated in FIG. 37 by element numeral 324 and exhibits a latent heat of approximately 246 Btu/lb as compared to water ice indicated by element numeral 326 which exhibits a latent heat of approximately 144 Btu/lb. The phase change material may be provided in any suitable form such as, without limitation, any commercially available phase change material. For example, the phase change material may be provided as a refrigerant brick (not shown) having a suitable latent heat. The foam brick may be formed from rigid open-celled foam and may be impregnated with any suitable solution such as an aqueous solution or any other solution. The foam may be sealed within a pouch such as a polyethylene pouch or a pouch formed of any other suitable material for containing the foam. As was earlier indicated, the phase change material may optionally comprise a carboxymethyl cellulose-based composition which may also be contained within a pouch or container such as a nylon or polyethylene pouch or within a relatively inflexible or rigid container. The phase change material may also comprise any suitable vegetable-based material.

Figure 38:
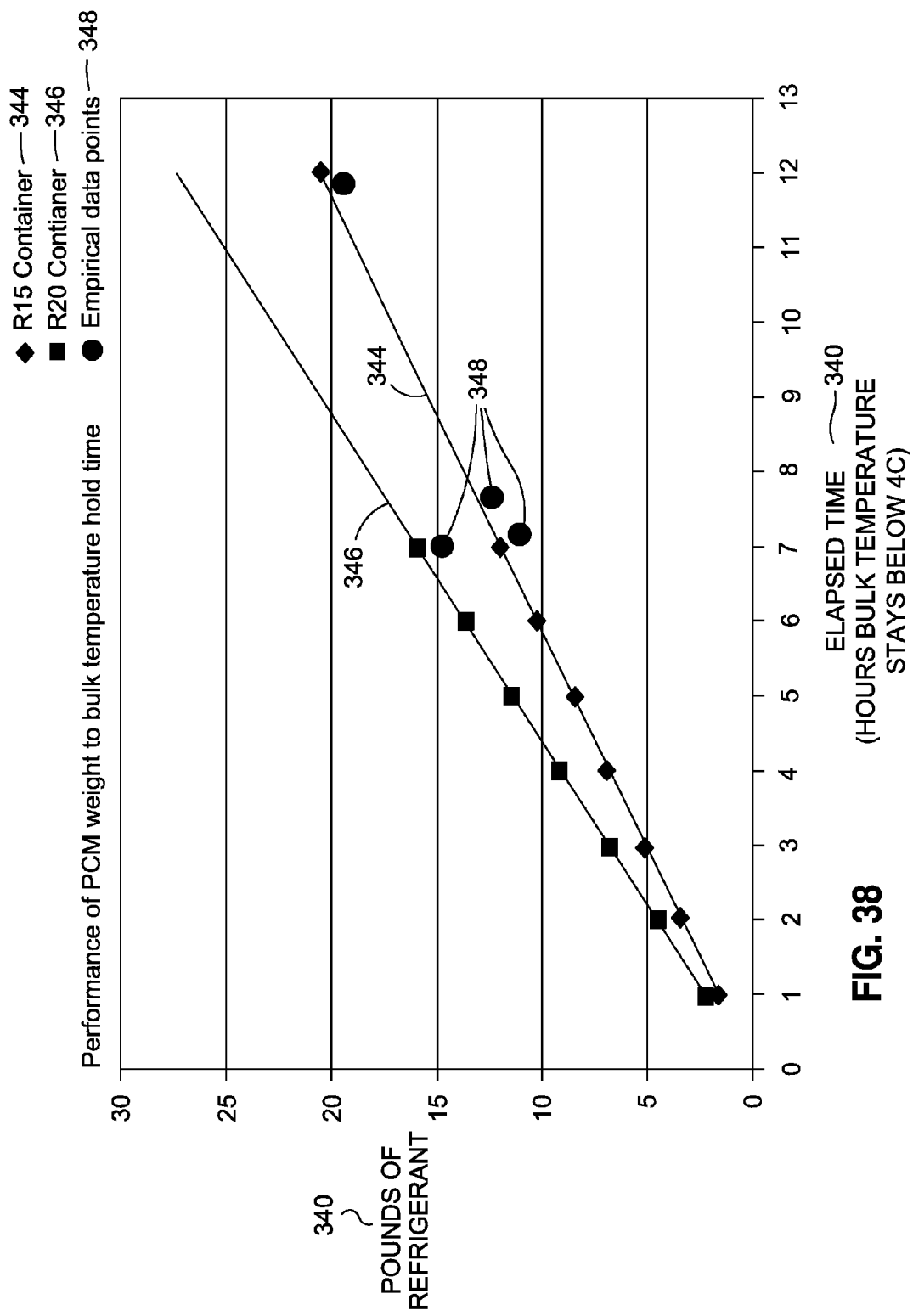
FIG. 38 is an illustration of a graph plotting quantity of refrigerant versus elapsed time for galley cart configurations having different R-values.

Referring to FIG. 38, shown is a chart illustrating the relative performance of the container system 10 (FIG. 1) as a function of phase change material and the R-value of the container body 14. More specifically, FIG. 38 is a plot of mass (e.g., pounds) of refrigerant vs. elapsed time during which the mass of phase change material maintains the container interior 42 below a predetermined temperature. In this regard, FIG. 38 illustrates the performance of a carboxymethyl cellulose-based phase change material in different quantities measured in pounds and the time period during which the container interior 42 is maintained below a temperature of 4°

C. for a cart having two different R-values. For example, FIG. 38 illustrates a plot of the performance of a galley cart 12 having a collective R-value of 15 as compared to a galley cart 12 having a collective R-value of 20. The collective R-value of the galley cart 12 may be defined as the collective insulative capability of the side, top and bottom walls 16, 30, 32 and the cart doors 20 that enclose the container interior 42 as shown in FIG. 2.

Shown also in FIG. 38 are empirical data points which closely correspond to the analytical data for the two plots. The empirical data points are provided to validate the analytical performance of the phase change material in the different quantities relative to the elapsed time during which the container interior 42 is maintained below 4° C. As can be seen in the graph of FIG. 38, the cart configuration having an R-value of 15 exhibits a shortened elapsed time for maintaining the container interior 42 below 4° C. as compared to the cart configuration having a collective R-value of 20. For example, FIG. 38 illustrates that for a quantity of 2 pounds of phase change material in a cart configuration having a collective R-value of 15, the air temperature of the container interior 42 is maintained below 4° C. for approximately 3.5 hours as compared to the same quantity of phase change material in a cart configuration having a collective R-value of 20 and which provides an elapsed time of almost 5 hours during which the air temperature within the container interior 42 is maintained below 4° C. As can be seen, the R-value of the galley cart 12 (FIG. 1) may be a significant factor in the refrigeration capability of the container system 10 (FIG. 1).

Figure 39:
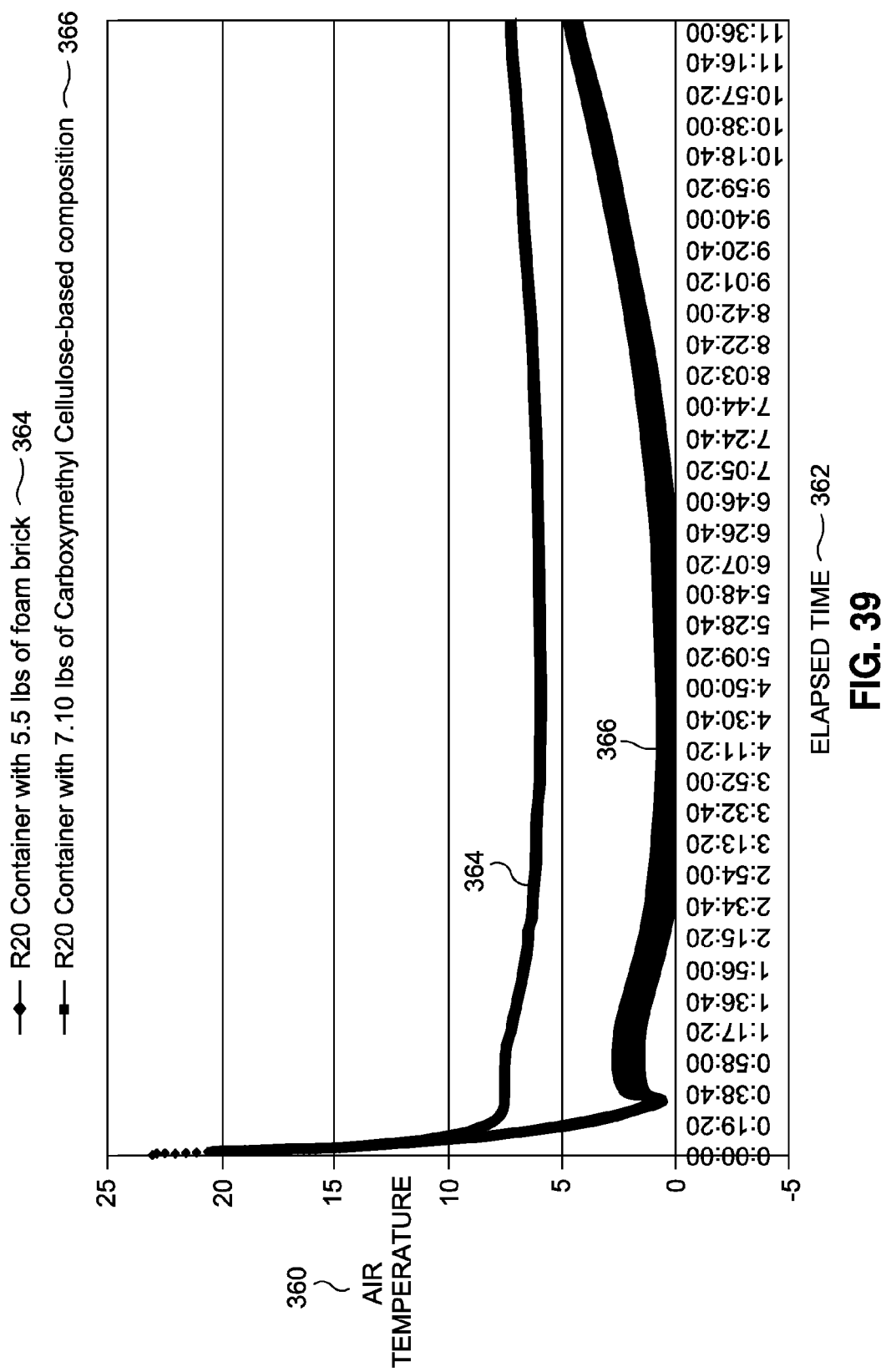
FIG. 39 is an illustration of a graph plotting air temperature of the container interior versus elapsed time and comparing configurations of the galley cart having similar R-values and containing different quantities and types of refrigerant.

Referring to FIG. 39, shown is a comparison of different refrigerants as used in cart configurations having substantially similar R-values. For example, FIG. 39 represents a plot of air temperature versus elapsed time for a carboxymethyl cellulose-based phase change material as compared to a foam brick refrigerant. As can be in FIG. 39, the plot indicated by reference numeral 364 represents the air temperature of the container interior 42 (FIG. 2) for a cold tray 80 containing 5.5 pounds of foam brick refrigerant. Reference numeral 366 indicates a plot representing the air temperature of the container interior 42 for a cold tray 80 containing 7.1 pounds of carboxymethyl cellulose-based composition phase change material in a cart having a collective R-value of 20. As can be seen by comparing the two plots for the different quantities and types of phase change material, the larger quantity of carboxymethyl cellulose-based composition provides improved cooling capability as compared to the configuration containing a relatively smaller quantity (e.g., 5.5 pounds) of the foam brick refrigerant.

Referring again to FIG. 23, shown is the cold tray 80 which may contain any one of a variety of different types of refrigerants without limitation and which may include one or more of the phase change materials such as those illustrated in FIG. 37 and described above. The selection of the phase change material 190 may be based in part upon the desired temperature at which the container interior 42 (FIG. 2) may be maintained and the amount of time for maintaining such temperature. For example, a phase change material 190 having a relatively high latent heat may be desired for maintaining the container interior 42 at a relatively low temperature for relatively short durations.

Alternatively, a refrigerant 188 having a relatively low latent heat may be desired in larger quantities for maintaining the air temperature of the container interior 42 at a desired temperature for extended durations. In an embodiment, the phase change material 190 may comprise a eutectic material comprising a composition of two or more substances having a melting point that is lower than the melting point of each one of the individual substances. For example, the phase change material 190 may comprise a carboxymethyl cellulose-based composition having a phase transition temperature of approximately −20° C. which may be the temperature at which the material changes from a solid to a liquid. The refrigerant 188 may be selected based upon any one of a variety of different factors and is not limited to the air temperature at which the container interior 42 is to be maintained or the duration over which the temperature may be maintained.

Referring now to FIG. 25, shown is a top view of the fan compartment 136 of the cold tray 80 illustrating the relative positions of the upper and lower fans 142, 152 in an embodiment. As was earlier indicated, the cold tray 80 may comprise one or more circulation fans 140. In this regard, the arrangement illustrated in FIG. 25 is an example of any one of a variety of different arrangements for mounting the circulation fans 140 to or within the cold tray 80. Further in this regard, FIG. 25 is a non-limiting example of the positioning of the circulation fans 140 at one of the opposing ends of the cold tray 80 and is not to be construed as limiting alternative arrangements which may include positioning one or more circulation fans 140 at alternative locations along the length of the cold tray 80.

FIG. 25 further illustrates the logic circuit 172 for controlling the circulation fans 140 such as the upper and lower fans 142, 152. The logic circuit 172 may be communicatively coupled to one or more temperature sensors 174 which may be mounted to the cold tray 80 and which may be mounted within the container interior 42 and wirelessly and/or hardwired to the logic circuit 172. One or more thermostats 176 may also be included with the logic circuit 172 for regulating the operation of the upper and/or lower fans 142, 152. As can be seen in FIG. 21, air that is drawn through the cold tray housing 82 may enter the upper fan inlet 144 illustrated in FIG. 25.

The air is then passed through an upper fan duct 146 before exiting the upper fan outlet 150. Similarly, air drawn through the cold tray housing 82 by the lower fan 152 enters the lower fan inlet 154 and passes through the lower fan duct 156 and is then is discharged into the container interior 42 through the lower nozzle 158 and lower fan outlet 160. It should also be noted that the arrangement of the circulation fan 140 may comprise a singular fan having a single impeller and from which two or more ducts (not shown) may extend such as from opposing sides of the fan housing. As may be appreciated, the cold tray 80 may comprise any suitable arrangement of circulation fans 140 for drawing air into the cold tray 80 and discharging the air back into the container interior 42.

Referring to FIG. 26, shown is a cross-sectional illustration of the fan compartment 136 illustrating the mounting of the upper and lower fans 142, 152 to the fan compartment 136 such as by means of one or more bosses 162. The bosses 162 may facilitate mechanical attachment of respective ones of the upper and lower fans 142, 152 to the fan compartment shell 138 although the upper and lower fans 142, 152 may be mounted to the cold tray 80 by any suitable means. As can be seen in FIG. 26, air flows through the upper and lower fans 142, 152 and is discharged out of the cold tray 80 from respective upper and lower fan outlets 150, 160 to form the upper and lower airflow circuits 106, 108 within the container interior 42 as best seen in FIG. 6.

Figure 27:
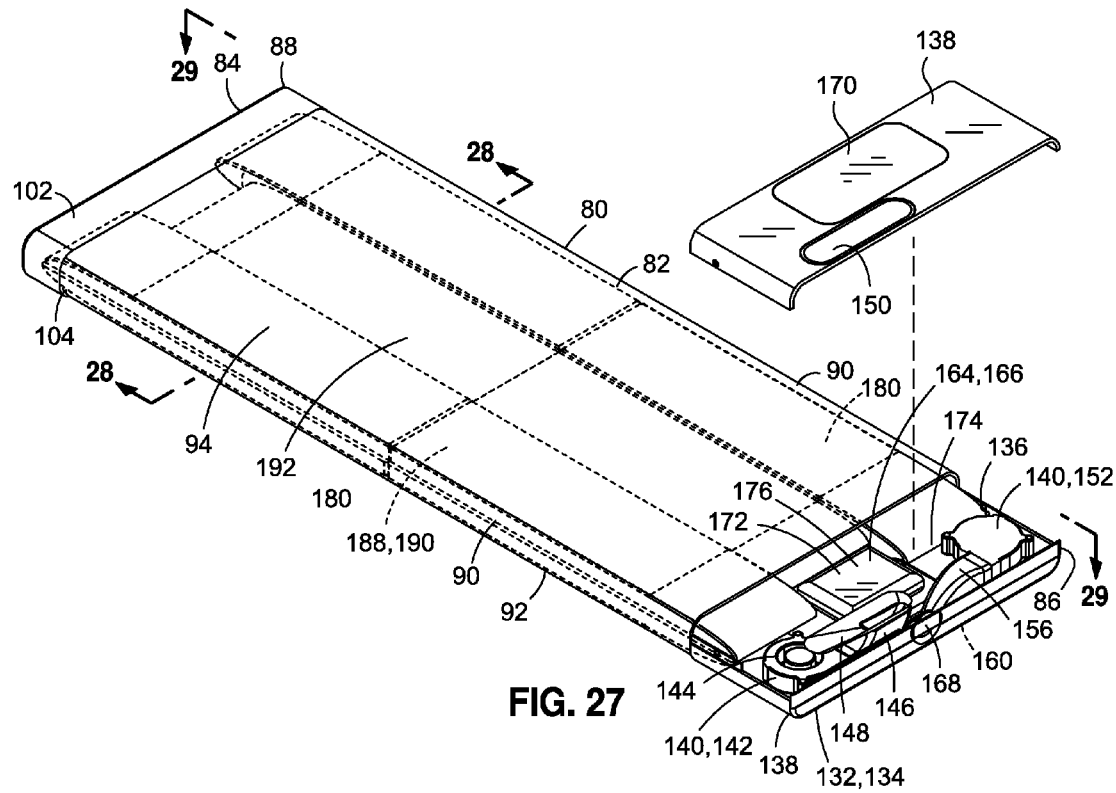
FIG. 27 is a perspective illustration of the cold tray and a cold pack having a generally streamlined shape.
Figure 28:
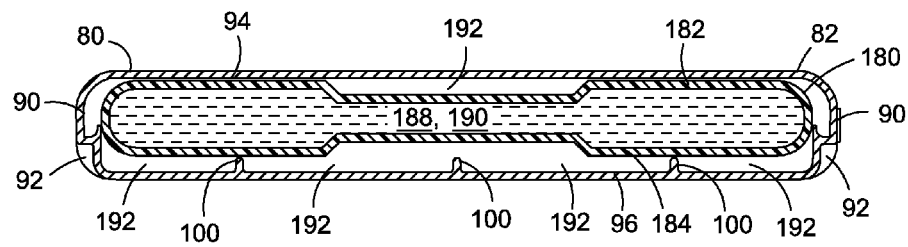
FIG. 28 is a sectional illustration of the cold tray taken along line 28-28 of FIG. 27 and illustrating refrigerant contained within the cold pack and further illustrating a cold pack air channel formed between the cold tray housing and the cold pack.

Referring to FIG. 27, shown is a perspective illustration of an alternative embodiment of a cold pack 180 mounted within the cold tray housing 82. As shown in FIG. 27, the cold pack 180 may comprise one or more cold packs 180 that may collectively define a generally streamlined shape in order to facilitate the flow of air between the cold tray housing 82 and the cold pack. FIG. 28 is a sectional illustration of the alternative embodiment of the cold pack 180 illustrated in FIG. 27. As can be seen in FIG. 28, the embodiment of the cold pack 180 may optionally include recesses extending along a length of the cold pack 180 to define upper and/or lower cold pack air channels 192 that improve air flow through the cold tray housing 82. The cold tray housing 82 may include internal ribs 100 which may be optionally formed on the top side 94 and/or bottom side 96 of the cold tray housing 82 to space the cold pack 180 away from the cold tray housing 82 and facilitate air flow therebetween.

FIG. 29 is a top view of the cold tray 80 illustrating a profile of the cold pack 180 in the streamlined embodiment. As can be seen in FIG. 29, the cold pack 180 may be provided as two individual cold pack 180 elements. In an embodiment, the cold packs may be mirror-images of one another and mounted in back-to-back arrangement. Alternatively, the cold pack 180 may include an intermediate cold pack configured to be mounted between the end-most ones of the cold packs 180 to preserve the cross sectional shape for airflow efficiency. Each one of the cold packs 180 may optionally include an indentation 186 to accommodate a filler cap to facilitate emptying the contents of the cold pack 180 and refilling the cold pack.

FIG. 30 is a side sectional illustration taken along line 30-30 of FIG. 29 and illustrating a streamlined profile shape of the cold pack 180 for facilitating the flow of air through the cold tray housing 82 from the back end 88 toward the front end 86 of the cold tray housing 82. Also illustrated in FIG. 30 is a cold tray end gap 98 which is preferably provided between the cart door 20 and the cold tray air inlet 84 to facilitate drawing of air into the cold tray housing 82. Likewise, the front end 86 of the cold tray 80 may be mounted in spaced relation to the cart door 20 to facilitate mixing of air discharged by the upper and lower fans 142, 152. It should also be noted that although FIGS. 24 and 30 illustrate configurations of the cold tray 80 that may contain refrigerant, the present disclosure contemplates the installation of spacer packs 194 within the cold tray housing 82. The spacer packs 194 may be substantially devoid of refrigerant 188 and may be included with cold packs 180 containing refrigerant. A set of cold packs 180 containing one or more spacer packs 194 may be installed inside a single one of the cold trays 80 as a means to preserve the flow of air over and around the cold pack 180 assembly within the cold tray housing 82.

For example, FIG. 24 may include a spacer pack 194 as a substitute for any one of the three cold packs 180 mounted in the cold tray 80. Likewise, the back-to-back arrangement of the streamlined-shaped cold packs 180 illustrated in FIG. 30 may include a spacer pack 194. A spacer pack 194 may be desired wherein only a portion of the container interior 42 may comprise food trays 120. For example, a majority of the food trays 120 may be located adjacent to a front end 86 of the cold tray 80 such that a cold pack 180 is required in the front end 86 of the cold tray housing 82. The back end 88 of the container interior 42 may be devoid of food trays 120 obviating the need for a cold pack 180 toward the back end 88 of the cold tray 80. As may be appreciated, the desire for including a spacer pack 194 in the cold tray 80 may be based upon a variety of alternative factors.

Figure 31:
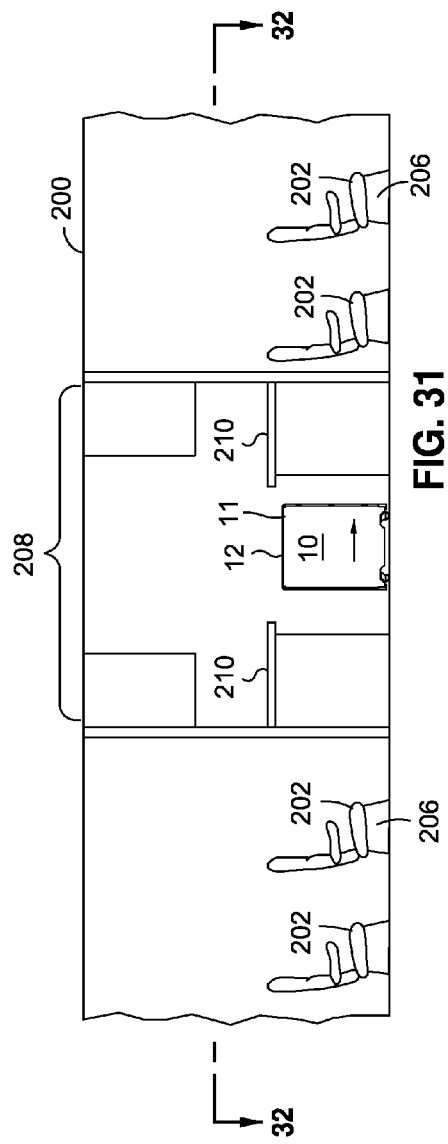
FIG. 31 is a side view of a galley area of an aircraft illustrating insertion of one of the galley carts into a cart storage slot.

FIG. 31 is a side sectional illustration of an aircraft 200 cabin interior illustrating a galley area 208 of the cabin and illustrating a plurality of seats 202 arranged in seat rows 204 separated by seat aisles 204. The seat rows 204 are located forward and aft of the galley in the conventional manner. FIG. 31 illustrates a galley cart 12 prior to installation in a cart storage slot 212 of the galley structure 214. The cart storage slot 212 may be mounted below a countertop 210 of the galley area 208. In this regard, the galley area 208 may include a plurality of cart storage slots 212 configured to receive one or more of the galley carts 12.

Figure 32:
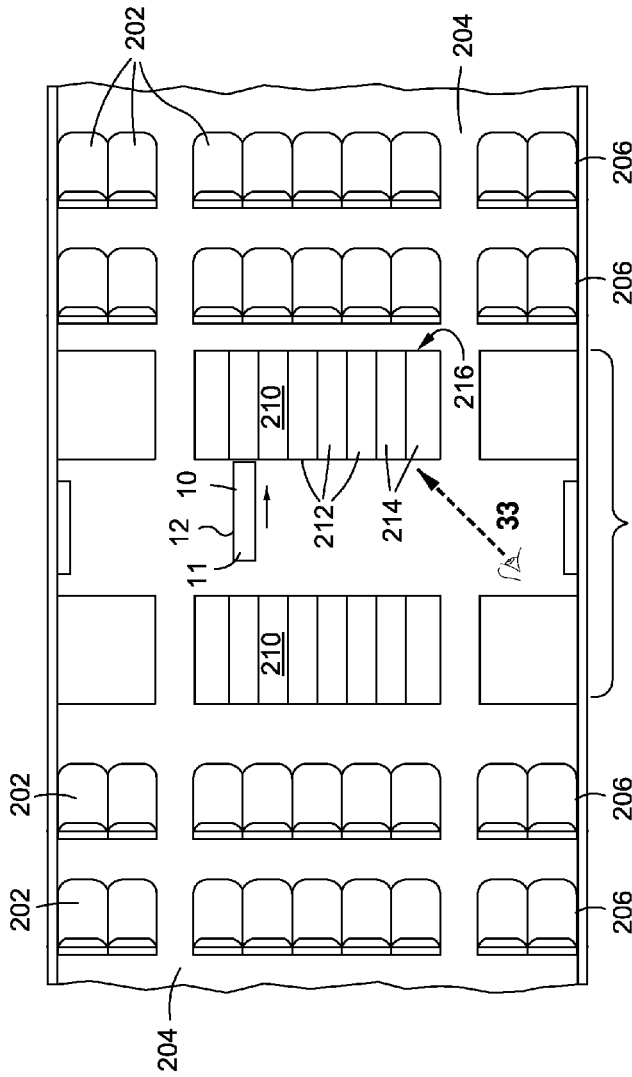
FIG. 32 is a top view of the galley area illustrating the insertion of one of the galley carts into one of the cart storage slots of a galley structure.

FIG. 32 is a top view of the aircraft 200 galley area 208 taken along line 28-28 of FIG. 27 and illustrating an arrangement of the galley area 208 comprising multiple cart storage slots 212. As was indicated above, the self-contained nature of the cold tray 80 minimizes or eliminates the need for active refrigeration such as chiller units in the galley area 208. In addition, the absence of aircraft refrigeration may eliminate the need for the ducting and gaskets necessary for cooling conventional galley carts. Without the space required for ducting and gaskets of the prior art, the footprint of the galley area 208 may generally be reduced in certain aircraft cabin configurations such that an additional row of seats 202 may be added to the aircraft cabin.

Figures 33, 34:
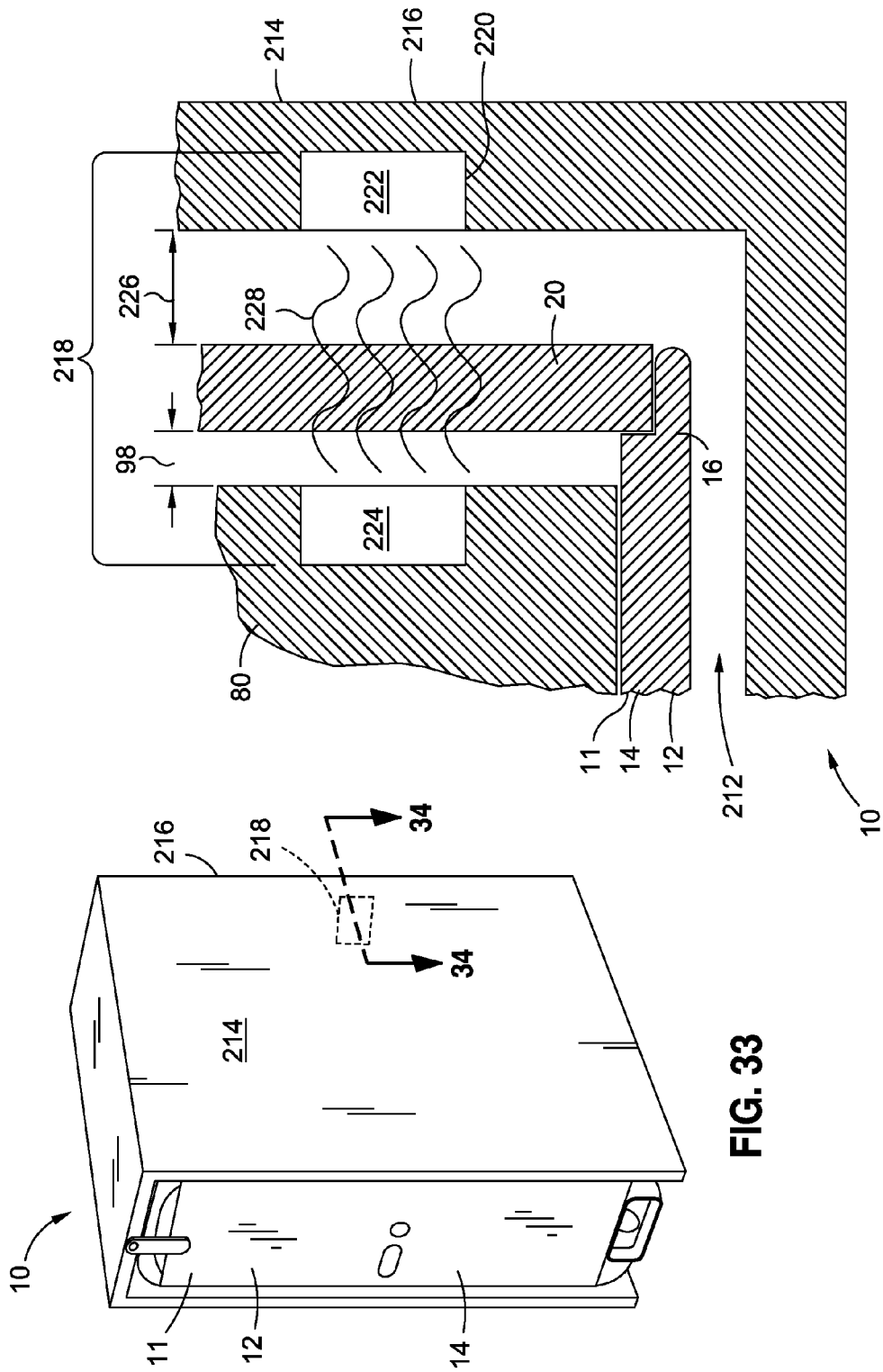
FIG. 33 is a perspective illustration of the galley cart stored in one of the galley storage slots and further illustrating an inductive charging system for charging a battery pack.
FIG. 34 is a top sectional illustration of a portion of the galley cart and the galley structure housing the galley cart and illustrating inductive charging of the battery pack.

FIG. 33 is a perspective illustration of the galley cart 12 installed inside a galley structure 214 in the galley area 208 (FIG. 31-32). The galley structure 214 may form a cart storage slot 212 for housing a galley cart 12 during periods of non-use. In an embodiment, the container system 10 may comprise an inductive charging system 218 for charging the battery pack 166 during such periods of non-use of the galley cart 12. As was earlier indicated, the battery pack 166 may be mounted to or contained within the cold tray housing 82, the fan module 134 or the container body 14 for powering the one or more circulation fans 140 of the cold tray 80 (FIG. 34).

The container system 10 may optionally be provided with the capacity for charging the battery pack 166 by an inductive charging unit 220. In this regard, the battery pack 166 may be inductively coupled to the inductive charging unit 220 which may be integrated with or mounted to the galley structure 214. For example, FIG. 33 illustrates the galley structure 214 including a structure back wall 216. The structure back wall 216 may include a transmitter 222 for inductively coupling to a receiver 224 which may be mounted to the cold tray 80 (FIG. 34). The receiver 224 on the cold tray 80 may be communicatively coupled to the battery pack 166 for recharging the battery pack 166 when the galley cart 12 is docked within the galley structure 214 and the inductive charging system 218 is activated.

In this regard, the inductive charging unit 220 may be activated such that an electromagnetic field 228 is generated by the transmitter 222 and is inductively coupled to the receiver 224 across the relatively short distance between the transmitter 222 and the receiver 224. The receiver 224 on the cold tray 80 may convert the electromagnetic field 228 into electrical current for charging the battery pack. As can be seen in FIG. 33, the electromagnetic field 228 may extend across an air gap 226 between the cart door 20 and the structure back wall. The galley structure 214 may be configured to maintain the air gap 226 at a relatively short distance such as approximately 1 inch although the air gap 226 may comprise any distance. The electromagnetic field 228 may extend across the air gap 226 between the galley structure 214 and the galley cart 12, across the thickness of the cart door 20 and across the cold tray end gap 98 between the cold tray 80 and the cart door 20.

Referring to FIG. 34, the inductive charging system 218 may be configured to charge the battery pack 166 (FIGS. 21-22). For example, the upper and lower fans 142, 152 (FIG. 22) described above may require a relatively low-voltage power supply such as a 12-volt system and drawing relatively small amounts of electrical current such as less than approximately 0.5 amps. However, the power source 164 and upper and lower fans 152, 152 may be provided in any suitable voltage range and current draw. The electromagnetic field 228 may be may be transmitted through the materials that make up the container system 10. Such material may be substantially electromagnetically transparent at least in the location of the inductive charging system 218. For example, at least a portion of the cart door 20 may be formed of fiberglass, pressed fiberboard, polymeric material and any other substantially electromagnetically transparent materials. The galley structure 214 may be sized and configured to accommodate the transmitter 222 such that the transmitter 222 may be integrated into the galley structure 214 or mounted to the galley structure 214.

Referring to FIGS. 35-36, shown is an embodiment of the container system 10 wherein the air circulation fan 140 may be powered by an air supply 230 as an alternative to electric-motor driven embodiments of the circulation fan 140 powered by an electrical power source such as the battery pack 166 described above. Shown in FIG. 35 is a top sectional view of the container system 10 docked within the galley structure 214. The air circulation fan 140 is shown mounted within the fan module 134 or cold tray 80 and is fluidly coupled to the air supply 230 when the galley cart 12 is docked in the galley structure 214. The air supply 230 may comprise a conduit containing compressed air of an existing aircraft system. For example, the compressed air supply 230 may be drawn from the aircraft gasper air system (not shown) which may originate as engine bleed air that may be conditioned and routed to the galley and/or along the overhead sections (not shown) above the passenger seats. However, the air supply 230 may be provided by any suitable source and is not limited to drawing air from the gasper air system.

Referring still to FIG. 35-36, the air supply 230 may terminate at a fitting 234 such as a quick-disconnect fitting optionally mounted to the container 11 for engaging the air supply 230. The fitting 234 and the air supply 230 may optionally include a one-way valve (not shown) to seal the air supply 230 and the cold tray 80 or fan module 134 during periods of non-use. The air supply 230 may provide a flow of air such as compressed air to a turbine 232 that may be mechanically coupled to the circulation fan 140 mounted within the fan module 134, cold tray 80 or mounted to the container 11. The turbine 232 may include vanes (not shown) that may be rotatably driven by the air supply 230 causing the circulation fan 140 (e.g., upper fan) to discharge air from the cold tray 80 to the container interior 42.

The galley cart 12 may be configured such that the air supply 230 illustrated in FIGS. 35-36 is engaged to the galley cart 12 at the fitting 234 when the galley cart 12 is inserted into the galley structure 214 as illustrated in FIGS. 31-32. Alternatively, the air supply 230 may be connected to the air turbine 232 by means of ducting and/or gaskets (not shown). Advantageously, the air-driven arrangement of the circulation fan 140 illustrated in FIGS. 35-36 may reduce the weight, complexity and maintenance associated with an electric-motor driven circulation fan.

Figure 40:
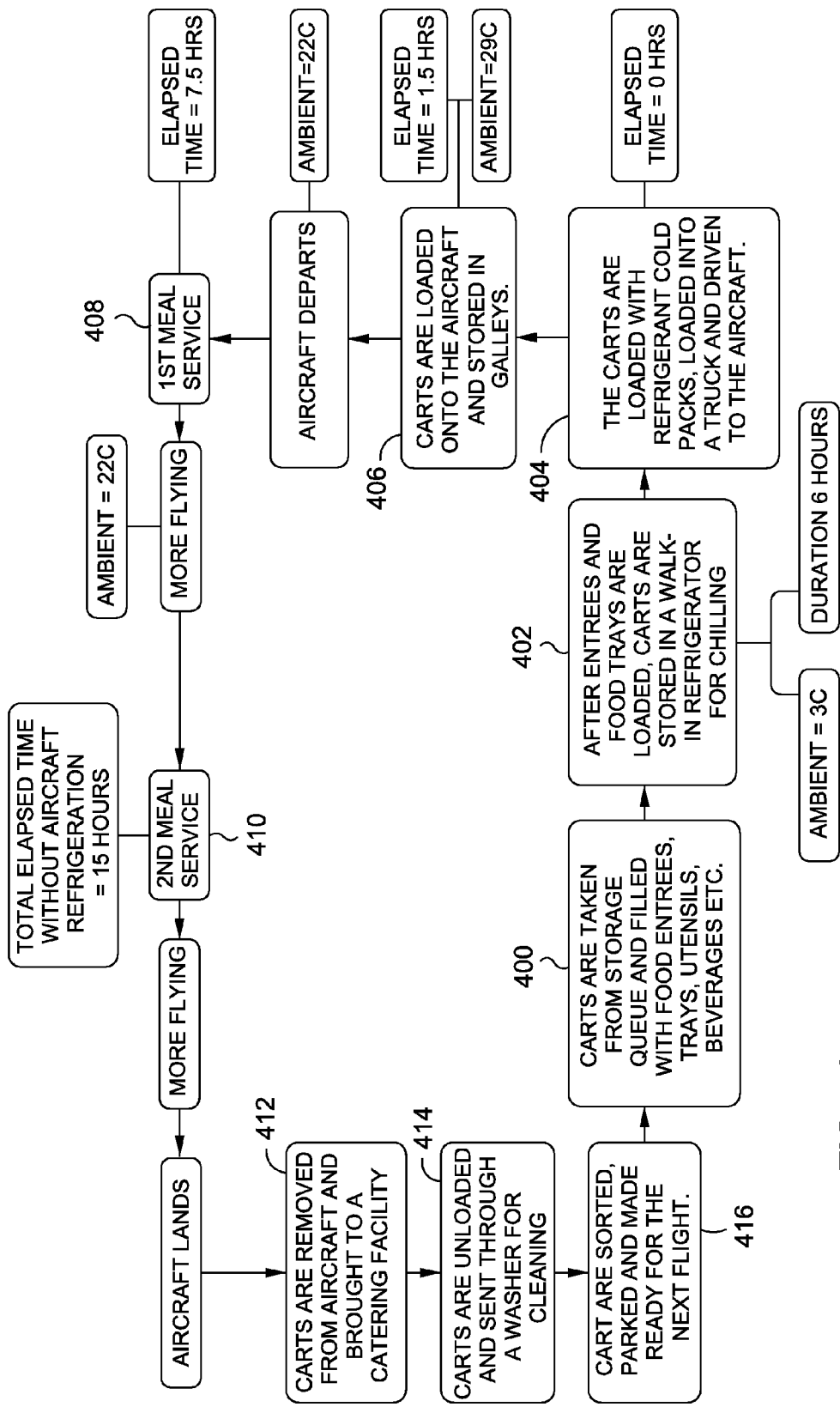
FIG. 40 is a flow chart illustrating a method of operating a galley cart.

Referring now to FIG. 40, shown is a flow chart illustrating operations for implementing the container system 10 (FIG. 1) as disclosed herein. In this regard, FIG. 40 illustrates various operations that may be included in implementing one or more container systems for use in any one of a variety of industries including, without limitation, use in airline operations. For example, in step 400, galley carts 12 (FIG. 1) may be taken from storage and the interiors may be filled with food trays 120 comprising food entries, trays, utensils and/or beverages. As indicated above, a caterer may prepare the food items to create airline meals for distribution to passengers during the course of a flight on a commercial airliner. In step 402, the food trays 120 containing prepared food items may be loaded within the container interior 42 by mounting the food trays 120 on the tray supports 48 in a manner as illustrated in FIGS. 3-6.

FIG. 40 further illustrates step 402 which may include storing the loaded galley carts 12 (FIG. 1) within a walk-in refrigerator (not shown) for maintaining the temperature of the galley carts 12 at a safe level. The refrigerator may have a relatively low ambient air temperature of approximately 3° C. sufficient for maintaining the container interior 42 at a temperature of 4° C. or any other suitably low temperature. The individual carts may be stored within the walk-in refrigerator for a desired time period which may extend to 6 hours or beyond in anticipation of an upcoming airline flight.

In step 404, shortly before departure of the aircraft, the galley carts 12 (FIG. 1) may be loaded with cold trays 80 wherein the cold trays 80 may be filled with cold packs 180 containing a selected refrigerant. The cold trays 80 may be installed at the desired location in the container interior 42 such as by mounting the cold trays 80 on the tray supports 48 similar to that which is illustrated in FIGS. 2 and 8. Fan modules 134 may be provided separately from the cold trays as removable units or integrated with the galley carts as described above. The cart doors 20 of the galley cart 12 may be latched closed and the galley carts 12 (FIG. 1) may be transported to the aircraft just prior to departure. The carts may be loaded onto a truck and may be transported to the aircraft.

In step 406, the galley carts 12 (FIG. 1) may then be loaded onto the aircraft 200 and may be stored in the galley area 208 as illustrated in FIGS. 27-28 and as described above. For example, each one of the galley carts 12 may be received within a cart storage slot 212 of the galley area 208. The battery packs may optionally be inductively charged using the inductive charging unit 220 if included within the galley structure 214. At any time during the process of loading the galley carts 12 onto the aircraft 200 or at any other time when food and/or other items are stored within the container interior 42 (FIG. 2), the cold trays 80 may be activated. In this regard, the upper and/or lower fans 142, 152 (FIG. 18) may be activated in order to maintain the temperature of the container interior 42 below a desired level.

Electrical power may be provided to the circulation fans 140 by means of the battery pack 166 or by any other suitable electric power source including an aircraft power system. Alternatively, the circulation fans 140 may be powered by the air supply 230 as illustrated in FIGS. 35-36 and as described above. The amount of time starting from loading of the galley carts 12 onto the aircraft 200 until aircraft departure may comprise approximately 1.5 hours although the amount of time may vary depending upon a variety of factors.

Referring still to FIG. 40, step 408 of the method may include removing individual galley carts 12 from the carts storage slots 212 (FIG. 28) and initiating the meal service process of distributing the airline meals to passengers. During meal service, the cart doors 20 may be open and closed for removal of food trays 120. The cold tray 80 and galley cart 12 (FIG. 2) may preferably be configured to maintain the air temperature of the container interior 42 to less than approximately 7° C. in the aircraft cabin environment which may have an ambient temperature of higher than approximately 22° C. by operating the upper and lower fans 142, 152 as needed or on a preprogrammed basis. Alternatively, the cold tray 80 and galley cart 12 (FIG. 2) may be configured to maintain the air temperature of the container interior 42 to less than approximately 4° C. in a cabin environment having an ambient temperature of higher than approximately 22° C.

As indicated in FIG. 40, the occurrence of the first meal service in step 308 may occur at an elapsed time of 7.5 hours or longer after initial loading of the galley carts 12 onto the aircraft.

FIG. 40 further illustrates step 410 comprising a second meal service wherein the cart doors 20 may again be opened and closed as need during distribution of the food trays 120 to the passengers. As indicated above, the container system may be configured to maintain the air temperature within the container interior 42 to below a desired minimum, (e.g. 7° C.) for an elapsed time of approximately 15 hours or longer although the total elapsed time within which the temperature may be maintained is dependent upon the type of refrigerant 188 contained within the cold tray 80 and the collective R-value (i.e., thermal resistance) of the galley cart 12. Following the second or final meal service, the galley carts 12 may be returned to the cart storage slots 212 in the galley area 208 (FIG. 27-28) wherein the battery packs 166 (FIG. 18) may be inductively charged by inductive coupling to the galley structure 214 similar to that which is illustrated in FIGS. 29 and 30 and described above. Alternatively, the battery packs 166 may be replaced and new battery packs 166 may be installed within the cold trays 80 as needed. In a further embodiment, the circulation fans 140 may be powered by the air supply 230 when the galley carts 12 are docked at the galley structure 214 and are coupled to the air supply 230 as illustrated in FIGS. 35-36.

In step 412 following landing of the aircraft, the galley carts 12 (FIG. 1) may be removed from the aircraft and transported to a catering facility wherein the carts may be unloaded in step 414. The cold trays 80 and food trays 120 (FIG. 2) may be removed and the galley cart 12 and food trays 120 may be cleaned. Step 416 may comprise sorting the galley carts 12 and organizing and parking the carts in preparation for the next flight. The cycle may be repeated starting with step 400 wherein the galley carts 12 may be removed from storage and the food trays 120 may be filled with food entries, utensils and again loaded into the container interior 42 using the tray supports 48. The cold trays 80 (FIG. 2) may also be loaded into the galley carts 12 prior to transporting the galley carts 12 to the aircraft. However, the cold trays 80 may be loaded and removed from the galley cart 12 at any time.

Figure 41:
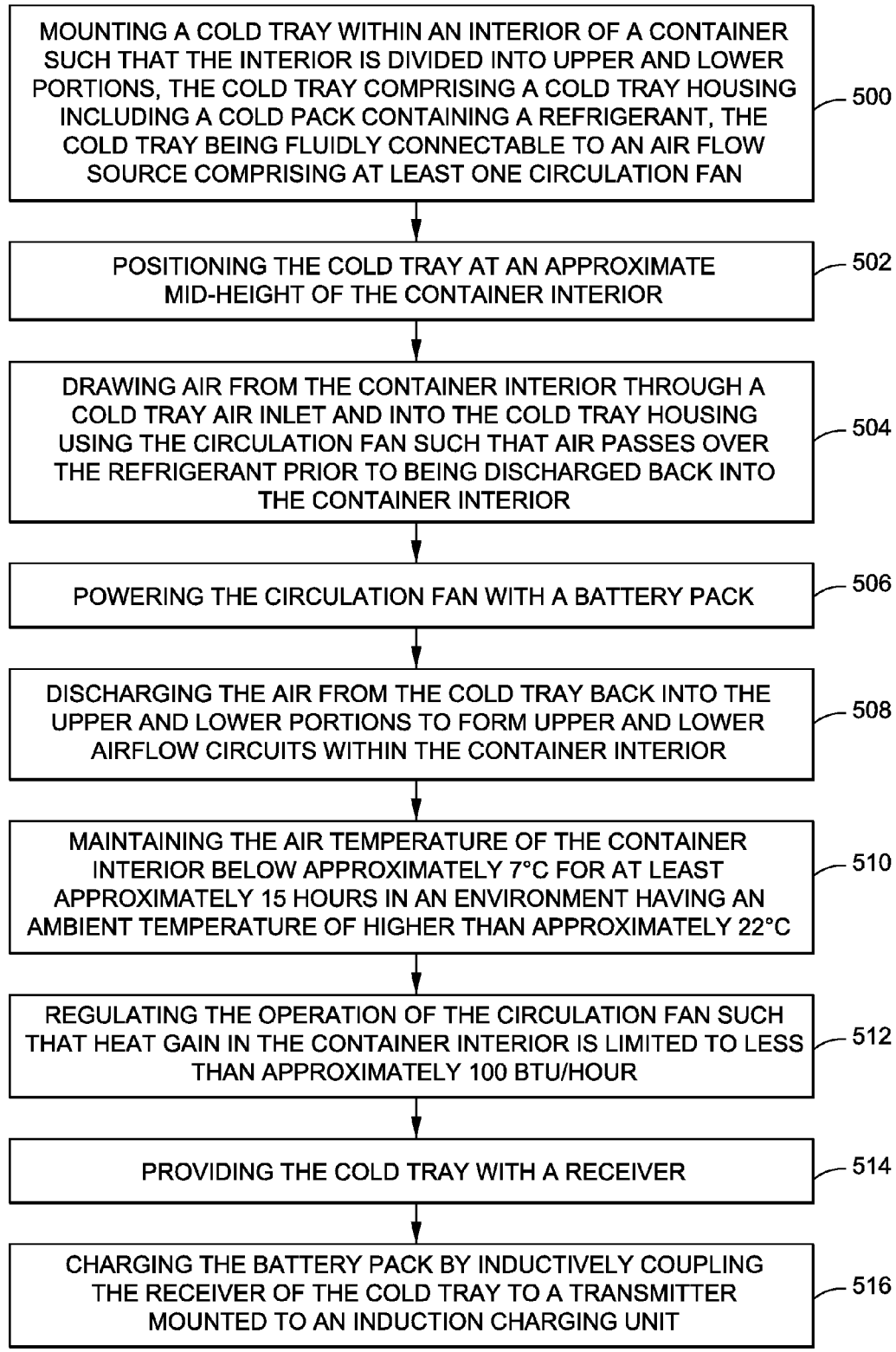
FIG. 41 is a flow chart of an embodiment of a method including one or more operations that may be performed in refrigerating the interior of a container.

Referring now to FIG. 41, shown is a flow chart illustrating a method for refrigerating the galley carts 12 (FIG. 1) for maintaining the air temperature of the container interior 42. The method may comprise step 500 of mounting one or more cold trays 80 in the cart at the desired location. For example, the cold tray 80 (FIG. 5) may be mounted at an approximate mid-height 110 of the container interior 42 as illustrated in FIG. 5 such that the cold tray 80 divides the container interior 42 into upper and lower portions 52, 54. As was earlier indicated, the cold tray 80 may comprise a cold tray housing 82 which may include one or more cold packs 180 (FIG. 12). The cold packs 180 may contain a refrigerant 188 such as a phase change material 190 for cooling air which passes by or surrounds the refrigerant. The refrigerant 188 may be contained within the cold pack 180 which may be removably housed within the cold tray 80. The cold tray 80 may be fluidly coupled to an air flow source 132. The air flow source 132 may include at least one circulation fan 140 (FIG. 22) and, in a preferable embodiment, may include an upper fan 142 and a lower fan 152 which may be mounted to a front end 86 of the cold tray 80 within a fan compartment 136 housing as best seen in FIG. 22. The circulation fan 140 may be mounted to the cold tray 80 and/or the container 11 as described above.

Referring still to FIG. 41, step 502 may comprise positioning the cold tray 80 at the desired location within the container interior 42. The fan module 134, if provided as a separate, removable unit, may also be mounted within the container interior 42. Step 504 may comprise drawing air from the container interior 42 through the cold tray air inlet 84 and into the cold tray housing 82 using the circulation fans 140 (i.e., upper and lower fans 142, 152) such that the air passes over or surrounds the refrigerant 188 which may be housed within one or more cold packs 180. FIG. 6 illustrates the discharge of air from the cold tray 80 by upper and lower fans 142, 152 which respectively generate the upper and lower airflow circuits 106, 108 which may move in a counter-rotating pattern relative to one another.

Step 506 comprises powering a circulation fan 140 such as the upper and lower fans 142, 152 using a power source 164 such as a battery pack 166. However, the upper and lower fans 142, 152 may be powered by any suitable power source 164 and are not limited to a battery pack 166. As was described above, the battery pack 166 may be located within the fan compartment 136 as best seen in FIG. 22 or to an exterior of the container 11 such as to the cart door 20 as illustrated in FIG. 21. The fan compartment 136 may include an access panel 170 for allowing access to the battery pack 166 for replacing the battery pack 166 and/or for allowing access to the logic circuit 172 which may regulate operation of the upper and lower fans 142, 152.

Step 508 of the method illustrated in FIG. 41 may comprise operating the upper and lower fans 142, 152 to direct the air into the upper and lower portions 52, 54 of the container interior 42 to form the upper and lower airflow circuits 106, 108. Advantageously, the orientation and positioning of the upper and lower fans 142, 152 on the front end 86 of the cold tray 80 facilitates establishment of the upper and lower airflow circuits 106, 108 wherein air flow from the front end 86 toward the back end 88 of the container interior 42. The air may pass over the layers of food trays 120 and is then drawn back into the cold tray housing 82 at the cold tray air inlet 84. The power may be provided to the upper and lower fans 142, 152 in a manner to maintain the air temperature within the container interior 42 below a predetermined level. In this regard, temperature sensors 174 may be mounted at locations within the container interior 42 to provide signals representative of the temperature at various locations within the container interior 42. Alternatively, one or more temperature sensors 174 may be incorporated into or mounted with the cold tray 80 such as on an exterior of the cold tray 80 adjacent the upper and lower fans 142, 152 in order to sense the temperature of the air within the container interior 42.

Step 510 may comprise maintaining the temperature within the container interior 42 below approximately 7° C. In this regard, the temperature of the container interior 42 may be maintained at any predetermined value. An embodiment of the container system 10 (FIG. 1) may comprise configuring the cold tray 80 and galley cart such that the air temperature of the container interior 42 is preferably maintained at a temperature of less than approximately 7° C. and, more preferably, at a temperature of less than approximately 4° C. for a duration of at least approximately 15 hours or longer when the cart is in environment having an ambient temperature of higher than approximately 22° C. or higher. In this regard, the 15-hour duration represents the portion of a long-haul commercial airline flight wherein the container system 10 may be operated in a substantially self-contained manner to maintain the air temperature within the container interior 42 starting from the initial loading of the galley carts 12 (FIG. 1) onto the aircraft until conclusion of the last airline meal service on a flight. The 22° C. (i.e., approximately 72° F.) temperature value represents an approximate cabin temperature within which the container system may maintain the air temperature of the container interior 42.

Toward this end, step 512 may comprise regulating the operation of the upper and lower fans 142, 152 (FIG. 22) such that heat gain in the container interior 42 is limited to less than approximately 100 Btu/hr. For example an embodiment of the method may comprises limiting the heat gain to less than approximately 65 Btu/hr in an environment having an external ambient temperature of at least approximately 29° C. As indicated above, heat gain of the galley cart 12 may be dependent in part upon the collective R-value of the container body 14 (FIG. 2) which may, in turn, depend upon the insulting efficiency of the door seals 26 (FIG. 2) and/or the R-value of the individual panels which make up the side walls 16, top and bottom walls 30, 32 and cart doors 20 of the container body 14.

A higher insulating capacity of the container body 14 may correspond to a reduced duration and frequency of operating the upper and lower fans 142, 152. Step 514 of the method of refrigerating the container interior 42 may comprise inductively charging the battery pack 166 by providing the cold tray 80 with a receiver 224 (FIGS. 32-33) for inductive coupling to a transmitter 222 that may be mounted to a galley structure 214 (FIGS. 32-33) or to any other suitable structure. The battery pack 166 may be charged in step 516 by inductively coupling the receiver 224 of the cold tray 80 to the transmitter 222 which may be mounted at a strategic location within the aircraft cabin such as within the galley area 208.

Referring now to FIGS. 42-73, shown are further embodiments of a container system 600 including a highly-insulated container 604 (e.g., FIGS. 42, 53, 61, 68) and one or more refrigerant trays 700 (e.g., FIGS. 44, 52, 60) configured to be mounted within the container interior 606. The refrigerant tray 700 may contain a refrigerant 188 that may sublimate from a solid directly to a cold gas 740 when the temperature of the refrigerant 188 exceeds a sublimation temperature of the refrigerant 188. For example, in a non-limiting embodiment, as mentioned above, the refrigerant 188 may comprise dry ice 752 (i.e., solid carbon dioxide) that may sublimate into gaseous carbon dioxide 754 (FIG. 45) when the temperature of the dry ice 752 exceeds −78° C. (approximately −109° F. at one atmosphere).

Although the refrigerant is described below as comprising dry ice for the container system embodiments illustrated in FIGS. 42-73, the refrigerant may comprise any material composition, without limitation, that sublimates from a solid to a cold gas when the temperature of the refrigerant exceeds a sublimation temperature. In an embodiment, the refrigerant tray 700 (FIG. 43) may be mounted above one or more food trays 120 (FIG. 43) that may be stored within the container 604. An embodiment of the refrigerant tray 700 (FIG. 44, 52) may include sublimation ports 728 (FIG. 44, 52) to allow the cold gas 740 such as carbon dioxide gas 754 from dry ice refrigerant to exit the refrigerant tray 700 and circulate through the container interior 606.

Figure 53:
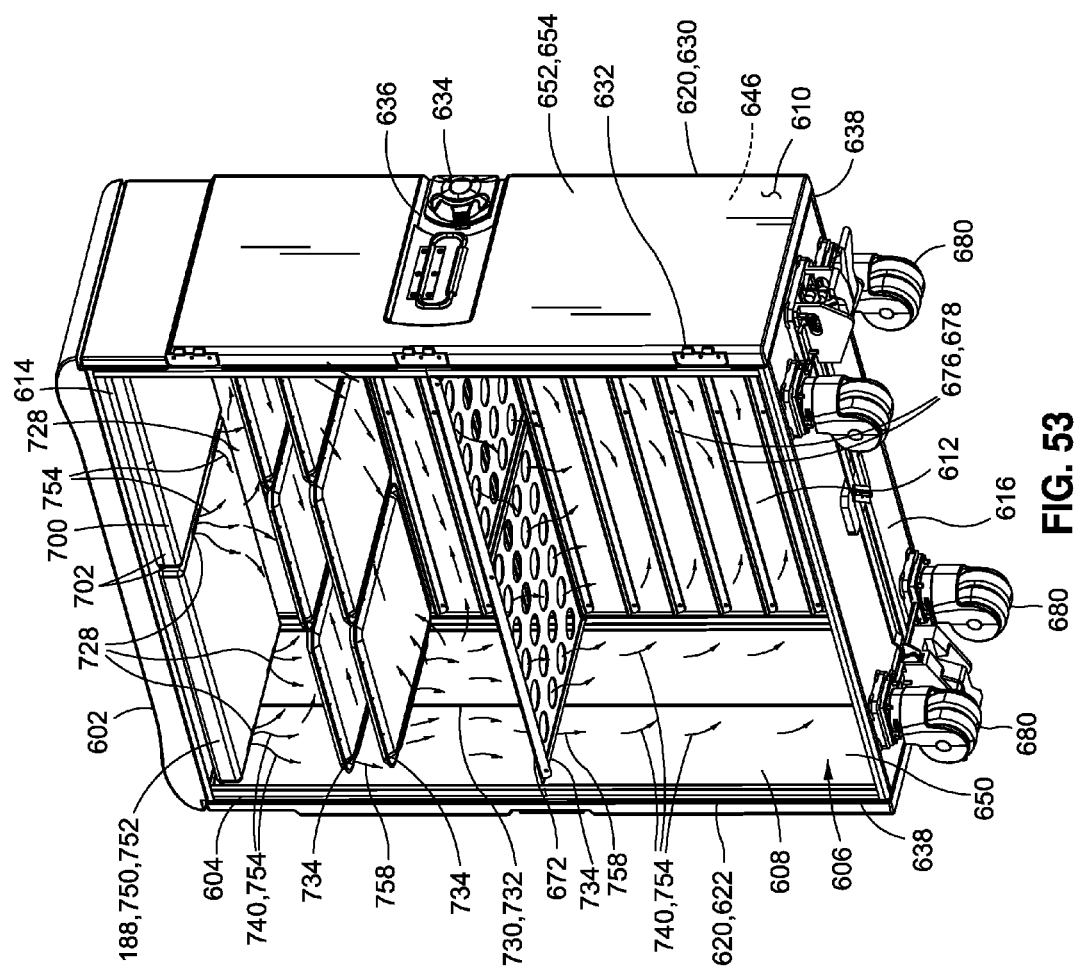
FIG. 53 is a perspective illustration of the container system having a spacer device mounted on an interior surface of a cart door for maintaining an air gap between food trays and the cargo door and further illustrating cold gas exiting the sublimation ports and passing through the air gaps.
Figure 54:
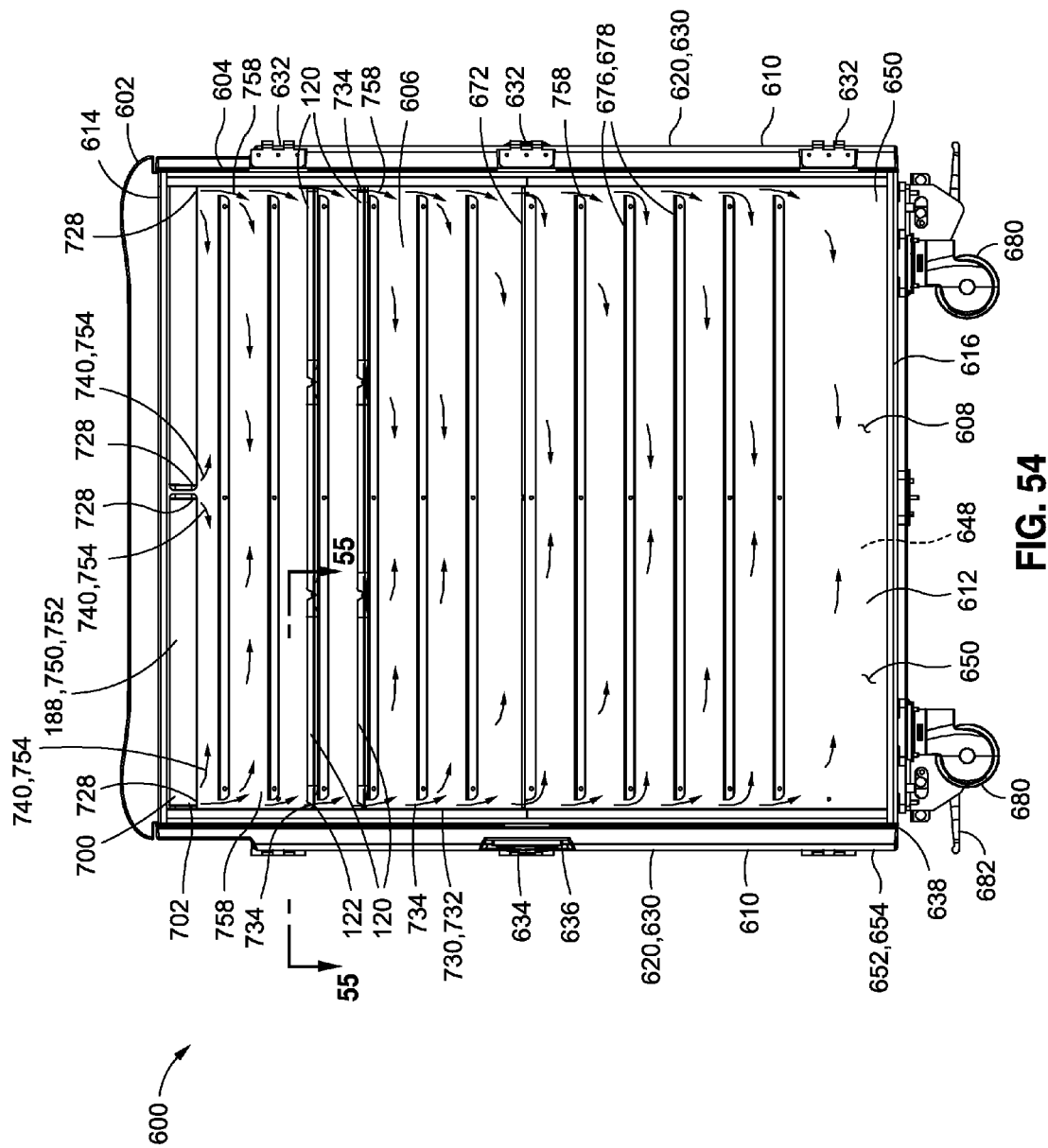
FIG. 54 is a side view of the container system illustrating the cold gas exiting the sublimation ports and flowing along sublimation paths within the container interior.

As shown in FIGS. 53-54, due to the cold temperature of the cold gas 740 or carbon dioxide gas 754 relative to the air within the container 604 and due to the high density of cold gas 740 or carbon dioxide gas 754 relative to the air density, the cold gas 740 or carbon dioxide gas 754 may flow downwardly from the sublimation ports 728 and mix with the air in the container interior 606 to cool the container interior 606. Alternatively, as shown in FIGS. 59-60, the refrigerant tray 700 (FIG. 60) may be provided without any openings such that the cold gas 740 or carbon dioxide gas 754 (FIG. 45) may be generally trapped or contained within the refrigerant tray 700. For the refrigerant trays 700 (FIG. 60) lacking openings, the container interior 606 may be cooled by contact of the air with the refrigerant tray walls 704, 706, 708, 710 after which the cold air 760 (FIG. 59) may sink and displace relatively warm air 762 (FIG. 59) causing the warm air 762 to rise and cool when contacting the refrigerant trays 700 and forming one or more convective cycles (FIG. 59) as described in greater detail below.

Advantageously, the combination of the refrigerant trays 700 (FIGS. 44, 54, 60) and the highly-insulated container 604 (e.g., FIGS. 42, 53, 56, 68) provides a passively-cooled system for maintaining food items at a safe temperature for extended periods of time. For example, one or more of the embodiments of the container 604 and the refrigerant tray 700 may maintain the air temperature within the container interior 606 at less than approximately 7° C. (approximately 45° F.) for extended durations. In an embodiment, the refrigerant tray 700 and the container 604 may be implemented in a galley cart 602 of an aircraft and may cooperatively maintain the air temperature within the container interior 606 of the galley cart 602 at less than approximately 4° C. (approximately 39° F.) for a period of at least approximately 15 hours in an environment (e.g., an aircraft cabin) having an ambient air temperature of greater than approximately 29° C. (approximately 84° F.).

Figure 42:
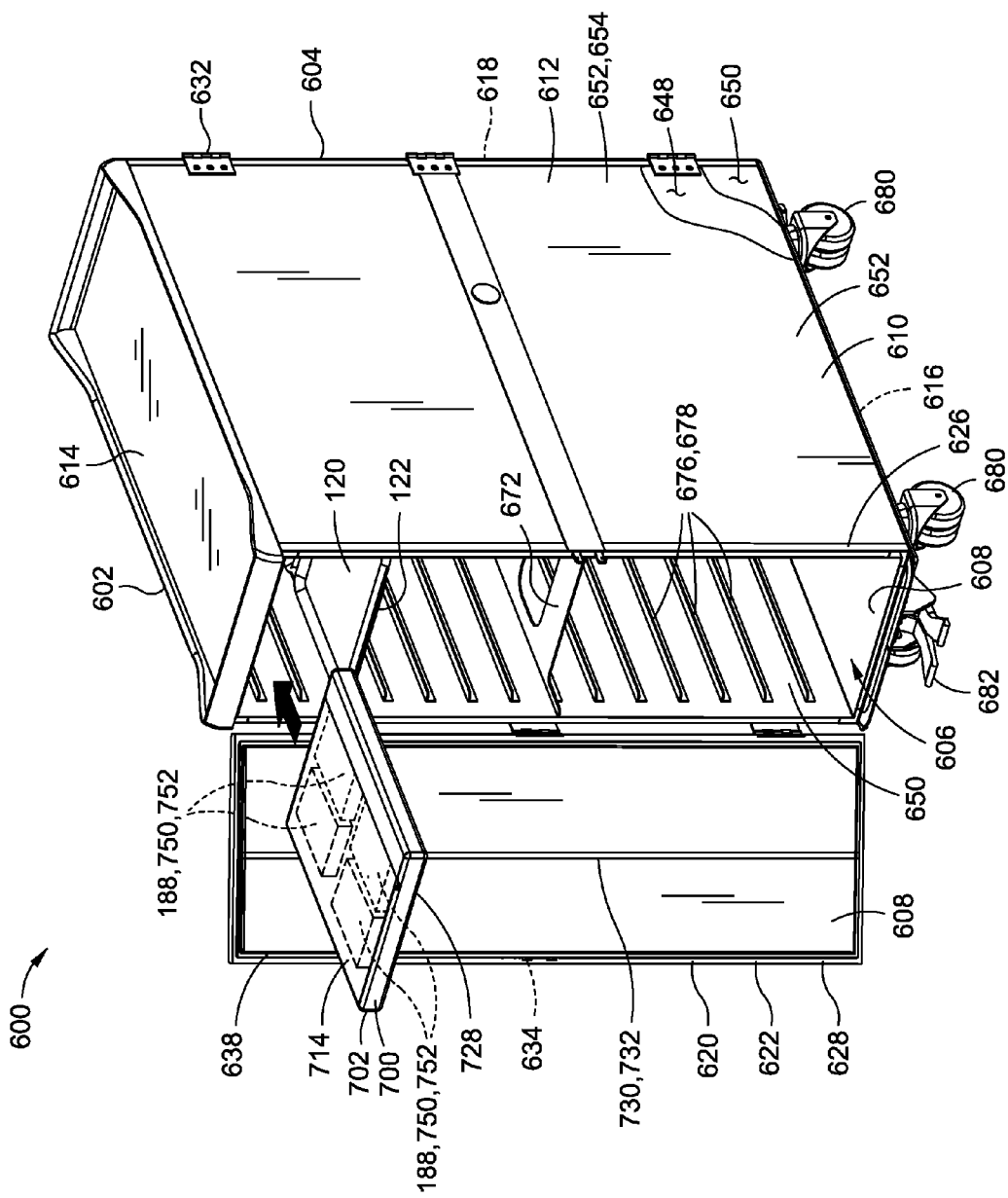
FIG. 42 is a perspective illustration of the container system in an embodiment including a refrigerant tray that may be mountable within the container interior.

Furthermore, embodiments of the container system 600 (e.g., FIGS. 42, 53, 56, 59, 61, 68) may advantageously eliminate a dependency on a dedicated mechanical refrigeration system (not shown) for cooling galley carts 602. Elimination of a dedicated refrigeration system for the galley carts 602 may also eliminate the noise, cost, and complexity associated with such mechanical refrigeration systems. In addition, embodiments of the refrigerant tray 700 (e.g., FIGS. 44, 54, 60) may be provided with a relatively thin profile or relatively low height such that the refrigerant tray 700 occupies a relatively small volume of the container interior 606 (FIG. 42). In this manner, the container 604 (FIG. 42) may provide storage space for a large quantity of food trays 120 (FIG. 42). Furthermore, the relatively low profile refrigerant tray 700 may be implemented in existing galley cart configurations such that airlines may use their existing inventory of galley cart storage bins (not shown) and food trays 120.

Figure 43:
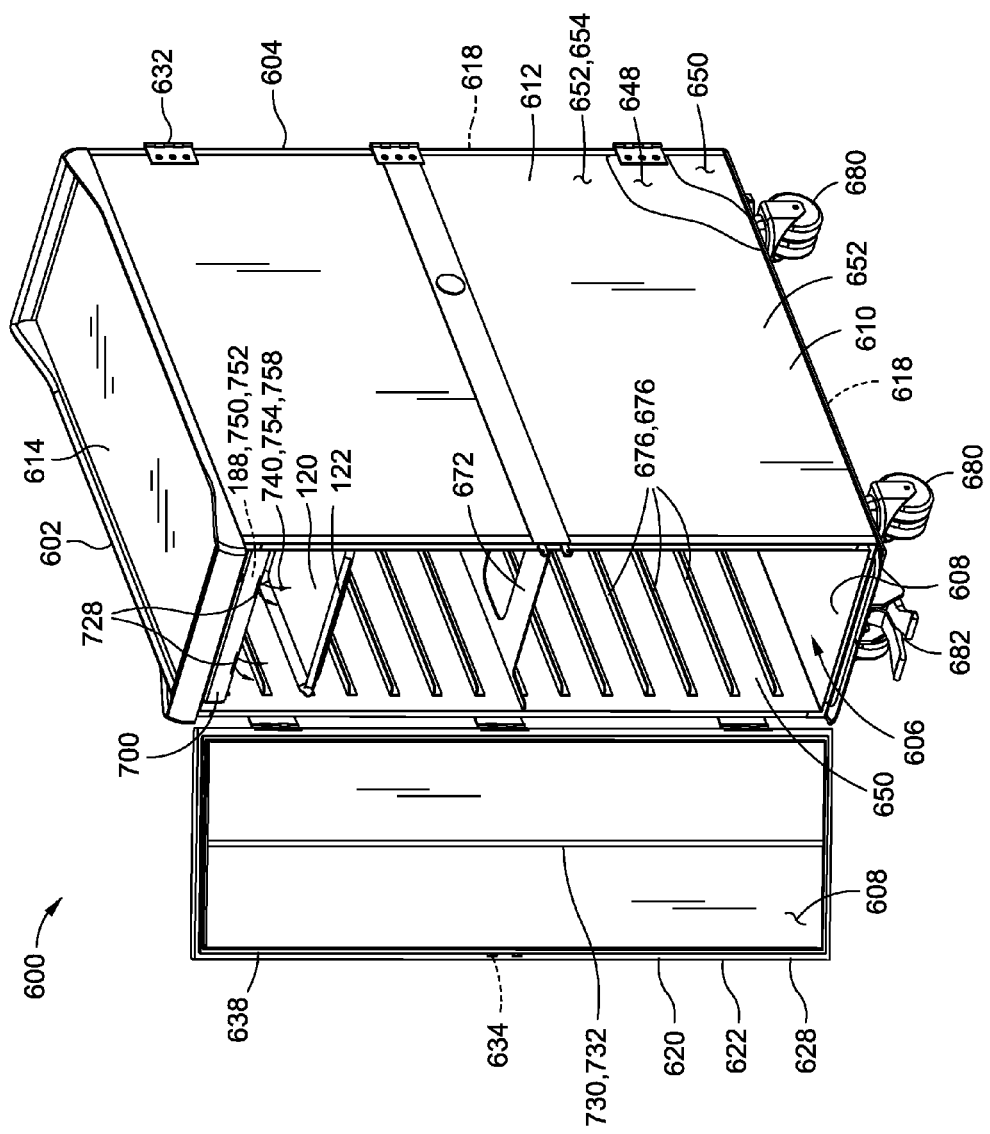
FIG. 43 is a perspective illustration of the container system showing the refrigerant tray mounted within the container interior.

Referring to FIGS. 42-43, shown is the container 604 and a refrigerant tray 700 which may be positioned within the container interior 606. The container 604 may include an opposing pair of side walls 612 interconnected by a top wall 614 and a bottom wall 616. The container 604 may include a set of casters 680 to facilitate moving the container 604. In an embodiment, the container 604 may comprise a galley cart 602 containing food trays 120 for serving meals to passengers in an aircraft cabin (not shown). The casters 680 may facilitate moving the galley cart 602 up and down main aisles (not shown) of the aircraft cabin. Each one of the side walls 612, top wall 614 and bottom wall 616 may include one or more vacuum insulated panels 648. The vacuum insulated panel(s) 648 may be sandwiched or captured between an inner shell 650 and an outer shell 652 as described in greater detail below.

The container 604 may include a plurality of vertically spaced tray supports 676 or tray rails 678 extending laterally outwardly from an interior surface 608 of the container interior 606. Although shown as generally elongated elements, the tray supports 676 may optionally be configured as discrete protrusions or bosses (FIG. 56) located at spaced intervals along the interior surface 608 for supporting the food trays 120 and/or the refrigerant tray 700. Even further, the tray supports 676 may be configured as apertures or receptacles (not shown) for receiving mating protrusions (not shown) that may be mounted to the food trays 120 and/or refrigerant trays 700. Although shown in FIG. 43 as being mounted above the food trays 120 at an uppermost position within the container interior 606, the refrigerant tray 700 is configured to be selectively mountable to any one of the tray supports 676 or tray rails 678 at any vertical position within the container interior 606.

Referring to FIGS. 42-43, the container 604 may include a cart door 620 on one end of the container 604 or on both ends of the container 604. For configurations including a single cart door 620, the container 604 may include a fixed end wall 618 on an end of the cart opposite the cart door 620. The cart door 620 may be pivotally mounted to the container 604 by means of hinges 632 between an open position 628 (FIG. 42) and a closed position 630 (FIG. 53). The cart door 620 may include one or more door latches 634 installed in a latch recess 636 (FIG. 53) for securing the cart door 620 in the closed position 630 (FIG. 53). The cart door 620 and/or end wall 618 may include one or more spacer device 730 (FIG. 42) mounted to the interior surface 608 of the cart door 620. The spacer device 730 may comprise a spacer rib 732 that may be mounted to or extend outwardly from the interior surface 608 of the cart door 620 or end wall 618. The spacer device 730 may prevent blockage of a sublimation path 758 (FIG. 54) of the cold gas 740 (FIG. 54) or carbon dioxide gas 754 (FIG. 54) flowing downwardly. In this regard, the spacer device 730 may provide an air gap 734 (FIG. 55) between the food trays 120 and the interior surface 608 of the end wall 618 and the cart door 620 when the cart door 620 is in a closed position. Alternatively, the spacer device 730 may be located on the perimeter 122 of the food tray 120. For example, the spacer device 730 may be configured as one or more protrusions (not shown) that may extend outwardly from the food tray 120 perimeters 122 and maintain a spacing between the perimeters 122 and the interior surfaces 608 of the side walls 612 and/or the interior surfaces of the cart door 620 when the cart door 620 is closed to provide air gaps between the cart door 620 and the food tray 120. The air gaps 734 may facilitate the passage of the cold gas 740 or carbon dioxide gas 754 sublimating from the refrigerant 188 (e.g., dry ice 752) contained within the refrigerant tray 700. In this manner, the cold gas 740 (e.g., carbon dioxide gas 754) may flow downwardly from the refrigerant tray 700 and circulate through the container interior 606 to cool the container 604 air and maintain the food items at a safe temperature.

In an embodiment, the spacer device 730 (FIG. 55) may comprise one or more spacer rib 732 provided in a suitable height 734 (FIG. 55) above the interior surface 608 of the cart door 620. For example, the spacer rib 732 may have a height 734 of from approximately 0.25 to 0.50 inch above the interior surface 608 of the cart door 620 although the spacer rib 732 may be provided in heights larger or smaller than the 0.25 to 0.50 height. In an embodiment, the spacer device 730 may be mounted to the cart door 620 or integrally formed with the cart door 620. Even further, the spacer device 730 may be mounted to the perimeter lips 122 of the food trays 120. For example, the food trays 120 may include protrusions (not shown) that may extend laterally outwardly from the perimeter lips 122 of the food trays 120 for maintaining an air gap 734 between the perimeters lip and the interior surface 608 of the cart door 620 or end wall 618 of the container 604. It is also contemplated that the perimeter lips 122 of the food trays 120 may comprise holes (e.g., FIGS. 14-15), apertures or scallops (e.g., FIGS. 9-10) facilitate the circulation of cold gas 740 or carbon dioxide gas 754 throughout the container interior 606 (FIG. 53).

Figure 44:
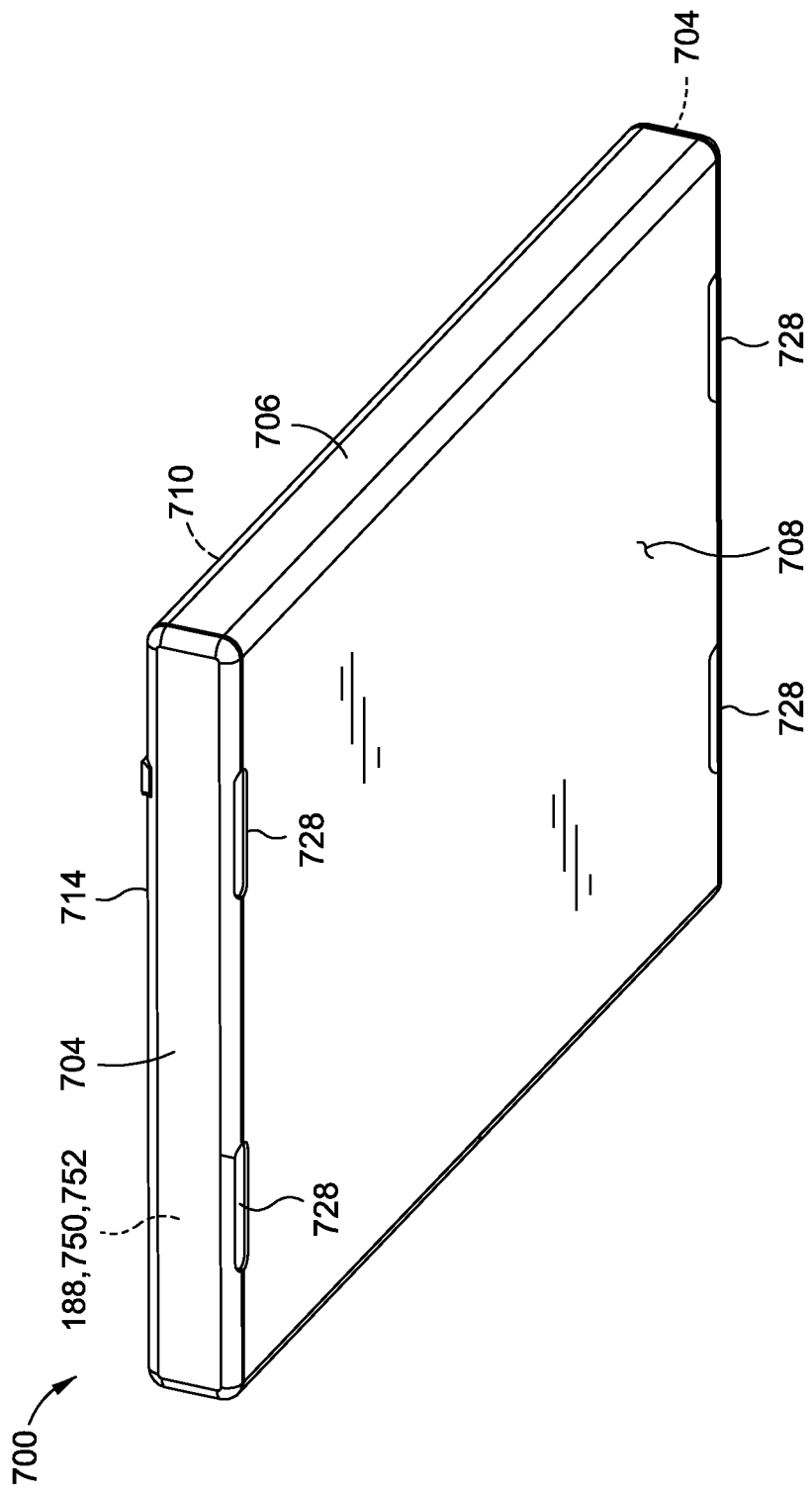
FIG. 44 is a bottom perspective illustration of an embodiment of the refrigerant tray having a pair of sublimation ports formed in the refrigerant tray.

Referring to FIG. 44, shown is an embodiment of the refrigerant tray 700 illustrating sublimation ports 728 formed in the refrigerant tray 700 to allow for passage of the cold gas 740 or carbon dioxide gas 754 (FIG. 53). Although the sublimation ports 728 are shown formed along a bottom corner edge of the refrigerant tray 700, the sublimation ports 728 may be formed in any portion of the refrigerant tray 700. For example, the sublimation ports 728 may be formed in any location along the tray lower wall 708. Furthermore, the sublimation ports 728 may be formed in other locations of the refrigerant tray 700 such as in the tray end walls 704 or tray side walls 706. However, due to the tendency of the cold gas 740 or carbon dioxide gas 754 (FIG. 53) to flow downwardly and based on the location of the air gaps 734 (FIG. 55) along the cart doors 620 (FIG. 53), the sublimation ports 728 may be formed at one or both ends 702 (FIG. 42) of the refrigerant tray 700. For example, the sublimation ports 728 on the end 702 of the refrigerant tray 700 may be vertically aligned with the air gaps 734 between the cart door 620 and the end-most food trays 120 (FIG. 42) such that the cold gas 740 or carbon dioxide gas 754 may flow downwardly through the air gaps 734. Although the sublimation ports 728 are shown as generally elongated slots in the refrigerant tray 700, the sublimation ports 728 may be provided in any quantity, size, shape, or configuration. For example, the sublimation ports 728 may be provided as holes, ducts, apertures or any other opening configurations.

Figure 45:
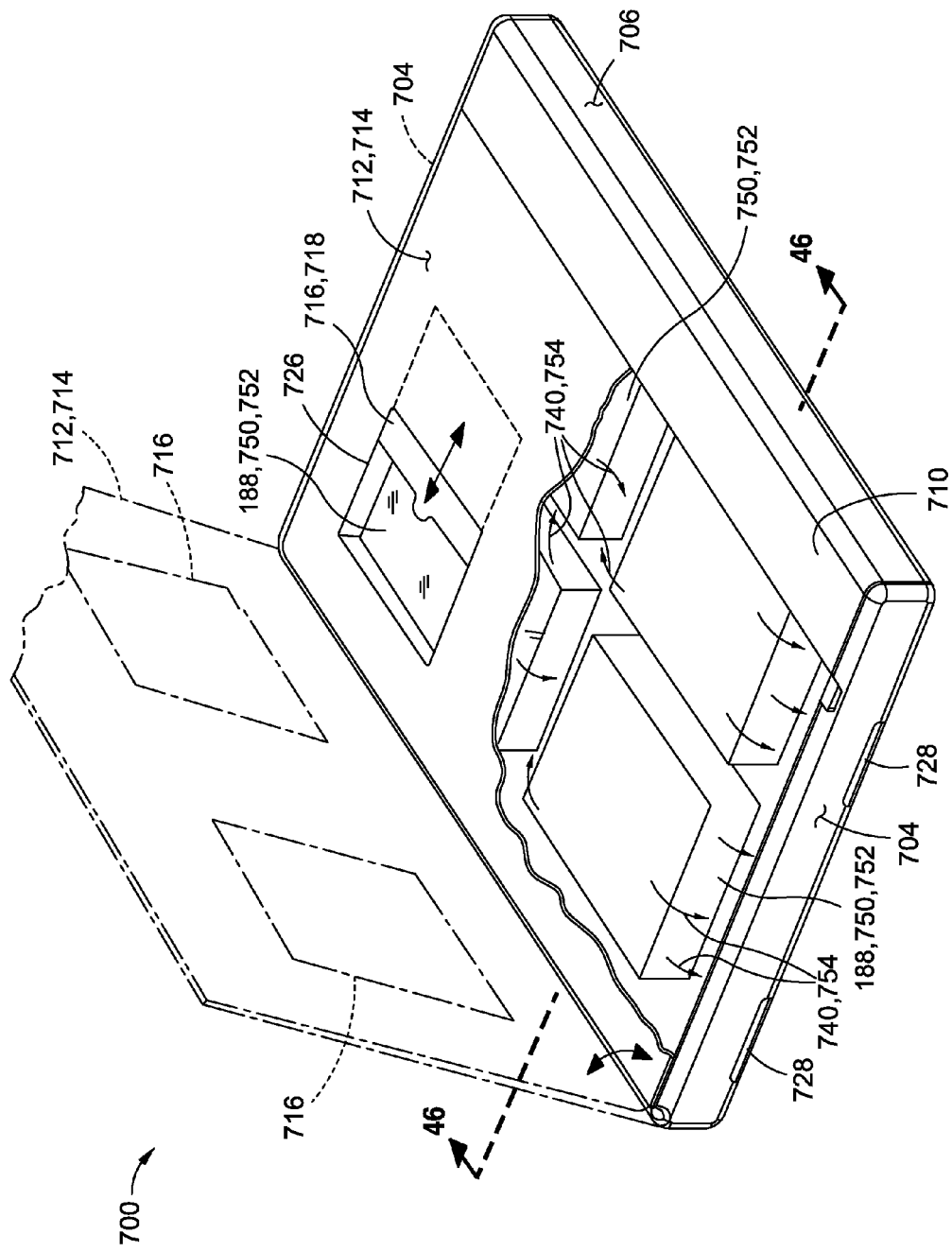
FIG. 45 is a top perspective illustration of the refrigerant tray having a pair of tray vents.

Referring to FIG. 45, shown is a top perspective view of the refrigerant tray 700 in a generally rectangularly shaped configuration having a generally thin profile. The refrigerant tray 700 may have a generally hollow rectangular shape and a relatively thin profile and may include a tray lower wall 708 (FIG. 44), a portion of a tray upper wall 710 having a lid 714, an opposing pair of tray side walls 706, and an opposing pair of tray end walls 704 although the refrigerant tray 700 may be provided in any size, shape or configuration. The lid 714 may be pivotable to allow access to the interior of the refrigerant tray 700 for installing and/or removing one or more dry ice pucks 750 from the refrigerant tray 700.

The lid 714 may act as a sublimation rate control mechanism 712 wherein the lid may be removed from the refrigerant tray 700 to increase the exposure of the refrigerant 188 (e.g., dry ice 752) to the relatively warmer air of the container interior 606 (FIG. 43) and thereby increase the rate of sublimation of the refrigerant 188. In a further embodiment, the refrigerant tray 700 may include one or more adjustable tray vents 716 which may act as sublimation rate control mechanisms 712. For example, FIG. 45 illustrates a pair of adjustable tray vents 716 (shown in phantom) mounted on the lid 714 of the refrigerant tray 700. Each one of the tray vents 716 may include an adjustable slider 718 for controlling the area of a vent opening 726 in the lid 714 and thereby control the flow of air from the container interior 606 into the refrigerant tray 700. Although shown as being mounted on the lid 714, one or more sublimation rate control mechanisms 712 such as tray vents 716 may be mounted at any location on the refrigerant tray 700.

Referring still to FIG. 45, the sublimation rate control mechanism 712 (e.g., the tray vents 716, the removable lid 714) may be used control the sublimation rate of the refrigerant 188 such that the air temperature in the container interior 606 (FIG. 43) is maintained below approximately 7° C. or less. In a further embodiment, one or more of the sublimation rate control mechanisms 712 may be adjusted to maintain the air temperature within the container interior 606 at less than approximately 4° C. for a period of at least approximately 15 hours in an environment having an ambient air temperature of greater than approximately 29° C. as mentioned above. However, the sublimation rate control mechanism 712 may be adjusted to maintain the container interior 606 at any air temperature for any duration, without limitation.

Figure 46:
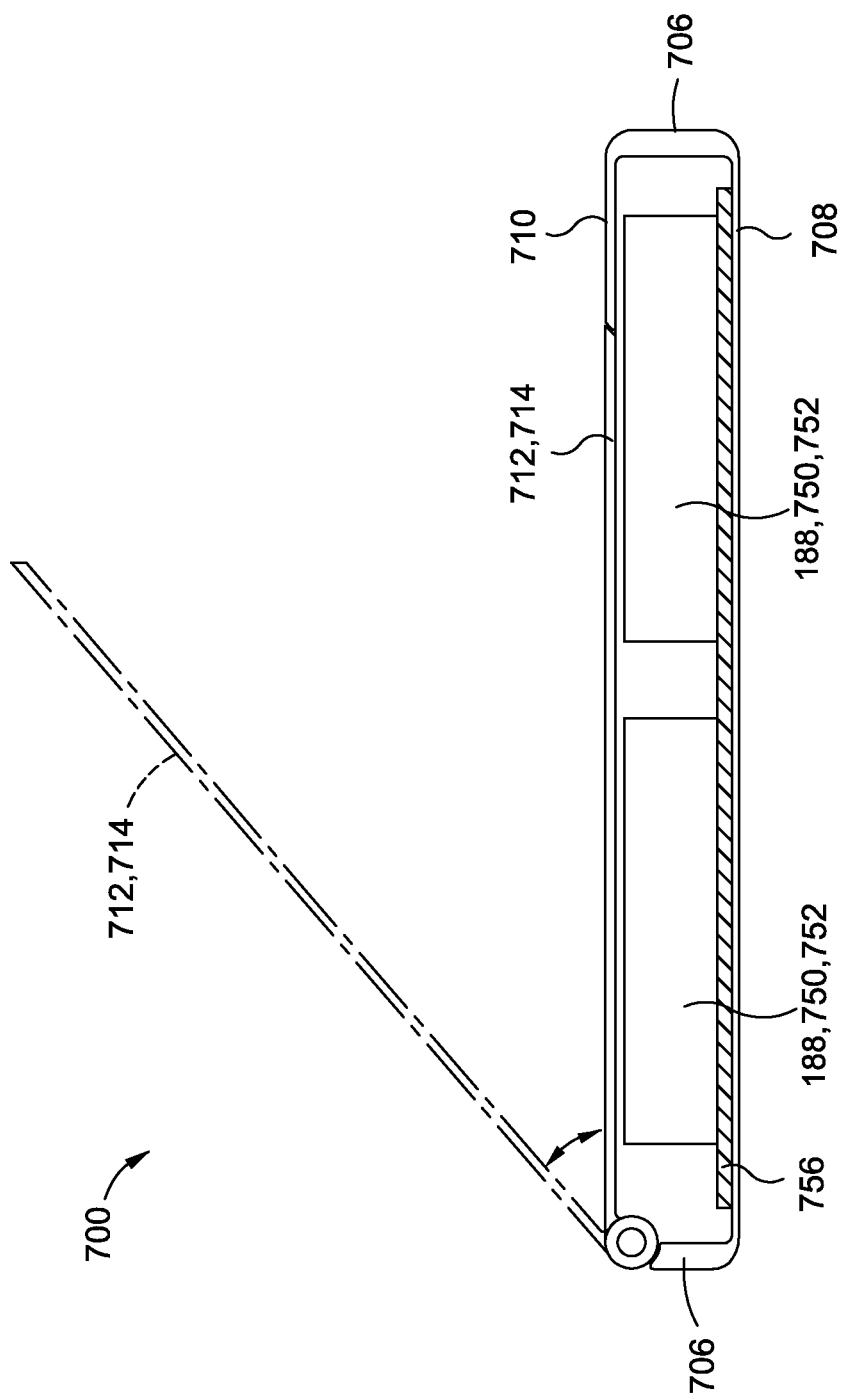
FIG. 46 is a cross section view of the refrigerant tray taken along line 46 of FIG. 45 and illustrating a refrigerant such as dry ice mounted on a thermal isolator within the refrigerant tray.

Referring to FIG. 46, shown is a cross section of the refrigerant tray 700 in an embodiment illustrating refrigerant 188 in the form of one or more dry ice pucks 750 that may be mounted within the refrigerant tray 700. In the embodiment shown, the dry ice puck 750 may comprise a slab of dry ice 752 formed in a relatively thin profile that may be sized complementary to the refrigerant tray 700. The slab may comprise a generally rectangular shape although other shapes and sizes are contemplated. For example, the slab may be provided as one or more blocks or cubes of dry ice 752 that may be loaded into the refrigerant tray 700. In a further embodiment, the refrigerant 188 may comprise dry ice 752 in the form of a plurality of pellets of any size such as approximately one-eight (⅛) inch or one-half (½) inch diameter pellets although larger and smaller pellet sizes are contemplated. Providing the dry ice 752 in pellet form may result in a high sublimation rate relative to the sublimation rate that is achievable with the dry ice 752 in slab form due to increased surface area of the pellets per unit volume as compared to the surface area per unit volume of dry ice 752 in slab form.

Referring still to FIG. 46, the refrigerant tray 700 may include a thermal isolator 756 that may be interposed between the refrigerant 188 (e.g., the dry ice pucks 750) and the tray bottom wall 616 (FIG. 53) of the refrigerant tray 700 to thermally isolate the refrigerant 188 from the tray lower wall 708. The thermal isolator 756 may minimize or prevent heat conduction between the tray lower wall 708 and the refrigerant 188. In this regard, the thermal isolator 756 may prevent freezing of items on food trays 120 (FIG. 42) mounted directly below the refrigerant tray 700. It is contemplated that for food products (e.g., ice cream) that must remain frozen (i.e., below 0° C.), the thermal isolator 756 may be omitted and food trays 120 containing such items may be stored directly below the refrigerant tray 700. If the thermal isolator 756 is included with the refrigerant tray 700, the thermal isolator 756 is not limited to mounting on the tray lower wall 708 but may be mounted at any location within the refrigerant tray 700. For example, the thermal isolator 756 may be mounted on the tray side walls 706, the tray end walls 704 (FIG. 45), the lid 714 and/or the tray upper wall 710 to reduce the sublimation rate of the dry ice 752. The thermal isolator 756 may comprise an open cell foam and/or a closed cell foam such as polyurethane foam or other materials providing thermal insulative capability. In an embodiment, the thermal isolator 756 may be configured as a portion of a vacuum insulated panel 648 (FIG. 13) having a relatively high R-value such as between approximately 30 and 50 or other R-values.

Referring to FIGS. 47-48, shown is the container system 600 in an embodiment wherein the refrigerant tray 700 may include a tray chamfer 707 extending along a tray side wall 706 of the refrigerant tray 700. The container 604 may have a container chamfer 607 formed complementary to the tray chamfer 707 for controlling the orientation of the refrigerant tray 700 within the container interior 606. For example, the sublimation ports 728 in the refrigerant tray 700 may be limited to one end of the refrigerant tray 700. By including the refrigerant tray 700 with the tray chamfer 707 and providing the container 604 with the container chamfer 607, the refrigerant tray 700 may be oriented such that the sublimation ports 728 are located at a desired location within the container interior 606. For example, the sublimation ports 728 may be positioned adjacent to the cart door 620 (FIG. 53) when the refrigerant tray 700 is installed within the container interior 606. In this manner, cold gas 740 or carbon dioxide gas 754 (FIG. 53) exiting the sublimation ports 728 may flow downwardly through the air gaps 734 (FIG. 53) between the food trays 120 (FIG. 53) and the cart doors 620 (FIG. 53) to cool the container interior 606. Although the refrigerant tray 700 is shown having a tray chamfer 707 and the container 604 is shown having a container chamfer 607, alternative configurations of the refrigerant tray 700 and the container 604 may be provided for controlling the orientation of the refrigerant tray 700 within the container interior 606. For example, the refrigerant tray 700 and the container 604 may be provided with a tongue- and groove (not shown) configuration or alternative arrangements for controlling the orientation of the refrigerant tray 700 within the container interior 606.

Referring to FIG. 49, shown is a sectional view of the container 604 illustrating a stopper mechanism 686 that may be mounted to the container interior 606 for controlling the depth at which the refrigerant tray 700 (FIG. 47) is installed within the container interior 606. In an embodiment, the stopper mechanism 686 may comprise a raised protrusion extending outwardly from the side wall 612 and/or the tray support 676. The stopper mechanism 686 may provide a means for controlling the position of the sublimation ports 728 (FIG. 47) within the container interior 606. For example, the stopper mechanism 686 may be mounted such that when a refrigerant tray 700 is installed within the container interior 606, the sublimation ports 728 are positioned adjacent to the cart door 620 (FIG. 53) to facilitate the flow of cold gas 740 or carbon dioxide gas 754 (FIG. 53) downwardly through the air gaps 734 (FIG. 53) between the food trays 120 (FIG. 53) and the cart door 620. One or more of the stopper mechanisms 686 may be located on one of the side walls 612 of the container 604 and/or tray support 676 or on both side walls 612 of the container 604.

The stopper mechanism 686 may be a separate component that may be mechanically fastened or bonded to the side wall 612 and/or tray support 676 or the stopper mechanism 686 may be integrated into the side wall 612 and/or tray support 676. In embodiments, the refrigerant tray may be provided in a length (not shown) that approximates the length of the container interior 606. Such a long length of the refrigerant tray may provide additional volume for storing dry ice 752 as may be desired for extended durations. To facilitate the installation of a refrigerant tray having a long length (not shown), the tray side walls 706 (FIG. 47) may be formed with a groove (not shown) for accommodating the stopper mechanism 686 such that a relatively long refrigerant tray may be slid over the stopper mechanism 686. In this manner, the container 604 may accommodate different lengths of the refrigerant tray 700 (FIG. 47) while maintaining a desired orientation of the refrigerant tray 700 within the container interior 606.

Referring to FIGS. 50-51, shown is the refrigerant tray 700 having a thermal regulator 757 mounted between the dry ice 752 and the thermal isolator 756. The thermal regulator 757 may comprise a layer of thermally conductive material extending in a contiguous manner between the tray side walls 706 and tray end walls 704. The thermal regulator 757 may facilitate in-plane conduction of heat within the thermal regulator 757 and thereby facilitate a more uniform temperature distribution within the refrigerant tray 700 to extend the duration of the dry ice 752 before complete sublimation thereof. In a non-limiting embodiment, the thermal regulator 757 may be comprised of an aluminum sheet mounted between the dry ice 752 and the thermal isolator 756. The aluminum sheet may facilitate a uniform rate of sublimation of the dry ice 752. The thermal regulator 757, if included in the refrigerant tray 700, may operate in conjunction with the sublimation rate control mechanism 712. As indicated above, the sublimation rate control mechanism 712 may comprise the lid 714 of the refrigerant tray 700 which may be installed or removed to control the exposure of the refrigerant 188 to the air in the container 604. The sublimation rate control mechanism 712 may also comprise tray vents 716 (FIG. 45) that may optionally be incorporated into the lid 714 or into other areas of the refrigerant tray 700.

For example, FIG. 50 illustrates the refrigerant 188 in the form of a plurality of dry ice pucks 750 that may be mounted on the thermal regulator 757. The dry ice pucks 750 may be provided as slabs or as pellets or in any other suitable form. If one of the dry ice pucks 750 sublimates at a faster rate than the other dry ice pucks 750, the thermal regulator 757 may begin to warm up in the area of the faster-sublimating dry ice puck 750. The heat in the area of the faster-sublimating dry ice puck 750 may be conducted through the thermal regulator 757 toward relatively colder areas of the thermal regulator 757. The conduction of heat through the thermal regulator 757 may slow the sublimation rate of the faster-sublimating dry ice pucks 750. In addition, the slower-sublimating dry ice pucks 750 may then begin to sublimate at a rate that more closely matches the sublimation rate of the faster-sublimating dry ice pucks 750. In this regard, the thermal regulator 757 may act as a thermal battery as the dry ice pucks 750 (e.g., slabs, pellets, etc.) reduce in size over time such that that the thermal regulator 757 may maintain a more uniform temperature of the dry ice 752 over time. Although shown as being mounted to the thermal isolator 756, it is contemplated that the thermal isolator 756 may be omitted from the refrigerant tray 700 and the thermal regulator 757 may be mounted directly to the tray lower wall 708. Although described above as an aluminum sheet, the thermal regulator 757 may be formed of any metallic and/or non-metallic material providing a relatively high level of in-plane thermal conductivity. The thermal regulator 757 may be included in any of the refrigerant tray 700 configurations disclosed herein.

Referring to FIG. 52, shown is the refrigerant tray 700 in an embodiment wherein the sublimation ports 728 may be located at one or more corners of the refrigerant tray 700 and/or the sublimation ports 728 may be may be provided in a small size relative to the larger size of the sublimation ports 728 illustrated in FIG. 44. In FIG. 52, by providing the sublimation ports 728 in a relatively small size, cold gas 740 or carbon dioxide gas 754 may be discharged from the sublimation ports 728 at a relatively high velocity relative to the velocity of cold gas 740 exiting the larger sublimation ports illustrated in FIG. 44. A relatively high velocity of carbon dioxide gas 753 exiting the sublimation ports 728 of FIG. 52 may promote the entrainment of the cold gas 740 or carbon dioxide gas 754 within the air in the container interior 606. In this manner, the sublimation port 728 as shown in FIG. 52 may improve mixing of the cold gas 740 or carbon dioxide gas 754 with the air in the container 604 which may increase the cooling efficiency of the container system 600.

Referring to FIG. 53, shown is an embodiment of the container 604 with one of the side walls 612 removed to expose the container interior 606. The cold gas 740 or carbon dioxide gas 754 is shown exiting the sublimation ports 728 of the refrigerant tray 700 and flowing downwardly into the container interior 606. A portion of the cold gas 740 or carbon dioxide gas 754 may flow between the air gaps 734 between the food trays 120 and the cart door 620. As was indicated earlier, the cart door 620 may include one or more of the spacer ribs 732 or a functionally equivalent spacer device 730 mounted to the cart door 620 and/or to the food trays 120 for maintaining the air gap 734 between the food tray 120 and the cart door 620. Also shown is a mid shelf 672 that may extend between the side walls 612 of the container 604 to improve the strength and geometric stability of the galley cart 602. The mid shelf 672 may include perforations through which the cold gas 740 or carbon dioxide gas 754 may flow as the cold gas 740 or carbon dioxide gas 754 flows downwardly and circulates within the container interior 606.

Referring to FIG. 54, shown is a side view of the container 604 with a side wall 612 removed to illustrate the sublimations paths 758 along which the cold gas 740 or carbon dioxide gas 754 may flow. The cold gas 740 or carbon dioxide gas 754 may exit the refrigerant trays 700 at the sublimation ports 728. Although illustrated as being mounted at the uppermost end of the container 604 directly underneath the top wall 614 of the container 604. The refrigerant trays 700 may be mounted at any one of the tray supports 676. Furthermore, although FIG. 54 illustrates a plurality of refrigerant trays 700 mounted at one vertical location, any number of refrigerant trays 700 may be mounted at one or more vertical locations. For example, one or more refrigerant trays 700 may be mounted at the uppermost end of the container 604 and another set of refrigerant trays 700 may be mounted below the mid shelf 672 of the container 604.

FIG. 54 also illustrates the passage of the cold gas 740 or carbon dioxide gas 754 through the air gaps 734 between the food trays 120 and the cart door 620 or end wall 618 of the container 604. In addition to the downward flow of the carbon dioxide gas 754, the sublimation paths 758 also include the generally laterally flow direction of cold gas 740 or carbon dioxide gas 754 across the one or more food trays 120 within the container interior 606. As indicated above, the perimeter lips 122 of the food trays 120 may include holes (e.g., FIGS. 14-15), apertures, or scallops (e.g., FIGS. 9-10) to facilitate the downward flow and circulation of the cold gas 740 or carbon dioxide gas 754 within the container interior 606.

Figure 55:
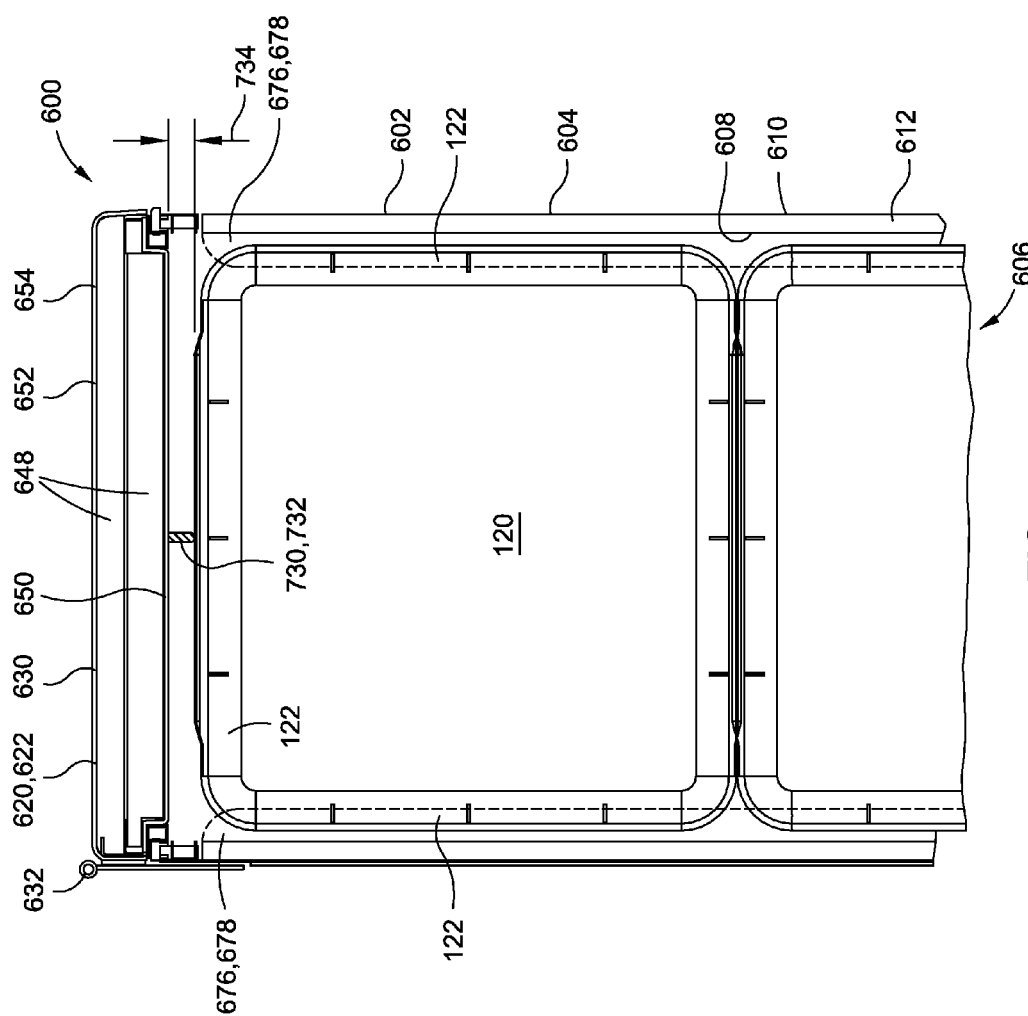
FIG. 55 is a sectional top view of the container system taken along line 55 of FIG. 54 and illustrating the air gap between the food trays and the interior surface of the cart door.

Referring to FIG. 55, shown is a sectional view of the galley cart 602 illustrating the air gap 734 provided by the spacer device 730 between the interior surface 608 of the cart door 620 and the food trays 120 that may be mounted within the galley cart 602. The spacer device 730 is shown as a spacer rib 732 mounted to the cart door 620 although the spacer device 730 may be provided in alternative shapes and configurations. The spacer rib 732 may be formed of metallic or non-metallic material. For example, the spacer rib 732 may be formed of aluminum that may be bonded to the cart door 620 or mechanically fastened to the cart door 620. Alternatively, the spacer rib 732 may be formed of polymeric material including thermoplastic material that may be bonded or integrally formed with the cart door 620. The spacer rib 732 may be provided in a height corresponding to the desired width of the air gap 734.

For example, the spacer rib 732 may be configured to provide an air gap 734 having a width of from approximately 0.25 to 0.50 inch although the spacer rib 732 may be configured to provide an air gap 734 of any width. Although a single spacer device 730 is shown mounted to the cart door 620, any number of spacer devices 730 may be provided. Furthermore, one or more spacer device 730 may be positioned at any location within the container interior 606 and are not limited to mounting along the approximate vertical centerline of the cart door 620. For example, a pair of spacer ribs 732 may be mounted to the cart door 620 with each one of the spacer ribs 732 of the pair being mounted toward one of the vertical side edges of the cart door 620.

Figure 56:
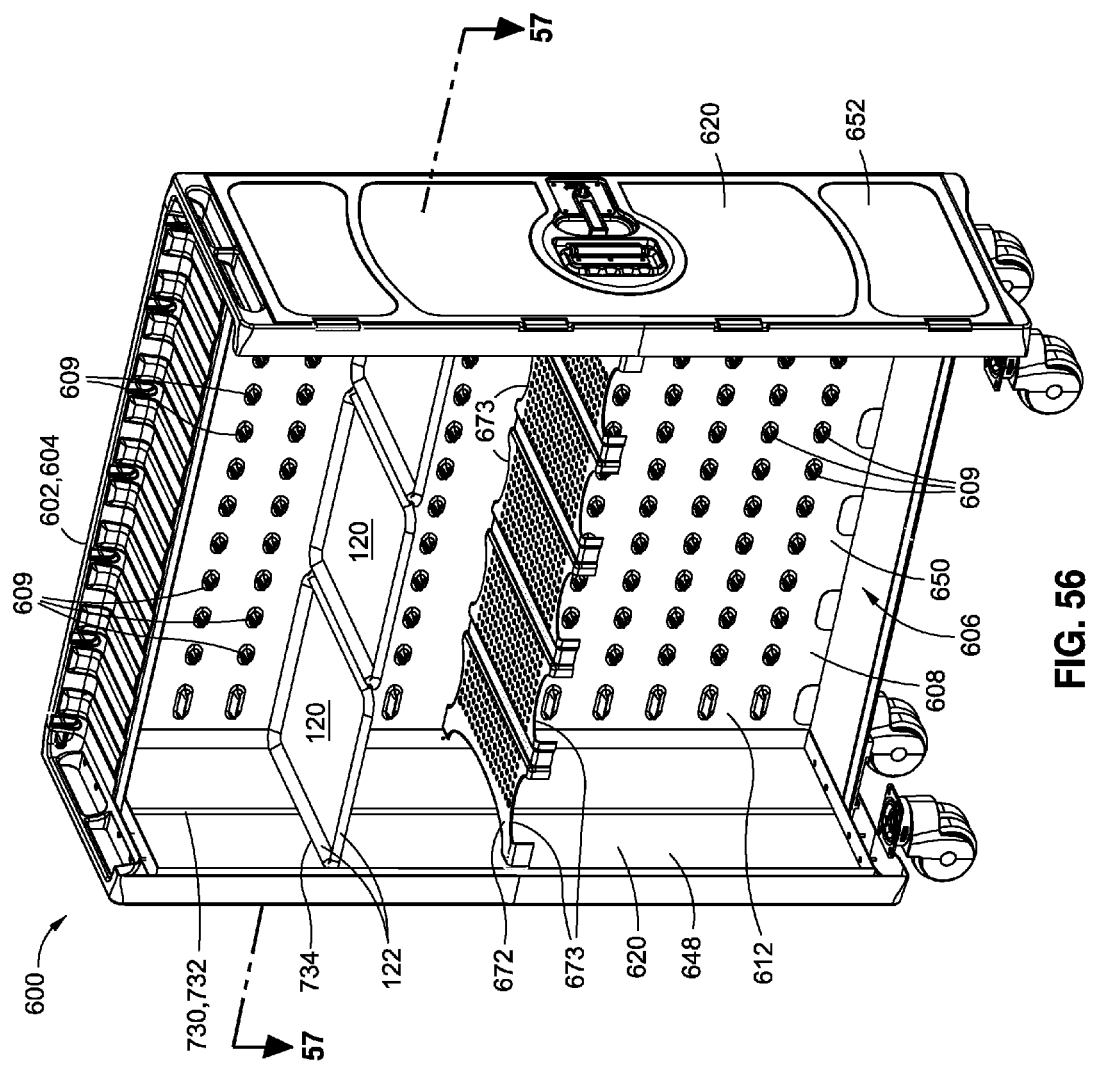
FIG. 56 is a perspective illustration of the container system showing the interior surface of the container side walls having a plurality of support knobs for supporting the food trays and/or refrigerant trays and further illustrating an embodiment of the mid-shelf having a plurality of shelf scallops to facilitate the passage of cold gas and/or air.

Referring to FIG. 56, shown is an embodiment of the container system 600 wherein the food trays 120 are supported on a plurality of discrete support knobs 609 extending laterally outwardly from the interior surfaces 608 of the side walls 612. The support knobs 609 may be located at spaced intervals along the interior surface 608 of the side walls 612. In an embodiment, the support knobs 609 may be bonded to the inner shell 650 of the side walls 612 and/or mechanically fastened to the side walls 612. Alternatively, the support knobs 609 may be integrally formed with the inner shell 650. Advantageously, by configuring the tray supports 676 (FIG. 42) as support knobs 609 spaced along the side walls 612, cold gas 740 (FIG. 54) and/or air within the container interior 606 may pass vertically between the perimeter lips 122 of the food trays 120 and the side walls 612. Also shown in FIG. 56 is an embodiment of the mid shelf 672 having mid shelf cutouts or shelf scallops 673 formed along the edges of the mid shelf 672 to facilitate the passage of cold gas 740 or carbon dioxide gas 754 and/or air between the mid shelf 672 and the side walls 612. The mid shelf 672 may also include a plurality of perforations through which the cold gas 740 or carbon dioxide gas 754 and/or air may pass. The mid shelf 672 may include a horizontal portion integral with vertical side tabs adhesively bonded and/or mechanically fastened to the side walls 612. As shown, the mid shelf cutouts (e.g., shelf scallops 673) may be formed at spaced intervals between the side tabs in each of opposing side edges of the mid shelf 672, and one or more mid shelf cutouts (e.g., scallops 673) may be formed in each of opposing end edges of the mid shelf 672. The support knobs 609, the air gap at each of the opposing ends, the side gaps along the opposing side walls 612, and the mid shelf cutouts collectively form a plurality of uninterrupted vertically-oriented flow paths for the cold gas 740 along the opposing ends and along the side walls 612 between a top and a bottom of the container interior 606.

Figure 57:
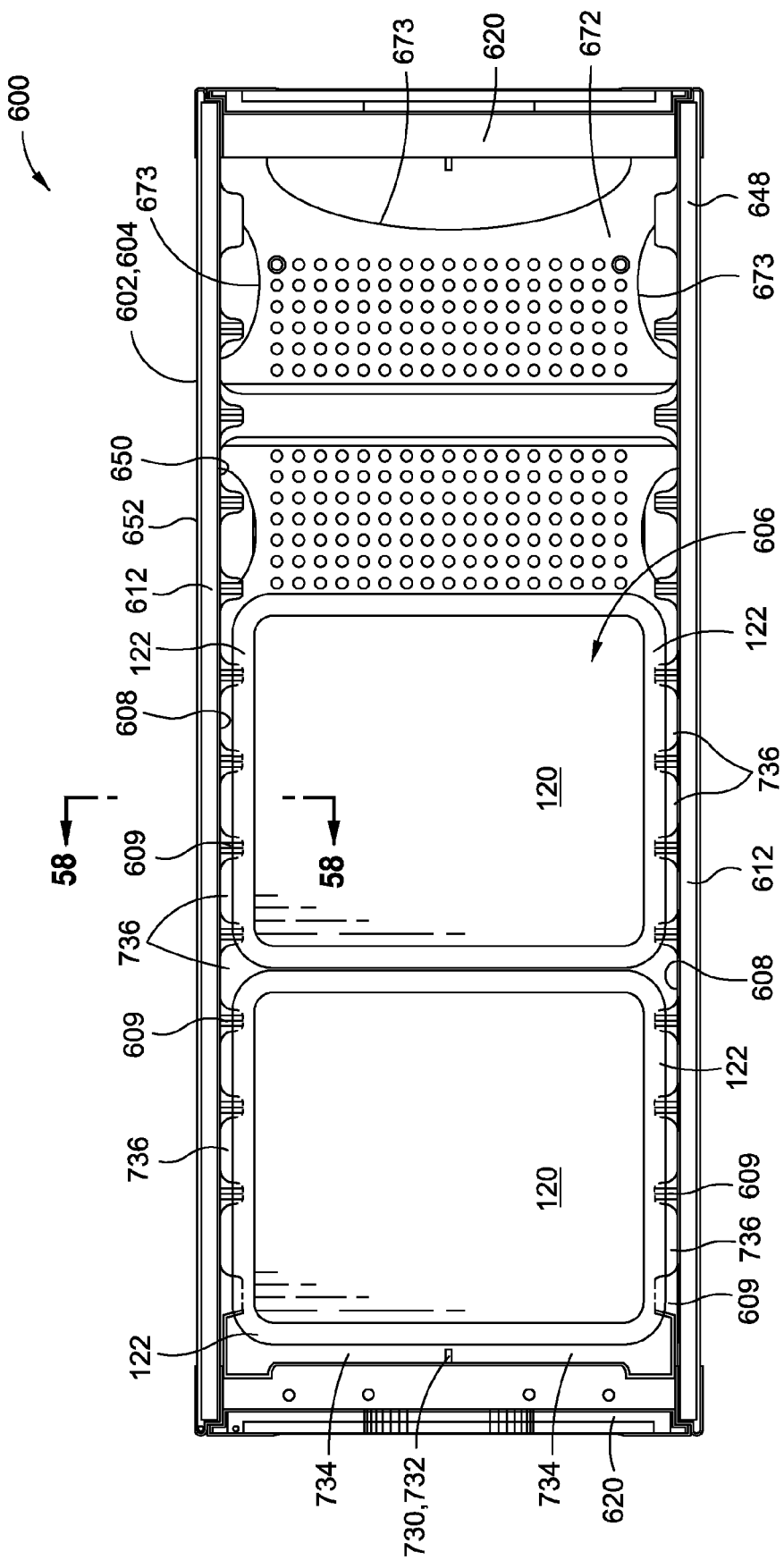
FIG. 57 is a sectional top view of the container system taken along line 57 of FIG. 56 and illustrating side gaps between the food trays and the interior surface of the side walls.

Referring to FIG. 57, shown are the plurality of side gaps 736 formed between the support knobs 609, the food trays 120, and the interior surfaces 608 of the side walls 612. The side gaps 736 may enhance circulation of the cold gas 740 (FIG. 54) or carbon dioxide gas 754 (FIG. 54) and facilitate uniform cooling of the container interior 606. In addition, the side gaps 736 may enhance circulation of air within the container interior 606. The container system 600 may also include one or more spacer device 730 as described above. In an embodiment, the spacer device 730 may comprise the spacer rib 732 that may be mounted to one or more of the cart doors 620 to maintain air gaps 734 between the food trays 120 and the cart doors 620. The combination of the air gaps 734 and the side gaps 736 may facilitate a relatively rapid dispersion of the cold gas 740 or carbon dioxide gas 754 and/or air within the container interior 606 and promote a uniform temperature distribution within the container interior 606.

Figure 58:
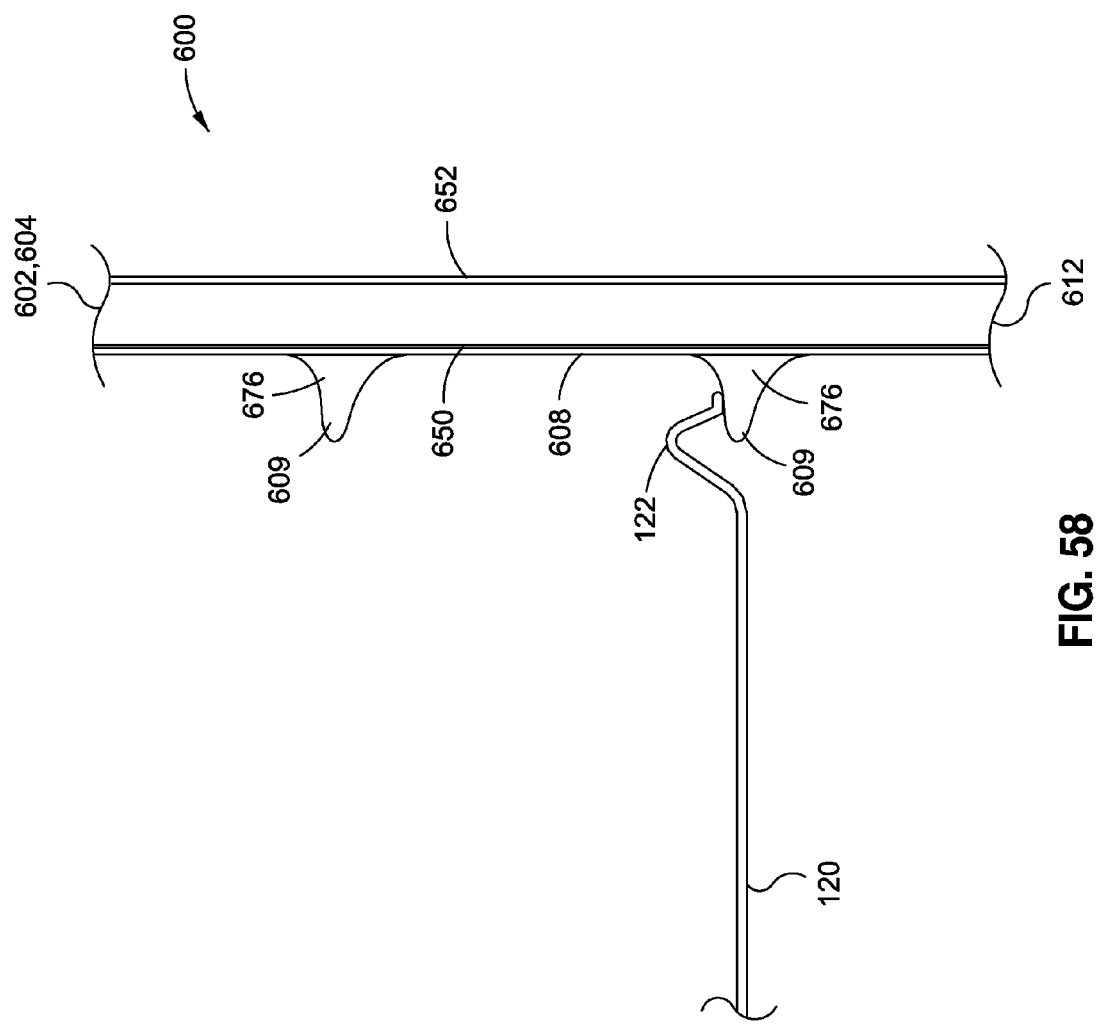
FIG. 58 is a cross section view of a portion of the container system taken along line 58 of FIG. 57 and illustrating one of the food trays supported on a support knob.

Referring to FIG. 58, shown is a section view of the container 604 illustrating the manner in which the food trays 120 may be supported by the support knobs 609. The support knobs 609 may have a concave upper surface such that the perimeter lip 122 of the food tray 120 may be biased away from the side wall 612 under the weight of the food tray 120. In this manner, the concave shape of the support knobs 609 may cause the food trays 120 to be generally centered within the width of the container interior 606 such that side gaps 736 (FIG. 57) may be formed between the food trays 120 and the side walls 612 on both sides of the container interior 606. Although shown as having a generally triangular cross-sectional shape with concave sides, the support knobs 609 may be provided in alternative sizes, shapes, and configurations, without limitation. An advantage provided by the support knobs 609 is a reduction in thermal conductance between the food trays 120 and the side walls 612 relative to the thermal conductance that may occur wherein the tray supports 676 extend along a substantial length of the side walls 612 as illustrated in FIG. 42.

Referring to FIGS. 59-60, shown is an embodiment of the container system 600 (FIG. 59) having one or more refrigerant trays 700 (FIG. 60) formed without openings such that the cold gas 740 (FIG. 54) or carbon dioxide gas 754 (FIG. 54) may be generally confined within the refrigerant tray 700. In such an embodiment, the container system 600 may rely on one or more convection cycles 764 (FIG. 59) that may occur within the container interior 606. In this regard, the cold gas 740 or carbon dioxide gas 754 inside the refrigerant tray 700 may cool the tray side walls 706 (FIG. 60), the tray end walls 704 (FIG. 60), the tray lower wall 708 (FIG. 60), the lid 714 (FIG. 60), and/or the tray upper wall 710 (FIG. 60) such that contact of the air with the refrigerant tray 700 causes the air to cool resulting in cold air 760 (FIG. 59) that may sink within the container 604. The sinking cold air 760 may displace warm air 762 (FIG. 59) in the container 604 causing the warm air 762 to rise and come into contact with the refrigerant tray 700. The combination of the air gaps 734 (FIG. 59) between the food trays 120 (FIG. 59) and the cart doors 620 (FIG. 59) and the side gaps 736 (FIG. 57) between the food trays 120 and the side walls 612 may provide passageways for the sinking cold air 760 and the rising warm air 762.

The warm air 762 may be warm in the sense that the warm air 762 is colder that the ambient air outside of the container 604 but warmer than the cold air 760 that is sinking within the container 604 due to contact with the refrigerant trays 700. The sinking of the cold air 760 and the rise of the warm air 762 within the container interior 606 may represent one or more convection cycles 764 (FIG. 59) that may occur within the container interior 606 and which may maintain the container interior 606 below a desired temperature. For example, any one of the embodiments of the container 604 shown in FIGS. 1, 42, 47, 53, 56, 61 and 68 may be combined with one or more refrigerant trays 700 (FIG. 60) which may cooperatively maintain the air temperature within the container interior 606 at less than approximately 7° C. (approximately 45° F.) or lower for extended periods of time such as up to approximately 15 hours or longer when the container 604 is in an environment having an ambient air temperature of greater than up to approximately 29° C. (approximately 84° F.) or higher temperatures. Advantageously, by omitting openings in the refrigerant tray 700, the cold gas 740 (e.g., FIG. 45) or carbon dioxide gas 754 (e.g., FIG. 45) may be generally confined within the refrigerant tray 700 which may slow the sublimation rate and extend the useful life of the refrigerant 188 or dry ice 752 within the refrigerant tray 700. In an embodiment, the refrigerant tray (not shown) may be provided in a length that approximates the length of the container interior 606 and containing refrigerant 188 or dry ice 752 along distributed along the length of the refrigerant tray such that a single convection cycle (not shown) may occur within the container interior 606 as air flows (not shown) along the length of the exterior of the refrigerant tray.

Figure 61:
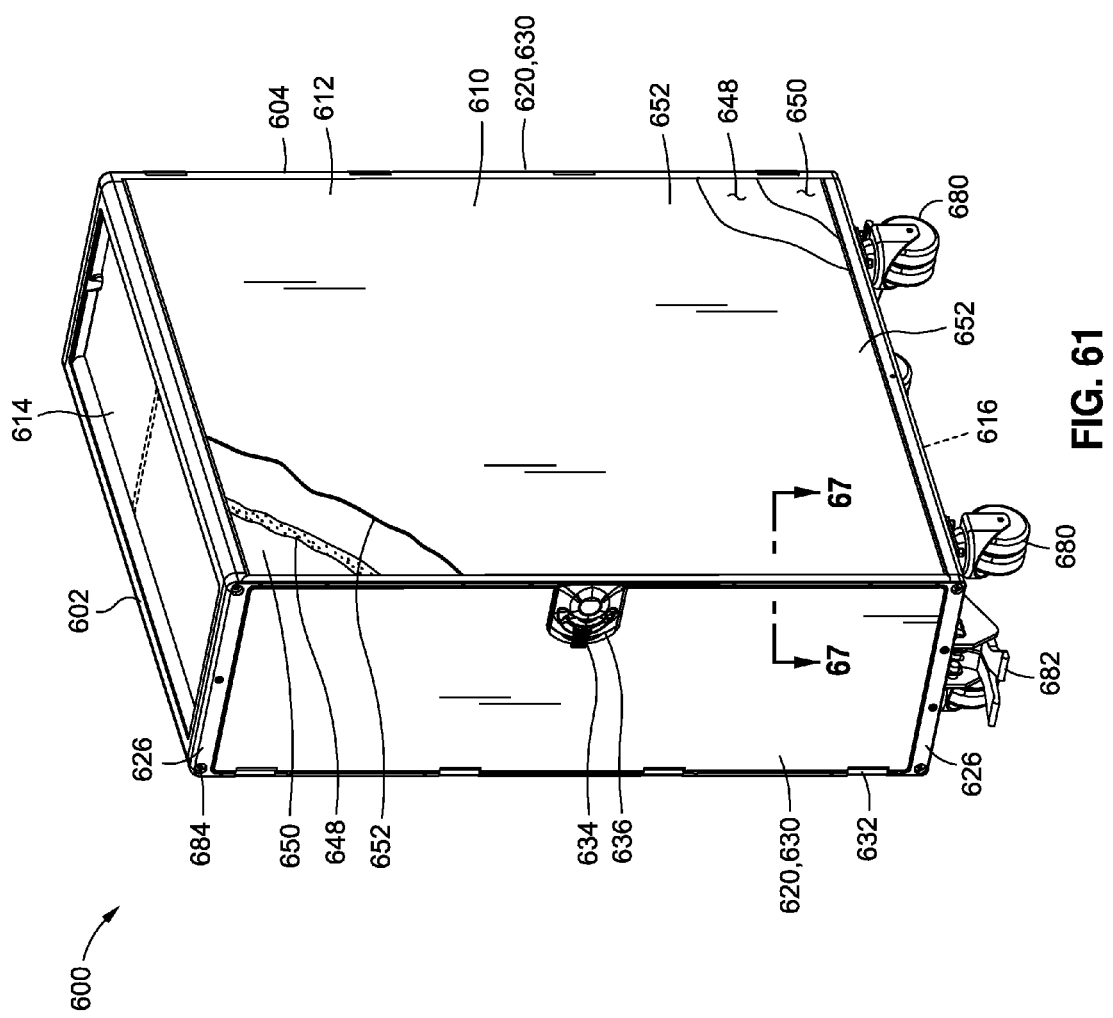
FIG. 61 is a perspective illustration of a further embodiment of the container system with the cart door in a closed position.

Referring to FIG. 61, shown is a perspective illustration of an embodiment of the container 604. As indicated earlier, the container 604 may include vacuum insulated panels 648 having a relatively high R-value for insulating the container 604. The vacuum insulated panels 648 may be sandwiched between an inner shell 650 and an outer shell 652 to protect the integrity of the vacuum insulated panels 648 and to extend the operating life of the container 604 and increase the insulative capability of the container 604. As indicated above, the refrigerant tray 700 may be implemented with the container 604 to cooperatively maintain the air temperature within the container interior 606 at less than approximately 7° C. for a period of at least approximately 15 hours. The combination of the refrigerant tray 700 (e.g., FIGS. 44, 54, 60) and the insulated container 604 may further result in a container 604 that may maintain the air temperature within the container interior 606 at between approximately 1° C. and 4° C. for a period of at least approximately 15 hours when the container 604 is an environment having an ambient air temperature of greater than approximately 29° C. As indicated above, the construction of the container 604 in various embodiments as described below may be such that the refrigerant tray 700 and the container 604 may cooperatively limit heat gain into the container interior 606 (FIG. 62) to less than approximately 100 Btu/hour in an environment having an ambient temperature of greater than approximately 29° C.

Figure 62:
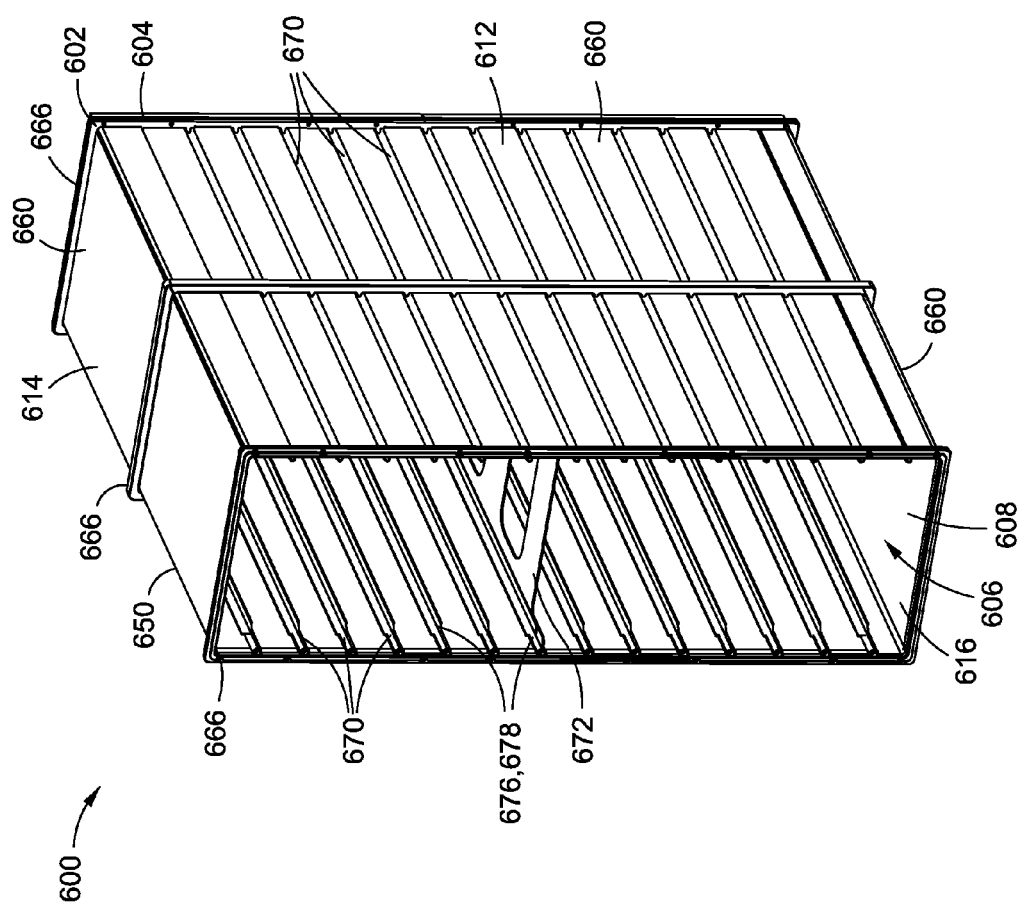
FIG. 62 is a perspective illustration of an inner shell of the container and a plurality of stiffener rings that may be mounted to the inner shell.

Referring to FIG. 62, shown is an embodiment of an inner shell 650 that may be included with the container 604. The inner shell 650 may be formed of metallic or non-metallic material. For example, the inner shell 650 may be formed of polymeric material including thermoplastic material of a suitable thickness (e.g., 0.050 inch). The thermoplastic material may comprise acrylic-polyvinyl chloride (PVC) sheet material commercially available as Kydex™ sheet material from Kydex, LLC of Bloomsburg, Pa. However, the inner shell 650 may be formed of other thermoplastic materials which may be thermoformed or vacuum formed into the desired shape. For example, one or more ribs 670 may be thermoformed or vacuum formed into the inner shell 650. The ribs 670 may function as the tray supports 676 for supporting food trays 120 (FIG. 42) and/or cold trays (e.g., FIG. 1) and/or refrigerant trays 700 (FIGS. 44, 54, 60) within the container interior 606.

Alternatively, separate tray rails 678 may be formed of metallic or non-metallic material and may be adhesively bonded and/or mechanically fastened to the inner shell 650. The inner shell 650 may also be formed of metallic material such as aluminum or other lightweight metallic material with relatively high ductility to provide a durable liner for the container interior 606 to protect the vacuum insulated panels 648 against punctures as food trays 120 are continuously placed inside of and removed from the container interior 606. In addition, the inner shell 650 may be formed of thermosetting material including graphite epoxy. The thermosetting and/or thermoplastic materials for the inner shell 650 may optionally include fibrous reinforcing material for increasing the strength and durability of the inner shell 650.

Referring still to FIG. 62, the inner shell 650 may be fabricated in shell sections 660 to simplify manufacture. For example, although not shown in FIG. 62, the inner shell 650 may be formed as four (4) separate shell sections 660 corresponding to one or more portions of the side walls 612, the top wall 614, and the bottom wall 616 of the container 604. The shell sections 660 may be joined to one another. In this regard, the container 604 may include a plurality of stiffener rings 666 that may be mounted to the inner shell 650 to interconnect the shell sections 660. The stiffener rings 666 may extend along the side walls 612, top wall 614, and bottom wall 616 to encircle the inner shell 650 and interconnect the inner and outer shells 650, 652 to one another. The stiffener rings 666 may improve the structural stiffness and stability of the container 604 and may maintain the generally orthogonal or rectangular shape of the container 604 when side loads are applied to the container 604.

The stiffener rings 666 may be formed of metallic or non-metallic material and which preferably has relatively high strength and stiffness. In an embodiment, the stiffener rings 666 may be formed of graphite thermoplastic or thermosetting material or fiberglass. The stiffener rings 666 may also be formed of lightweight high strength metallic material such as aluminum, titanium, or other metallic materials. Although FIG. 62 illustrates three (3) of the stiffener rings 666 located on the ends and at the center of the container 604, any number of stiffener rings 666 may be provided and may be positioned at any location on the container 604.

In FIG. 62, the mid shelf 672 may be assembled with the inner shell 650 to interconnect the side walls 612. The mid shelf 672 may increase the strength and stiffness of the container 604 by interconnecting the side walls 612 and may include perforations to facilitate the circulation of cold gas 740 (FIG. 54) or carbon dioxide gas 754 (FIG. 54) within the container interior 606. In an embodiment, the mid shelf 672 may be formed of a metallic or non-metallic material. For example, the mid shelf 672 may be formed of aluminum in a relatively small thickness such as 0.050 inch. The mid shelf 672 may be adhesively bonded to the side walls 612 and/or mechanically fastened to the side walls 612.

Figure 63:
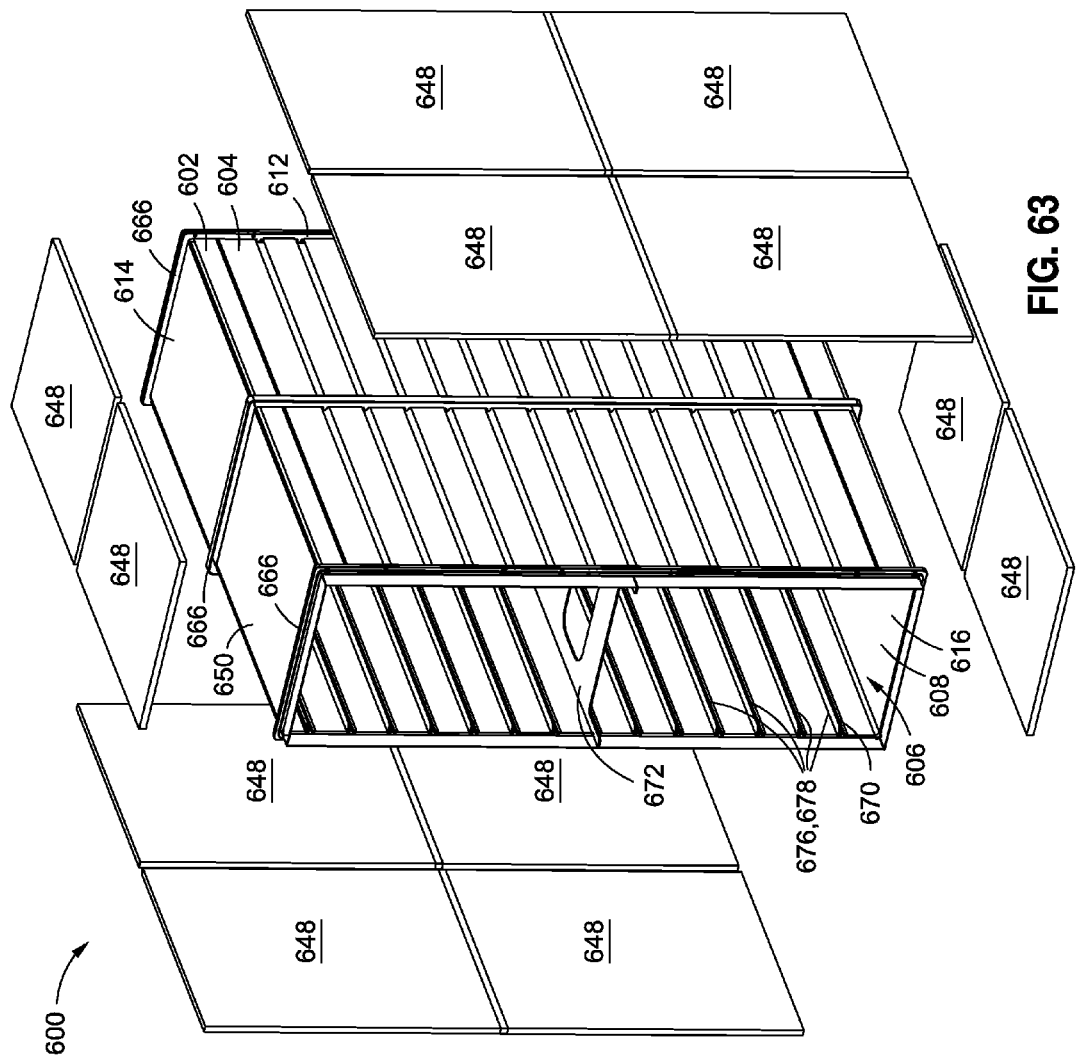
FIG. 63 is a partially exploded perspective illustration of a plurality of vacuum insulated panels for mounting to the inner shell.
Figure 64:
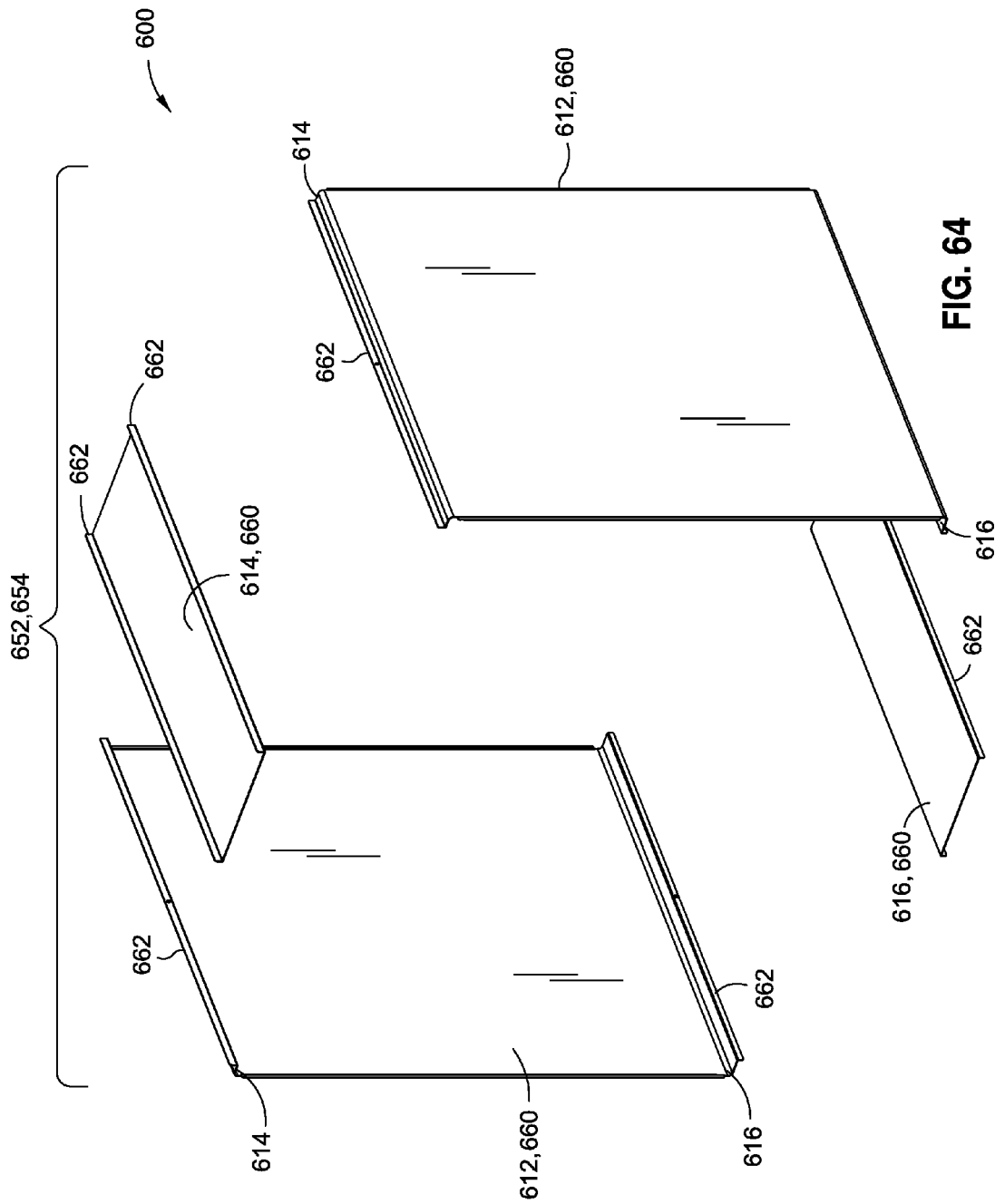
FIG. 64 is an exploded perspective illustration of a plurality of shell sections that may be assembled to form an outer shell of the container.

Referring to FIG. 63, shown is an embodiment of the inner shell 650 and a plurality of vacuum insulated panels 648 that may be mounted between the inner shell 650 and the outer shell 652 (FIG. 64). The vacuum insulated panels 648 may have a cross section similar to that which is illustrated in FIG. 13 wherein the vacuum insulated panels 648 may comprise a core 38 (FIG. 13) such as a foam core that may be surrounded by face sheets 36 (FIG. 13). The face sheets 36 may be formed of sealed metallic and/or polymeric film or foil that may be applied to opposing side surfaces of the core 38 and to the edging 646 of the core such that the vacuum insulated panel 648 is substantially air tight. Advantageously, the vacuum insulated panels 648 may minimize or eliminate thermal bridging from an exterior of the container 604 to the container interior 606.

Figure 67:
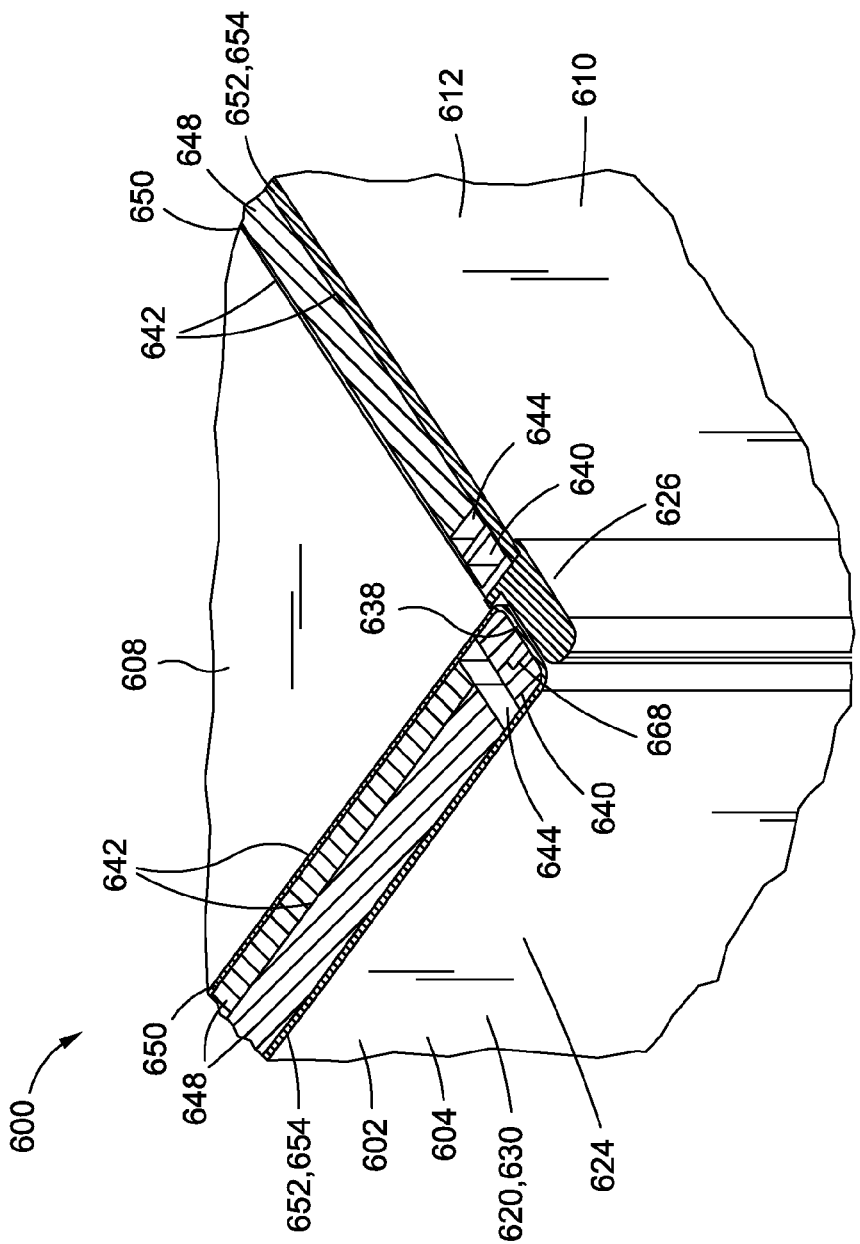
FIG. 67 is a cross sectional illustration of an interface of the cart door with a door frame of the container.

The vacuum insulated panels 648 (FIG. 63) may advantageously be provided in a relatively small thickness such that the geometry of the container interior 606 may be maintained within industry standards such that standard-size food trays 120 (FIG. 42) and galley storage bins (not shown) may be used with the container 604 embodiments disclosed herein. For example, the vacuum insulated panels 648 for the top wall 614 and the bottom wall 616 may have a thickness in the range of from approximately 0.20 to 1.0 inch and preferably in a thickness of approximately 0.25 to 0.38 inch. The vacuum insulated panels 648 for the side walls 612 may also have a thickness in the range of from approximately 0.20 to 1.0 inch and preferably in a thickness of approximately 0.38 to 0.50 inch. The vacuum insulated panels 648 for the cart doors 620 (FIG. 67) may be provided in a thickness in the range of from approximately 0.25 to 0.50. Furthermore, the vacuum insulated panels 648 for the cart doors 620 may be layered against one another to provide increased insulative capability for the cart doors 620. For example, the cart door 620 may include two (2) layers of vacuum insulated panels 648 each having a thickness of approximately 0.25 inch and which may be adhesively bonded to one another such as by using structural adhesive tape 642 as shown in FIG. 67 and described in greater detail below.

FIG. 63 illustrates the vacuum insulated panels 648 divided into sections for installation to each one of the side walls 612, the top wall 614, and the bottom wall 616. The vacuum insulated panels 648 may be installed within the stiffener rings 666 to increase the strength and stiffness of the container system 600. In an embodiment, the container 604 may have only two (2) stiffener rings 666 located on opposing ends of the container 604. The container 604 may be configured such that a single vacuum insulated panel 648 may be installed on each one of the side walls 612, the top wall 614, and the bottom wall 616. The vacuum insulated panels 648 may be attached to the inner shell 650 such as by adhesively bonding to the inner shell 650 and/or mechanically fixing the vacuum insulated panels 648 in position against the inner shells. In an embodiment, the vacuum insulated panels 648 may be bonded to the inner shell 650 with structural adhesive tape 642 such as VHB™ (very high bond) Structural Glazing Tape 642 commercially available from the 3M™ Company of Maplewood, Minn. However, the vacuum insulated panels 648 may be bonded to the inner shell 650 with any suitable structural adhesive.

Figure 66:
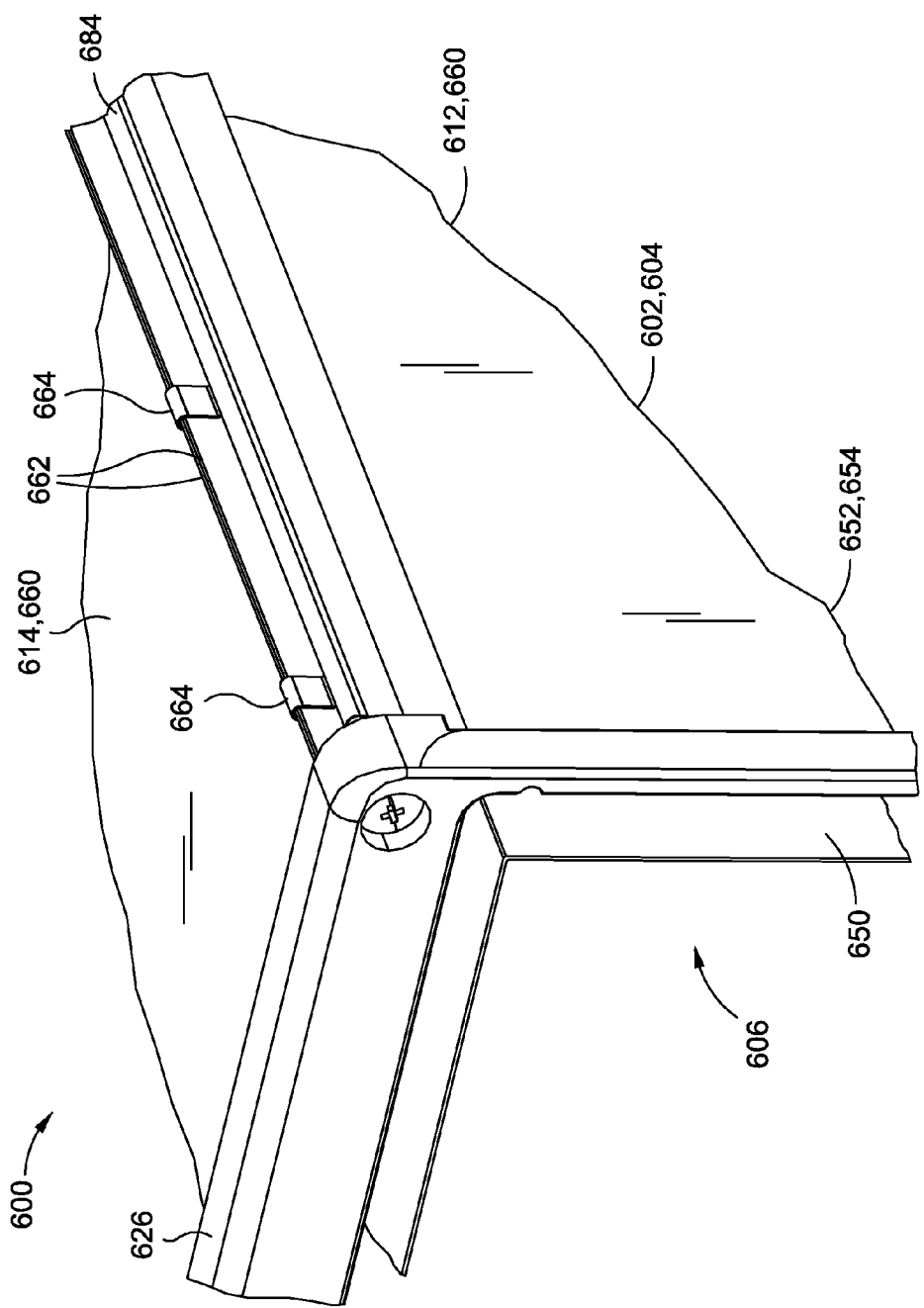
FIG. 66 is an illustration of a joint of two longitudinal flanges having C clips installed thereon.

Referring to FIG. 64, shown is an embodiment of the outer shell 652 which may be formed as separate shell sections 660 that may be assembled together. The shell sections 660 may be formed as an opposing pair of side walls 612 and may include portions of the top wall 614 and portions of the bottom wall 616. A shell section 660 may also be formed for the top wall 614 and another shell section 660 may be formed for the bottom wall 616. The longitudinal edges of each one of the shell sections 660 may include a longitudinal flange 662. The shell sections 660 may be assembled by mechanically attaching and/or adhesively bonding the longitudinal flanges 662 to one another. Referring briefly to FIG. 66, a plurality of C clips 664 may be installed at spaced intervals along the longitudinal flanges 662 to mechanically interconnect the shell sections 660. The C clips 664 may stabilize the joint between the longitudinal flanges 662 during curing of adhesive between the longitudinal flanges 662. Although the outer shell 652 is illustrated and described as comprising one or more shell sections 660, the outer shell 652 and/or the inner shell 650 may be formed as a unitary structure of metallic and/or non-metallic material.

Referring still to FIG. 64, the outer shell 652 may be formed of metallic or non-metallic material. For example, the outer shell 652 may be formed of thermoplastic or thermosetting material similar to the materials that may be used for forming the inner shell 650. The outer shell 652 may be provided in a thickness range of from approximately 0.030 to 0.125 inch although the outer shell 652 may be provided in other thickness ranges. In an embodiment, the outer shell 652 may be formed of metallic material such as metallic or non-metallic honeycomb panel or sheeting such as aluminum honeycomb panel. The honeycomb panel may have increased stiffness relative to standard homogenous metallic and non-metallic sheeting. In this regard, the honeycomb panel may function as a structural outer panel 654 for the container 604 and may provide improved strength and geometric stability to the container 604 and protection against impacts against the exterior surface 610 that may otherwise damage or result in piercing of the vacuum insulated panel 648 beneath the outer shell 652. The outer shell 652 may optionally include a decorative laminate that may be adhesively bonded to the exterior surface 610 of the outer shell 652.

Figure 65:
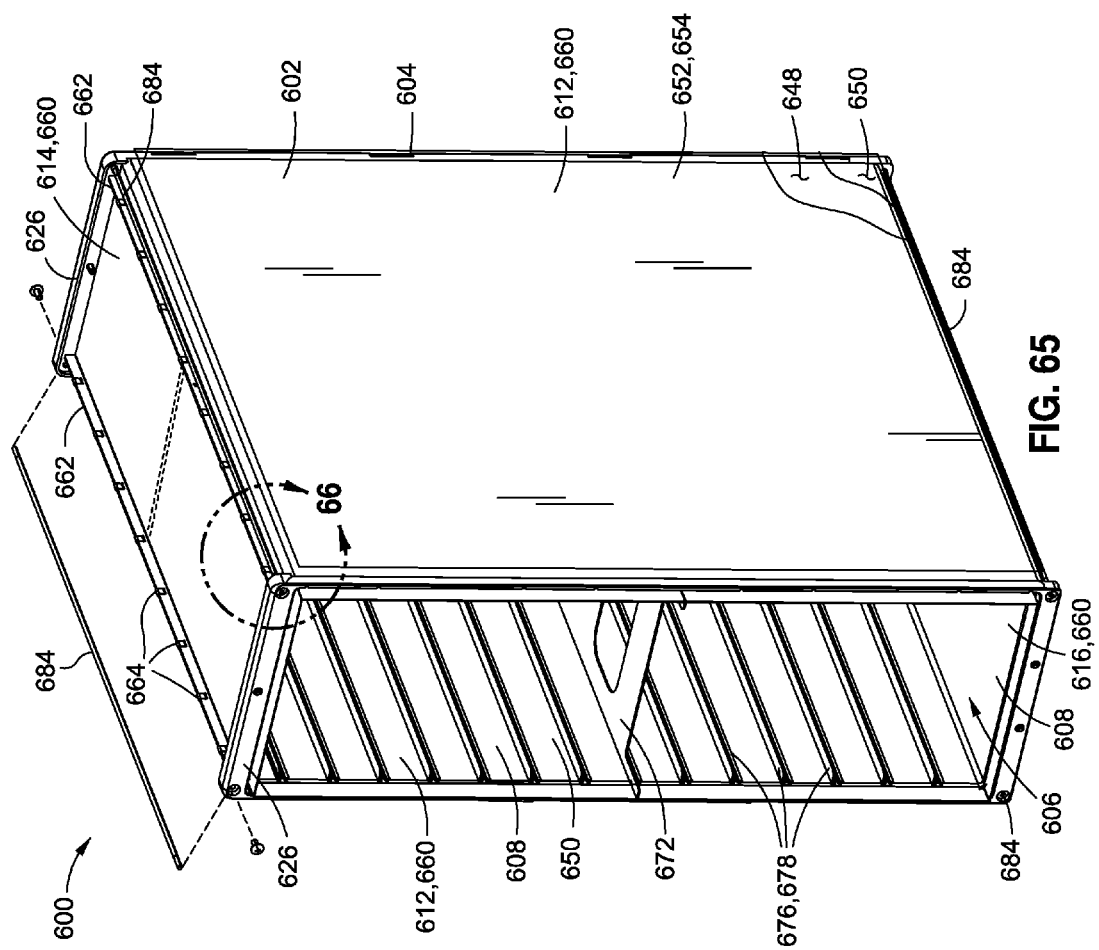
FIG. 65 is a perspective illustration of the outer shell assembled to the vacuum insulated panels and the inner shell.

Referring to FIG. 65, shown is the inner shell 650 and the vacuum insulated panels 648 assembled to the outer shell 652. The outer shell 652 sections may be bonded together along the longitudinal flanges 662 using a plurality of the C clips 664 installed at spaced intervals to mechanically interconnect the longitudinal flanges 662. The vacuum insulated panels 648 may be bonded to the outer shell 652 using structural adhesive tape 642 (FIG. 67). The vacuum insulated panels 648 (FIG. 63) may also be mechanically connected to the inner shell 650 and the outer shell 652. The assembly of the inner and outer shells 650, 652 with the vacuum insulated panels 648 may be further strengthened with the addition of a pair of door frames 626 on opposing ends of the container 604.

Referring still to FIG. 65, the door frames 626 may be interconnected by means of one or more tie rods 684. For example, each one of the longitudinal corners of the container 604 may include a tie rod 684 extending between the door frames 626. The tie rods 684 may be configured to be removable to allow for disassembly of the container 604. The vacuum insulated panels 648 (FIG. 63) may be non-permanently attached to the inner and/or outer shells 650, 652 to facilitate removal and replacement of the vacuum insulated panels 648.

Referring to FIG. 66, shown are the C clips 664 that may be installed along the longitudinal flanges 662 to mechanically interconnect the shell sections 660. The C clips 664 may stabilize the joint between the longitudinal flanges 662 during bonding of the longitudinal flanges 662. The C clips 664 may also provide redundancy for the connection of the longitudinal flanges 662 and prevent peeling of an adhesive bond between the longitudinal flanges 662.

Figure 71:
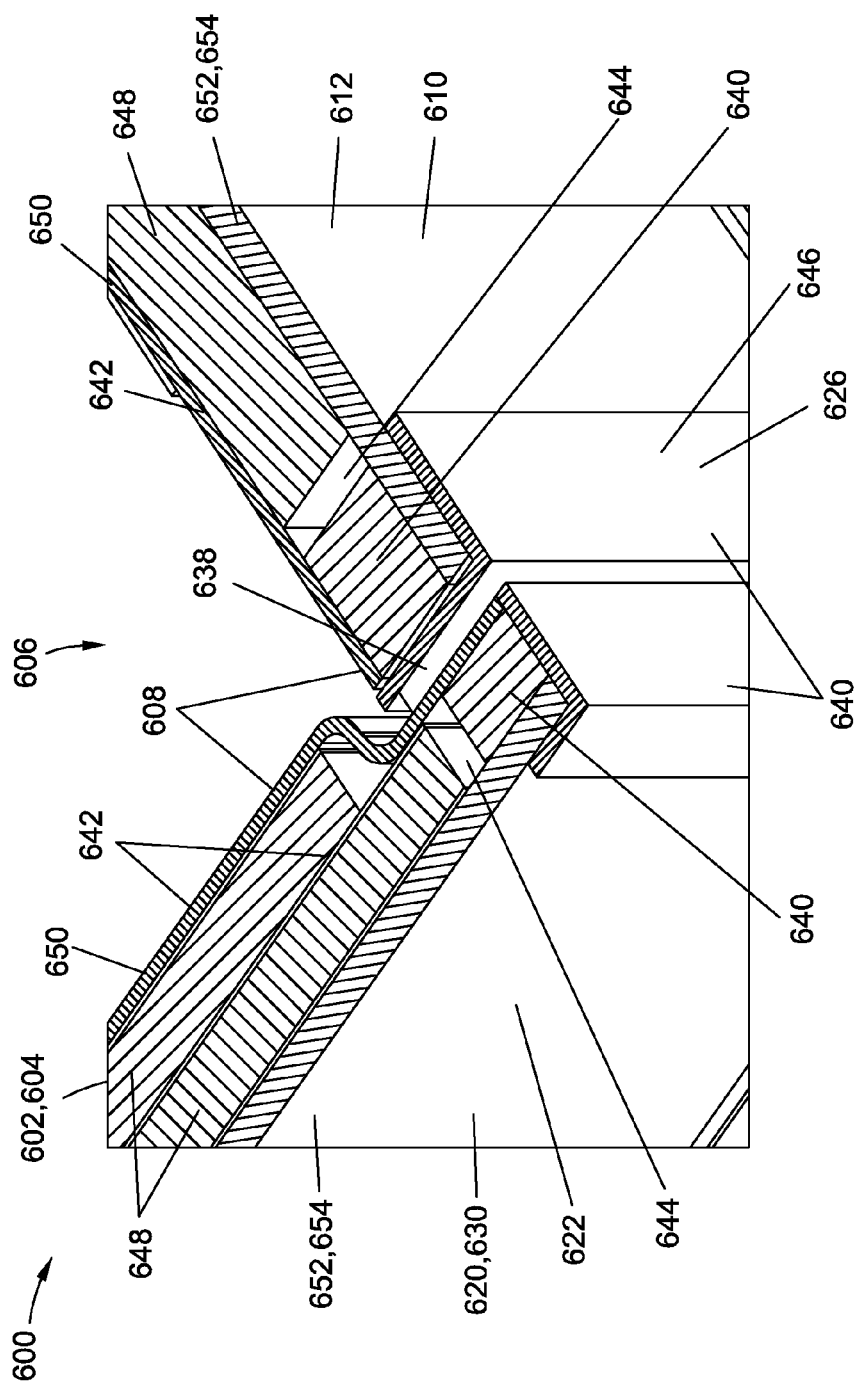
FIG. 71 is a cross sectional illustration of an interface of the cart door disposed in overlapping relation to the side wall of the container.

Referring to FIG. 67, shown is a cross section of an embodiment of the cart door 620 in sealing relation with one of the door frames 626 of the container 604. Although the cart door 620 is shown in the framed door 624 configuration in FIG. 67, the cart door 620 may be provided in an overlapping door 622 configuration as shown in FIG. 71 and described in greater detail below. Alternatively, the cart door 620 may be provided in a combination framed door 624 configuration and overlapping door 622 configuration. Advantageously, the framed door 624 configuration as shown in FIG. 67 may increase the structural stability of the container 604 wherein the framed door 624 may interface with the door frame 626 mounted at each end of the container 604. The door frame 626 may allow the cart door 620 to act as a shear web to improve the overall stiffness of the container 604.

Referring still to FIG. 67, the cart door 620 may be sealed against the door frame 626 by means of a door seal 638. The door seal 638 may be formed of a foam material such as closed cell or open cell foam or other suitable sealing material. The cart door 620 may include one or more layers of the vacuum insulated panels 648. For example, the cart door 620 may include two (2) layers of the vacuum insulated panels 648 sandwiched between the inner and outer shells 650, 652 to improve the insulative capability of the cart door 620. Foam edging 640 may be installed along a perimeter edge of the cart door 620. The foam edging 640 may comprise a polyetherimide (PEI) thermoplastic material or other suitable edging material. The foam edging 640 may be bonded to the inner surface of the outer shell 652 such as by spray foaming for insulative bonding of the foam edging 640 to the inner surface of the outer shell 652 or mechanical fasteners 674 may be installed through the outer shell 652 and into the foam edging 640. An edge sealant/gap filler 644 may be installed between the edges of the vacuum insulated panels 648 and the foam edging 640 to improve the dimensional stability of the vacuum insulated panels 648. Likewise, foam edging 640 may be installed along a perimeter edge of the side walls 612, top wall 614 (FIG. 66), and bottom wall 616 (FIG. 62) with the optional installation of edge sealant/gap filler 644 between the edges of the vacuum insulated panels 648 and the foam edging 640.

Figure 68:
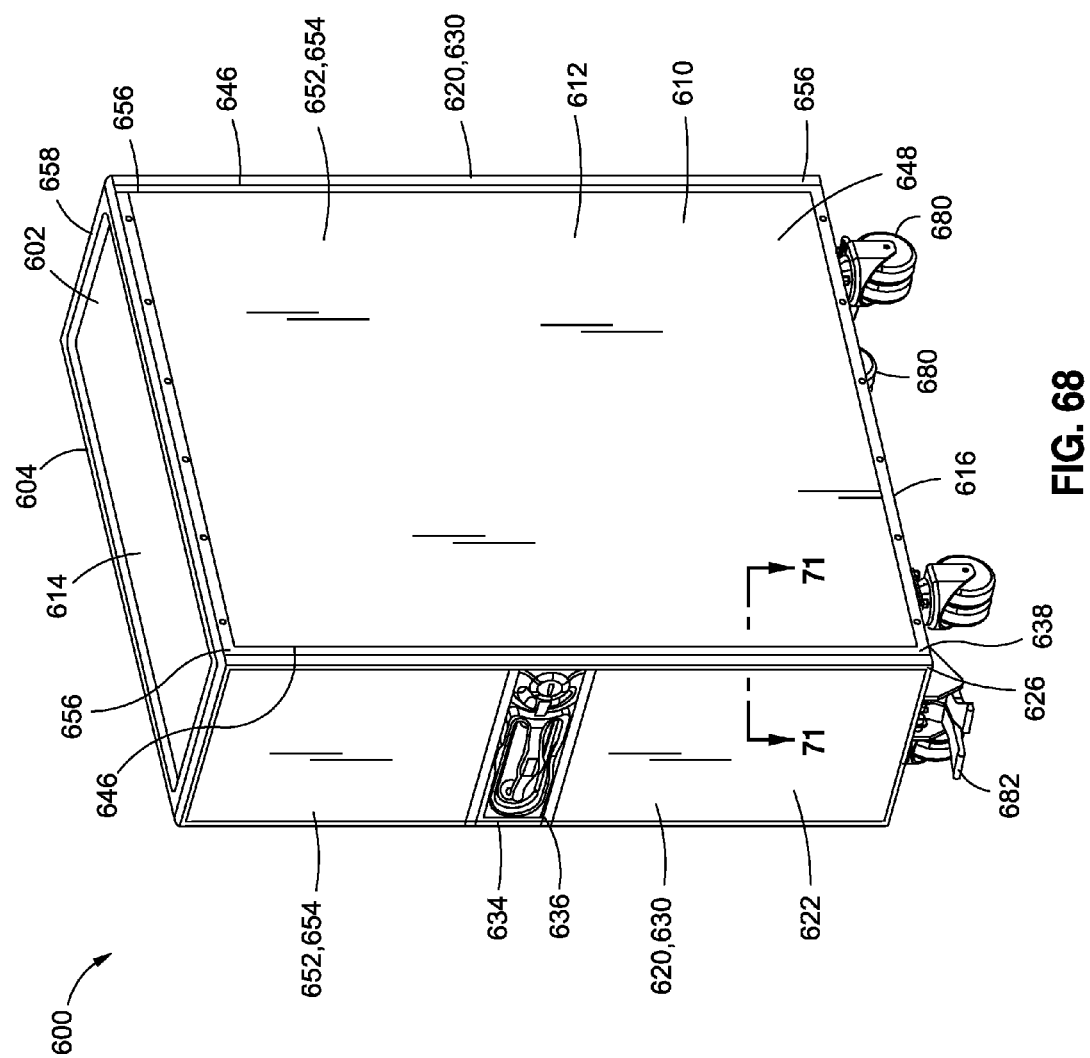
FIG. 68 is a perspective illustration of a further embodiment of the container that may be assembled using edging.
Figure 69:
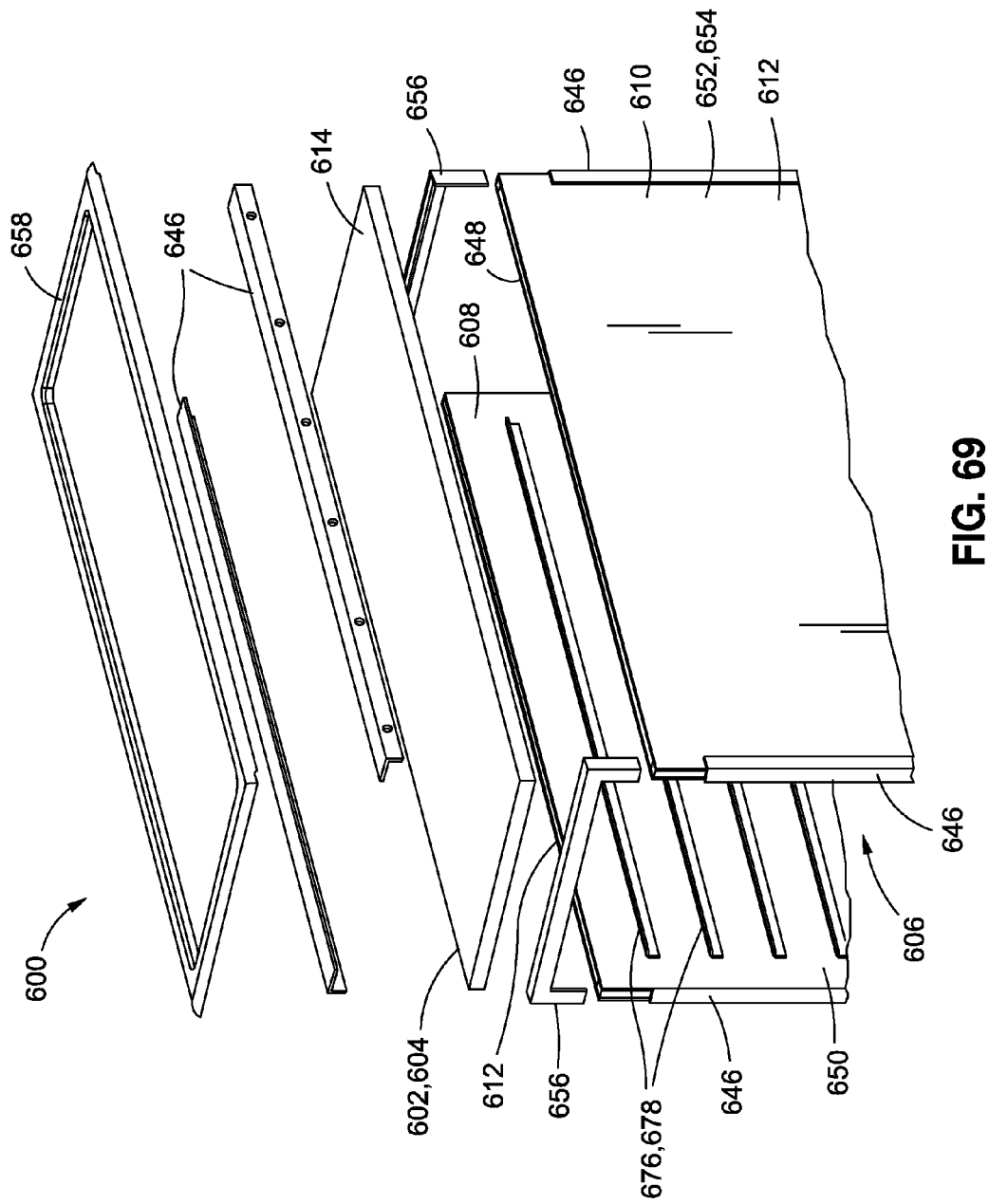
FIG. 69 is an exploded perspective illustration of an upper portion of the container of FIG. 68 and illustrating the interconnection of the top wall to the side walls using caps and edging.
Figure 70:
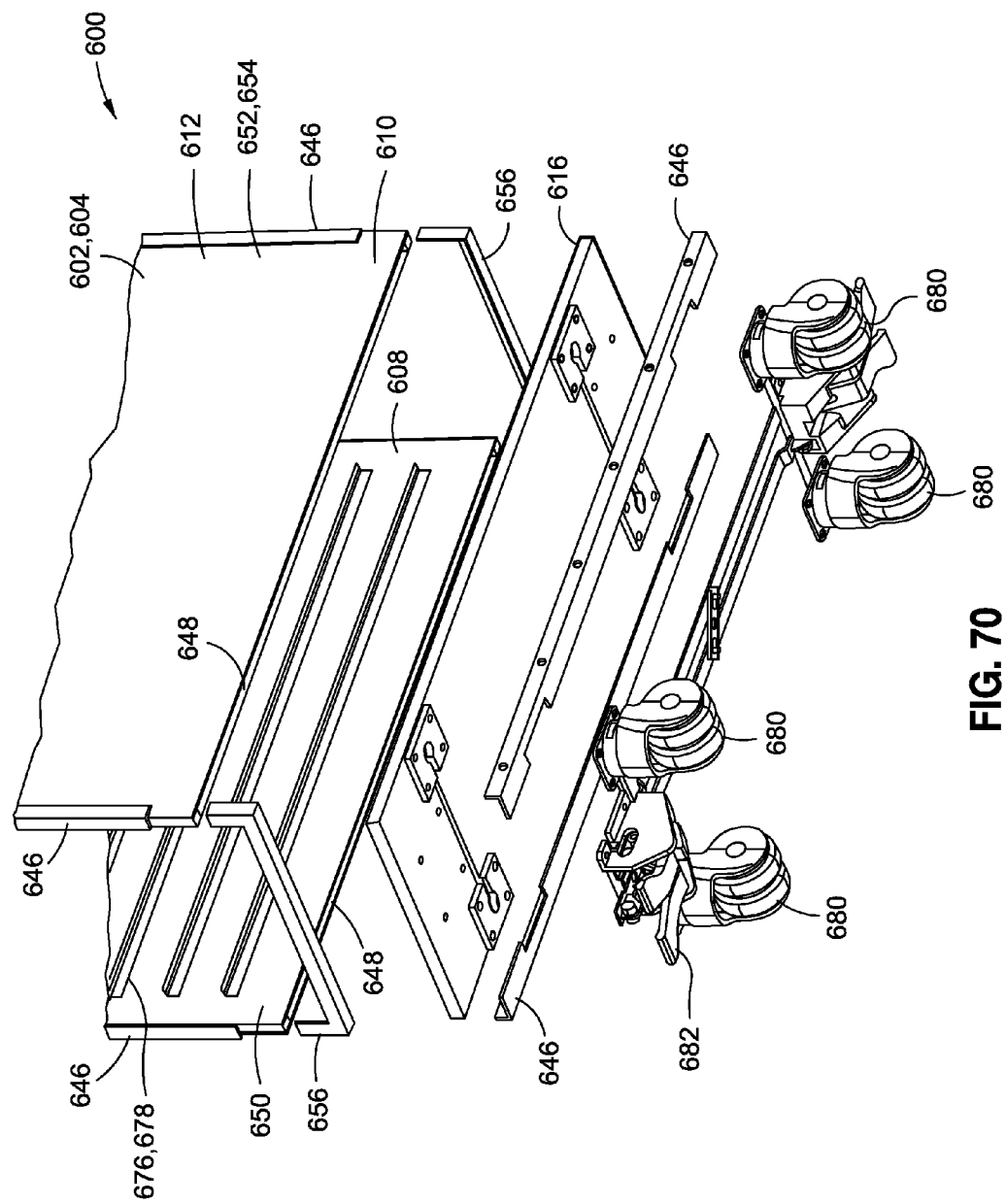
FIG. 70 is an exploded perspective illustration of a lower portion of the container of FIG. 68 and illustrating the interconnection of the bottom wall to the side walls using caps and edging.

Referring to FIGS. 68-70, shown is an embodiment of the container 604 that may be assembled using angle members and/or channel members to interconnect the side walls 612, the top wall 614 and the bottom wall 616 of the container 604. The side walls 612, top wall 614 and bottom wall 616 may each be comprised of one or more vacuum insulated panels 648 sandwiched between inner and outer shells 650, 652 as described above. FIGS. 69-70 illustrate edging 646 members configured as metallic (e.g., aluminum) or non-metallic angle of suitable thickness (e.g., 0.030 to 0.090 inch) for interconnecting the side panels to the top wall 614 and the bottom wall 616 along the longitudinal edges (i.e., extending between the cart doors 620) of the container 604. Edging 646 may also be applied to vertical edges of the container 604 (i.e., extending between the top and bottom walls 614, 616) of the container 604.

Caps 656 may be installed at each end of the container 604 to interconnect the top and bottom wall 614, 616 to the side walls 612. The caps 656 and edging 646 at each end of the container 604 may form a door frame 626 for the cart door 620. The edging 646 and the caps 656 may be bonded and/or mechanically fastened to the side walls 612, top wall 614 and the bottom wall 616. In FIG. 70, the lower chassis 682 comprising the casters 680 and the wheel and brake set (not shown) may be bonded and/or mechanically fastened to the bottom wall 616 of the container 604. A trim ring 658 may be mechanically fastened to the top wall 614. In FIG. 69, at the top wall 614, the trim ring 658 may optionally be integrated with the caps 656, the edging 646, and the top wall 614 to simplify assembly and disassembly for repair and replacement of components of the container 604.

Referring to FIG. 71, shown is a cross section of the cart door 620 in overlapping relation to the side wall 612 of the container 604 of FIG. 68. The cart door 620 may include two (2) or more vacuum insulated panels 648 sandwiched between inner and outer shells 650, 652 although the cart door 620 may include a single vacuum insulated panel 648 between the inner and outer shells 650, 652. A door seal 638 may be installed between the cart door 620 and the edging 646 along the side wall 612. Foam edging 640 and edge sealant/gap filler 644 may be installed similar to the configuration described above for the cart door 620 arrangement of FIG. 67. FIG. 71 further illustrates the edging 646 applied to the side walls 612 and to the cart door 620. The vacuum insulated panels 648 may be bonded to the inner and outer shell 650, 652 using a structural adhesive tape 642 and/or mechanical fasteners 674 (not shown).

Figure 72:
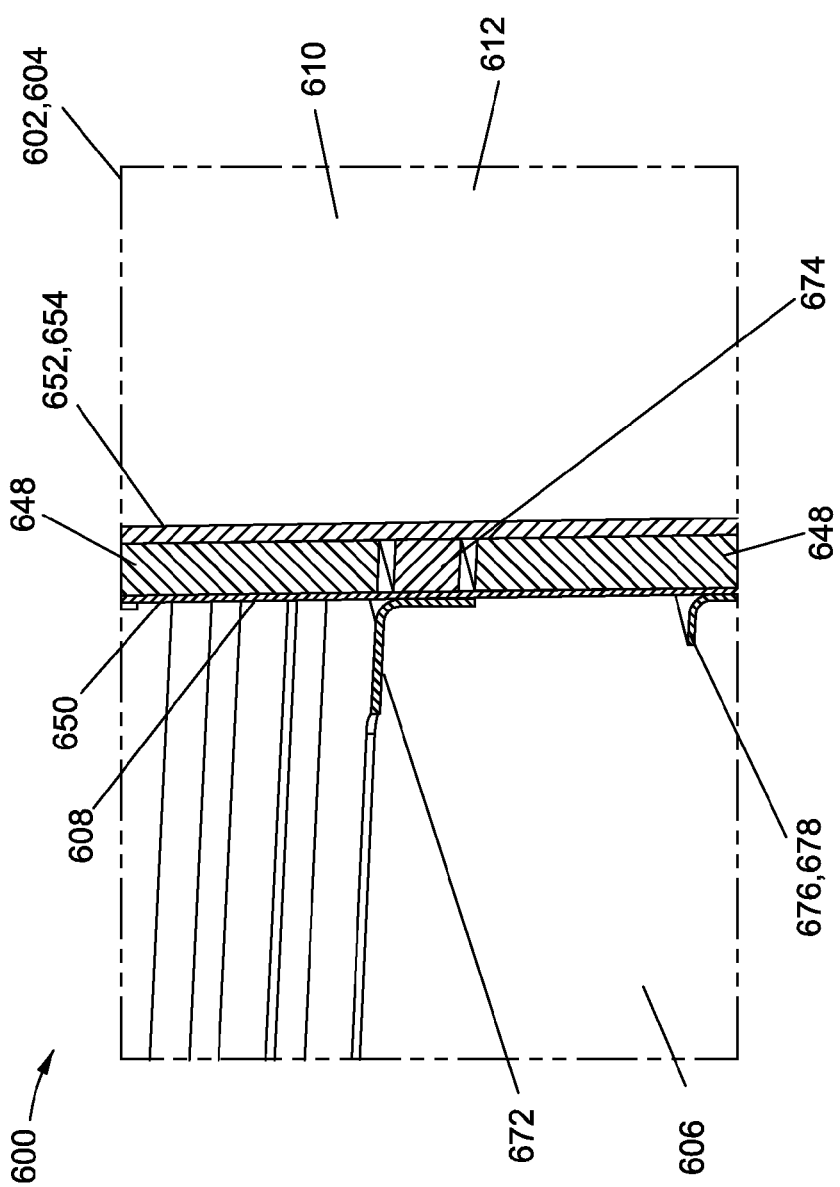
FIG. 72 is a cross sectional illustration of the side wall showing a cross bar mounted within the side wall for attaching a mid shelf to the side wall.

Referring to FIG. 72, shown is a cross bar 674 mounted within the side wall 612 for attaching the mid shelf 672 to the side wall 612. The cross bar 674 may be formed of a substantially rigid foam element such as polyetherimide (PEI) thermoplastic foam or other suitable material. The cross bar 674 may extend longitudinally between the opposing cart doors 620 (FIG. 68) of the container 604 and may be positioned between a vacuum insulated panel 648 located above the cross bar 674 and a vacuum insulated panel 648 located below the cross bar 674. The cross bar 674 may be aligned with the stiffener panel and may provide structurally stability to the side wall 612 for securing the mid shelf 672 to the side wall 612. The mid shelf 672 may be bonded and/or mechanically fastened to the side walls 612 at the location of the cross bar 674.

Figure 73:
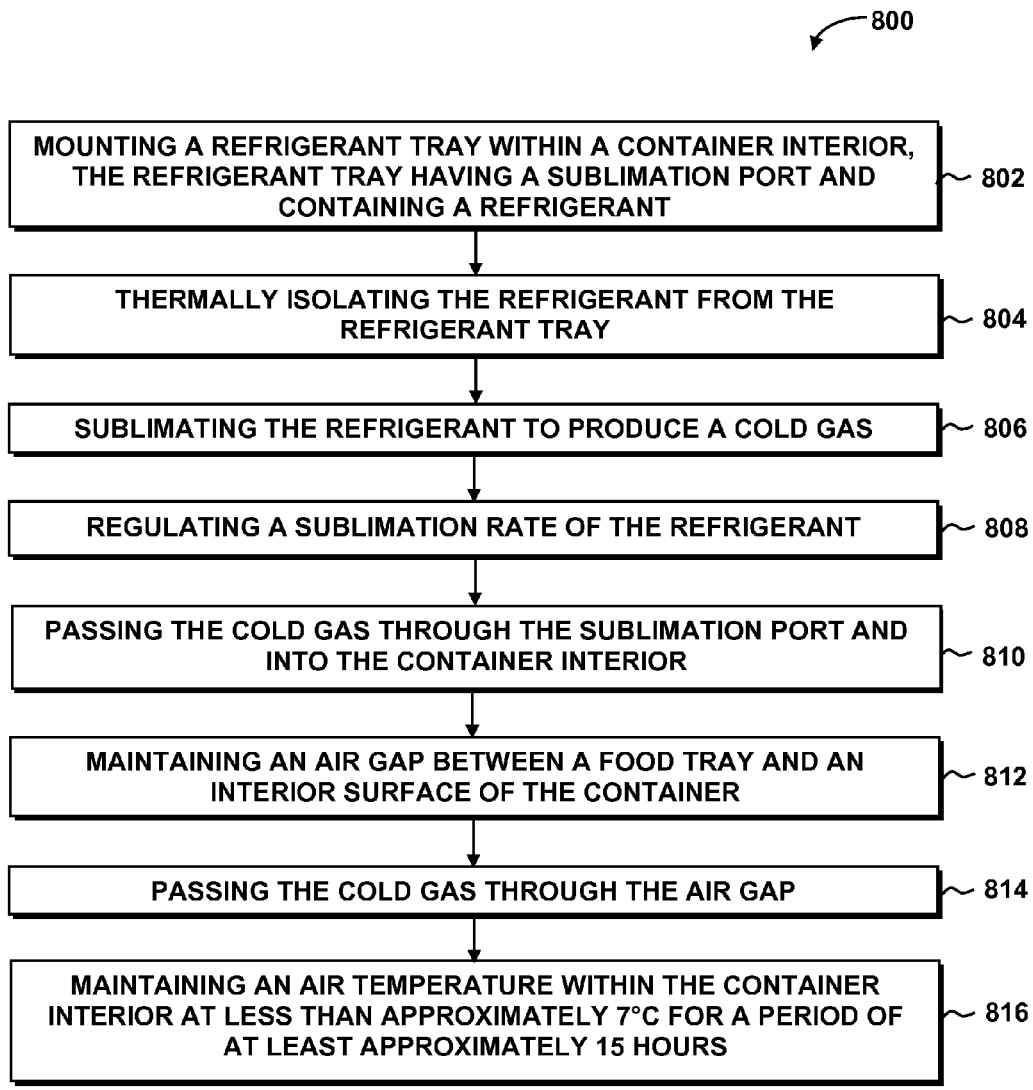
FIG. 73 is a flow chart of an embodiment of a method including one or more operations that may be performed for cooling the interior of the container using the refrigerant tray.

Referring to FIG. 73, shown is a flow chart of a method 800 for cooling the interior 606 of a container 604 (e.g., FIGS. 42, 53, 61, 68) such as a galley cart 602 (e.g., FIGS. 42, 53, 61, 68). Advantageously, the method for cooling the container interior 606 may be performed in a passive manner without reliance on a mechanical refrigeration system (not shown).

Step 802 of the method 800 of FIG. 73 may comprise loading one or more refrigerant trays 700 (e.g., FIG. 45) with refrigerant 188 such as a dry ice puck 750 (FIG. 45) comprising dry ice 752 pellets and/or dry ice 752 in slab form. Step 802 may comprise mounting one or more refrigerant trays 700 within the container interior 606. For example, FIGS. 42-43 illustrate the refrigerant tray 700 being mounted within the container 604 above a food tray. The refrigerant tray 700 may include one or more of the sublimation ports 728 such as the sublimation ports 728 located at one or both of the ends 702 of the refrigerant tray 700. However, the refrigerant tray 700 may be provided without sublimation ports 72 as shown in FIG. 60.

Step 804 of the method 800 of FIG. 73 may comprise thermally isolating the refrigerant 188 (FIG. 46) from the refrigerant tray 700 (FIG. 46). For example, FIG. 46 illustrates a thermal isolator 756 mounted between the dry ice puck 750 and the tray lower wall 708 of the refrigerant tray 700. Step 804 may also comprise minimizing heat conduction between the tray lower wall 708 and the refrigerant 188 using the thermal isolator 756 to prevent the freezing of items that are mounted directly below the refrigerant tray 700.

Step 806 of the method 800 of FIG. 73 may comprise sublimating the refrigerant 188 (e.g., dry ice 752—FIG. 45) to produce cold gas 740 (FIG. 45). If the refrigerant 188 is provided as dry ice 752, the dry ice 752 may sublimate from solid carbon dioxide directly to gaseous carbon dioxide 754 when the temperature of the dry ice 752 exceeds −78° C. (approximately −109° F. at one atmosphere).

Step 808 of the method 800 of FIG. 73 may comprise regulating the sublimation rate of the refrigerant 188. In an embodiment, the sublimation rate may be regulated by adjusting the tray vents 716 (FIG. 45) that may be mounted to the lid 714 of the refrigerant tray 700 as shown in FIG. 45. The tray vents 716 may be adjusted to regulate the amount of air that can pass through the tray vents 716 and enter the refrigerant tray 700 interior to regulate the exposure of the refrigerant 188 to air within the container interior 606 (FIG. 53). In this regard, the tray vents 716 may be opened and closed to respectively increase and decrease exposure of the refrigerant 188 (e.g. dry ice 752) to the warmer air temperature within the container interior 606 resulting in a respective increase and decrease in the sublimation rate.

Step 810 of the method 800 of FIG. 73 may comprise passing the cold gas 740 (FIG. 53) or carbon dioxide gas 754 (FIG. 53) through the sublimation ports 728 (FIG. 53) of the refrigerant tray 700 (FIG. 53) and into the container interior 606 (FIG. 53). For example, FIGS. 53-54 illustrate the cold gas 740 or carbon dioxide gas 754 flowing generally downwardly out of the sublimation ports 728 and into the container interior 606. The cold gas 740 or carbon dioxide gas 754 may flow generally downwardly due to the cold temperature of the cold gas 740 or carbon dioxide gas 754 relative to the air within the container interior 606 and due to the high density of cold gas 740 or carbon dioxide gas 754 relative to the density of air.

Step 812 of the method 800 of FIG. 73 may comprise maintaining air gaps 734 (FIGS. 53-54) between the interior surface 608 of the container 604 and one or more of the food trays 120 disposed adjacent to the interior surface 608. FIG. 55 illustrates the air gap 734 between the interior surface 608 of the cart door 620 and the food trays 120. The air gap 734 may be maintained with the aid of a spacer device 730 such as the spacer rib 732 mounted to the cart door 620 as illustrated in FIG. 55. In an embodiment of the container 604 shown in FIG. 57, side gaps 736 may be formed between the food trays 120 and the interior surfaces 608 of the side walls 612 to facilitate the vertical movement of cold gas 740 or carbon dioxide gas 754 (FIG. 45) and/or air within the container interior 606.

Step 814 of the method 800 of FIG. 73 may comprise passing the cold gas 740 or carbon dioxide gas 754 (FIGS. 53-54) through the air gaps 734. FIGS. 53-54 illustrate the cold gas 740 or carbon dioxide gas 754 flowing downwardly and between the air gaps 734 between the food trays 120 and the cart door 620. The cold gas 740 or carbon dioxide gas 754 may flow along one or more sublimation paths 758. The sublimation paths 758 may extend through the air gaps 734. In an embodiment of the container system 600 wherein the refrigerant trays 700 (FIG. 60) may be devoid of openings, the container interior 606 (FIG. 59) may be cooled by contact of the air with exterior surfaces of the refrigerant tray 700 as described above. The cooled or cold air 760 may then sink as shown in FIG. 59 and may displace warm air 762 which may rise and come into contact with the refrigerant tray 700 such that the cold air 760 and the warm air 762 may form one or more convection cycles 764 within the container interior 606 as described above. The cold air 760 (FIG. 59) and the warm air 762 (FIG. 59) may pass through the air gaps 734 (FIG. 57) and the side gaps 736 (FIG. 57).

Step 816 of the method 800 of FIG. 73 may comprise maintaining the air temperature within the container interior 606 (FIGS. 53, 54, 59) at less than a predetermined temperature. For example, the cold air 762 (FIG. 59) and/or the cold gas 740 (FIG. 54) or carbon dioxide gas 754 (FIG. 54) flowing within the container interior 606 may maintain the air temperature within the container interior 606 at less than approximately 7° C. and, more preferably, at a temperature of less than approximately 4° C. for a period of up to approximately 15 hours in an environment having an ambient air temperature of up to approximately 29° C. or higher. Advantageously, the container 604 may be constructed to provide a high level of thermal insulative capability which may facilitate the passive cooling of the container interior 606 to a relatively low temperature for extended durations without the aid of a mechanical refrigeration system (not shown).

Further advantages provided by embodiments of the passively-cooled container systems 600 (e.g., FIGS. 42, 53, 56, 59, 61, 68) disclosed herein include an increase in the flexibility of locations within an aircraft cabin (not shown) where galley carts 602 (e.g., FIGS. 42, 53, 56, 59, 61, 68) may be stored. By reducing or eliminating the need for a dedicated mechanical refrigeration system (not shown) as conventionally used for chilling galley carts stored in an aircraft galley (not shown), galley carts 602 chilled using the presently disclosed cold trays (e.g., FIG. 6) and/or refrigerant trays 700 (e.g., FIGS. 47, 52, 60) may be stored at a wider variety of locations within the aircraft cabin which may increase the options for configuring the aircraft cabin. In this same regard, the elimination of a conventional mechanical refrigeration system for the galley carts 602 eliminates the need to provide space for ducting (not shown) for supplying and returning air from a mechanical refrigeration system to the galley carts 602. The elimination of such ducting from the aircraft cabin by using the embodiments disclosed herein provides the potential for the adding an additional row of revenue-generating passenger seats. In addition, the elimination of conventional mechanical refrigeration systems for chilling galley carts 602 may also reduce noise output and heat output of such mechanical refrigeration systems and may result in an increase in comfort for passengers and crew. A further advantage provided by the embodiments disclosed herein includes an improvement in aerodynamic performance of the aircraft due to a reduction in the amount of outside air that must be drawn through an opening (not shown) on the exterior surface (not shown) of the aircraft for cooling a mechanical refrigeration system dedicated for chilling galley carts 602.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A container system, comprising:
a container having opposing side walls and a container interior, each of the opposing side walls including a plurality of discrete support knobs spaced along a horizontal direction of the side walls and along a vertical direction of the side walls;
a mid shelf extending horizontally between the side walls and including a horizontal portion integral with vertical side tabs non-movably attached to the side walls by adhesive bonding and/or mechanical fastening, the horizontal portion including perforations and having a plurality of mid shelf cutouts formed at spaced intervals between the side tabs in each of opposing side edges of the mid shelf and one or more mid shelf cutouts formed in each of opposing end edges of the mid shelf, the mid shelf configured to increase the strength and stiffness of the container, the mid shelf positioned within the container such that at least some of the plurality of support knobs are located above the mid shelf and at least some of the plurality of support knobs are located below the mid shelf;
a pair of refrigerant trays each being configured to contain a refrigerant producing a cold gas upon sublimation and having sublimation ports formed on opposing ends of the refrigerant tray;
each refrigerant tray being configured to be slidably inserted into and positioned within the container interior above one or more food trays;
each refrigerant tray having a vent opening to allow a flow of air from the container through the vent opening and downwardly over the refrigerant in a manner such that the cold gas flows out of the sublimation ports and downwardly into a general center of the container interior and downwardly through the perforations in the mid shelf and through an air gap at each one of the opposing ends of the container between one of the one or more food trays and a cart door or end wall of the container and through side gaps formed between each of the one or more food trays and the side walls; and
wherein the support knobs, the air gap at each of the opposing ends, the side gaps along the opposing side walls, and the mid shelf cutouts collectively form a plurality of uninterrupted vertically-oriented flow paths for the cold gas along the opposing ends and along the side walls between a top and a bottom of the container interior.

2. The container system of claim 1 further comprising:
a spacer device configured to maintain the air gap between the one of the one or more food trays and an interior surface of the container at each one of the opposing ends of the container.

3. The container system of claim 2 wherein:
the spacer device is mounted to an interior surface of the cart door; and
the spacer device being configured to maintain the air gap between the one of the one or more food trays and the cart door when the cart door is in a closed position.

4. The container system of claim 1 wherein:
at least one of the refrigerant trays includes a thermal isolator configured to be mounted between the refrigerant and a tray lower wall of the refrigerant tray.

5. The container system of claim 1 wherein:
at least one of the refrigerant trays includes a thermal regulator configured to be mounted between the refrigerant and a tray lower wall of the refrigerant tray.

6. The container system of claim 1 wherein:
the pair of refrigerant trays and the container are configured to cooperatively maintain an air temperature within the container interior at less than approximately 4° C. for a period of at least approximately 15 hours in an environment having an ambient air temperature of greater than approximately 29° C.

7. The container system of claim 1 wherein:
the pair of refrigerant trays and the container are configured to cooperatively limit heat gain into the container interior to less than approximately 200 Btu/hour in an environment having an ambient temperature of greater than approximately 29° C.

8. The container system of claim 1 wherein:
the container is comprised of a plurality of vacuum insulated panels at least partially enclosing the container interior.

9. The container system of claim 8 wherein:
at least one of the vacuum insulated panels is interposed between an inner shell and an outer shell; and
at least one of the inner shell and the outer shell being comprised of at least one of the following: honeycomb panel, polymeric sheet, metallic sheet.

10. An aircraft, comprising:
a passively-cooled movable container having opposing side walls and a container interior and being configured to contain a plurality of food trays, each of the opposing side walls including a plurality of discrete support knobs spaced along a horizontal direction of the side walls and along a vertical direction of the side walls;
a mid shelf extending horizontally between the side walls and including a horizontal portion integral with vertical side tabs non-movably attached to the side walls by adhesive bonding and/or mechanical fastening, the horizontal portion including perforations and having a plurality of mid shelf cutouts formed at spaced intervals between the side tabs in each of opposing side edges of the mid shelf and one or more mid shelf cutouts formed in each of opposing end edges of the mid shelf, the mid shelf configured to increase the strength and stiffness of the container, the mid shelf positioned within the container such that at least some of the plurality of support knobs are located above the mid shelf and at least some of the plurality of support knobs are located below the mid shelf;
a pair of refrigerant trays each being configured to contain a refrigerant producing a cold gas upon sublimation and being configured to be slidably inserted into and positioned within the container interior above at least one of the food trays and having sublimation ports formed on opposing ends of the refrigerant tray;
the container being formed of a plurality of vacuum insulated panels enclosing the container interior;
each refrigerant tray having a vent opening to allow a flow of air from the container into the refrigerant tray through the vent opening and downwardly over the refrigerant in a manner such that the cold gas flows out of the sublimation ports and downwardly into a general center of the container interior and downwardly through the perforations in the mid shelf and through air gaps at the opposing ends of the container between the food trays and a cart door or end wall of the container and through side gaps formed between each of the one or more food trays and the side walls; and
wherein the support knobs, the air gap at each of the opposing ends, the side gaps along the opposing side walls, and the mid shelf cutouts collectively form a plurality of uninterrupted vertically-oriented flow paths for the cold gas along the opposing ends and along the side walls between a top and a bottom of the container interior.

11. A method of refrigerating an interior of a container, comprising the steps of:
slidably inserting a pair of refrigerant trays into a container interior of a container having opposing side walls, each of the opposing side walls including a plurality of discrete support knobs spaced along a horizontal direction of the side walls and along a vertical direction of the side walls, the container including a mid shelf extending horizontally between the side walls and including a horizontal portion integral with vertical side tabs non-movably attached to the side walls by adhesive bonding and/or mechanical fastening, the horizontal portion including perforations and having a plurality of mid shelf cutouts formed at spaced intervals between the side tabs in each of opposing side edges of the mid shelf and one or more mid shelf cutouts formed in each of opposing end edges of the mid shelf, each refrigerant tray having sublimation ports formed on opposing ends of the refrigerant tray and containing a refrigerant, the mid shelf positioned within the container such that at least some of the plurality of support knobs are located above the mid shelf and at least some of the plurality of support knobs are located below the mid shelf;
controlling a flow of air from the container into the refrigerant trays;
sublimating the refrigerant to produce a cold gas;
regulating a sublimation rate of the refrigerant in response to controlling the flow of air into the refrigerant trays; and
passing the cold gas out through the sublimation ports and downwardly into a general center of the container interior and downwardly through the perforations in the mid shelf and through an air gap at each one of the opposing ends of the container between a food tray and a cart door or end wall of the container and through side gaps formed between each of the one or more food trays and the side walls; and
wherein the support knobs, the air gap at each of the opposing ends, the side gaps along the opposing side walls, and the mid shelf cutouts collectively form a plurality of uninterrupted vertically-oriented flow paths for the cold gas along the opposing ends and along the side walls between a top and a bottom of the container interior.

12. The method of claim 11 further comprising the steps of:
mounting at least one of the refrigerant trays above the food tray;
flowing the cold gas generally downwardly from the sublimation ports; and
maintaining the container interior below a predetermined temperature.

13. The method of claim 11 further comprising the step of:
thermally isolating the refrigerant from a tray lower wall using a thermal isolator installed between the refrigerant and the tray lower wall.

14. The method of claim 11 further comprising the step of:

maintaining an air temperature within the container interior at less than approximately 7° C. for a period of at least approximately 15 hours in an environment having an ambient air temperature of greater than approximately 29° C.

15. The container system of claim 1 further comprising:

an adjustable slider mounted on at least one of the refrigerant trays and configured to allow for adjusting an area of the vent opening to control the flow of air through the vent opening.

16. The method of claim 11 further comprising the step of:

adjusting a slider mounted on at least one of the refrigerant trays for adjusting an area of the vent opening to control the flow of air into the refrigerant tray.

* * * * *